United States Patent
Lebowitz et al.

(10) Patent No.: US 11,954,215 B1
(45) Date of Patent: Apr. 9, 2024

(54) SYSTEM AND METHOD FOR SECURITY SUITE CONCATENATING VALIDATION ELEMENTS FOR BLOCKCHAIN BINDING OPERATIONS

(71) Applicant: Real Title Block, LLC, Dallas, TX (US)

(72) Inventors: Louis H. Lebowitz, Dallas, TX (US); J. Charles Davis, II, Dallas, TX (US); Will E. McLaughlin, Dallas, TX (US)

(73) Assignee: Real Title Block, LLC, Dallas, TX (US)

( * ) Notice: Subject to any disclaimer, the term of this patent is extended or adjusted under 35 U.S.C. 154(b) by 0 days.

(21) Appl. No.: 18/319,949

(22) Filed: May 18, 2023

Related U.S. Application Data

(60) Provisional application No. 63/426,955, filed on Nov. 21, 2022.

(51) Int. Cl.
*G06F 21/62* (2013.01)

(52) U.S. Cl.
CPC ................. *G06F 21/6209* (2013.01)

(58) Field of Classification Search
CPC .................................................. G06F 21/6209
See application file for complete search history.

(56) References Cited

U.S. PATENT DOCUMENTS

| | | | | |
|---|---|---|---|---|
| 2012/0187185 A1* | 7/2012 | Sayan | ................ | G06Q 30/0601 235/487 |
| 2017/0048216 A1* | 2/2017 | Chow | ................ | H04L 63/0876 |
| 2019/0279201 A1* | 9/2019 | Xia | ................ | G06F 21/6209 |
| 2019/0372769 A1* | 12/2019 | Fisher | ................ | H04L 9/3226 |
| 2020/0042995 A1* | 2/2020 | Snow | ................ | G06Q 40/04 |
| 2020/0050780 A1 | 2/2020 | Uhr et al. | | |
| 2020/0169411 A1 | 5/2020 | Drake et al. | | |
| 2021/0319119 A1 | 10/2021 | Hadi | | |
| 2022/0020001 A1 | 1/2022 | Snow | | |
| 2022/0150377 A1 | 5/2022 | Kunori | | |
| 2022/0210061 A1* | 6/2022 | Simu | ................ | G06Q 20/3829 |

OTHER PUBLICATIONS

Patent Cooperation Treaty: International Search Report and Written Opinion of PCT/US2023/080348 (related application); Matos Taina; Feb. 15, 2024; 15 Pages.

Williams et al., "Arweave: A Protocol for Economically Sustainable Information Permanence", arweave.org, 2019. https://arweave.org/yellow-paper.pdf.

* cited by examiner

*Primary Examiner* — Vance M Little

(57) ABSTRACT

A system comprises a server system including at least one processor. The at least one processor is configured to receive a request to generate a digital secured document, generate a unique identifier of the digital secured document, and embed a plurality of security data in at least one of the one or more defined areas of the digital secured document. The plurality of security data includes a scannable code. The scannable code has embedded therein an encrypted message that, when decrypted by the server system, validates an authenticity of the digital secured document. The at least one processor is also configured to mint the digital secured document on a blockchain, including generate metadata on the blockchain associated with the digital secured document, and store the metadata and one or more images associated with the digital secured document permanently with an on-chain permaweb protocol.

28 Claims, 21 Drawing Sheets

RELEASE OF RESTRICTIONS

The undersigned, ("Property Owner"), heretofore recorded that certain Notice of Restrictions, dated April 10, 2023, recorded in Document No. 2023 - 202200999999, Real Estate Records, Dallas County, Texas (the "Notice") relating to the following real property (the "Property") more fully described therein.

The Property Owner, hereby TERMINATES, CANCELS, and RELEASES the NOTICE and forever DISCHARGES the Real Property of and from the conditions and restrictions set forth in the Notice. Real Title Block, LLC, has authenticated, validated, certified, proved, and sealed this instrument as indicated below, as required by the Notice in order to terminate, cancel and release the Notice.

| REAL PROPERTY LEGAL DESCRIPTION: | REAL TITLE BLOCK NFT DATA: |
|---|---|
| 1: DLH HUTCHINS WINTERGREEN 178 | 1: blockchain "Solana" |
| 2: BLK B LT 1 ACS 68.382 | 2: mint 559u4Tdr9umKwlt3yHMsnAxohhzkFnUBPAFsibwu2D9z |
| 3: INT201900051678 DD03012019 CO-DC | 3: name "RTB_NFT_3501_lancaster_hutchins" |
| 4: LOCATED IN DALLAS COUNTY, TEXAS | 4: symbol "rtbNFTsol" |
| 5: | 5: rtbID REL.1652832000.####### |
| 6: | 6: image arweave://#######/rtb-ror-3501-lancaster-hutchins.jpg |

Executed, this 10th day of June, 2023

PROPERTY OWNER:
JOE DOE
*JoeDoe*
By: _____

STATE OF TEXAS
COUNTY OF DALLAS

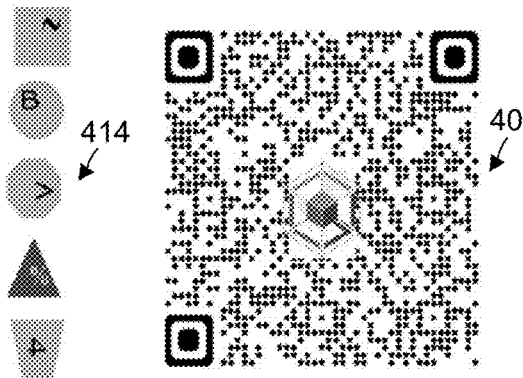

414

SUBSCRIBED AND SWORN TO BEFORE ME, by the said ___Joe Doe___, known to me to be the person whose name and capacity are subscribed to in the foregoing instrument, and acknowledged to me that he executed same for the purposes and consideration therein expressed and, in the capacity, therein stated.

GIVEN UNDER MY HAND AND SEAL OF OFFICE, this, the __10__ day of __June__, 202_3_.

_John Hancock_
Notary Public in and for Dallas County, Texas

FOR FURTHER INFORMATION OR A LIST OF LICENSED AGENTS, VISIT: realtitleblock.com

SYSTEM AND METHOD FOR SECURITY SUITE CONCATENATING VALIDATION ELEMENTS FOR BLOCKCHAIN BINDING OPERATIONS

CROSS-REFERENCE TO RELATED APPLICATIONS

This application claims the benefit of U.S. Provisional Application No. 63/426,955, filed on Nov. 21, 2022, entitled SYSTEM AND METHOD FOR SECURITY SUITE CONCATENATING VALIDATION ELEMENTS FOR BLOCKCHAIN BINDING OPERATIONS, the specifications of which are incorporated by reference herein in their entirety.

TECHNICAL FIELD

This disclosure relates generally to Internet communications and security. More specifically, this disclosure relates to systems and methods for a security suite for concatenating validation elements for blockchain binding operations.

BACKGROUND

Due to the ubiquity of document processing, document imaging, and document editing software available today, it has become increasingly easy for malicious actors to create fraudulent documents, forge signatures, and generally commit acts of identity theft, fraudulent conveyances of property, fraudulent hypothecation of property, such as real property, and or other offenses. Manipulation of documents using such ubiquitous tools can result in substantial losses to the victims of such acts.

SUMMARY

This disclosure relates systems and methods for a security suite for concatenating validation elements for blockchain binding operations.

In one example embodiment, a system for dynamically creating, securing, tokenizing, proving, minting, authenticating, storing, and amending digital documents using a blockchain comprises a scalable server system including at least one processor. The at least one processor is configured to receive a request to generate a digital secured document. The at least one processor is also configured to generate the digital secured document and a unique identifier of the digital secured document. The at least one processor is also configured to construct, within the digital secured document, one or more defined areas for embedding security data. The at least one processor is also configured to embed a plurality of security data in at least one of the one or more defined areas of the digital secured document. The plurality of security data includes the unique identifier of the digital secured document and a scannable code linking the digital secured document to one or more web sources for viewing information pertaining to the digital secured document. The scannable code appears as physical marks embedded in the digital secured document. The scannable code has embedded therein an encrypted message that, when decrypted by the scalable server system, validates an authenticity of the digital secured document. The plurality of security data further includes one or more of a blockchain identifier, a URI to an image of a property associated with the digital secured document, a URI to an image of the digital secured document, a description of the property, and a visual symbol identifying a source of the scalable server system. The at least one processor is also configured to construct, within the secured digital document, one or more defined areas for embedding proof data. The at least one processor is also configured to embed a plurality of proof data in at least one of the one or more of defined areas of digital secured document, wherein the plurality of proof data includes a machine-readable group of shapes and alphanumeric characters in various dimensions, orientations, shading, and placements, wherein the machine-readable group appears as physical marks embedded in the digital secured document proving the truthfulness of the form and content of the digital secured document. The at least one processor is also configured to mint the digital secured document on a blockchain, including generate metadata on the blockchain associated with the digital secured document, store the metadata and one or more images associated with the digital secured document permanently with an on-chain permaweb protocol, and establish on the blockchain a plurality of rules for automatically updating the metadata and/or the digital secured document, wherein the plurality of rules on the blockchain are organized in a non-fungible token (NFT) smart contract. The at least one processor is also configured to log a token identifier associated with the minted digital secured document. The scalable server system includes a front end layer used by the at least one processor to receive the request to generate the digital secured document, and a back end layer used by the at least one processor to process the request. The front end layer includes an ingress controller, wherein the at least one processor is further configured to use the ingress controller to route requests, including the request to generate the digital secured document, to one or more services executed by the back end layer based on a current load balance of the scalable server system. The one or more services executed by the back end layer include one or more application pods, and wherein the at least one processor is further configured to automatically deploy the one or more application pods based on a current demand, wherein the one or more application pods are used by the at least one processor to perform at least the generation and tokenization and minting of the digital secured document.

In one or more of the above examples, to create the encrypted message in the scannable code, the at least one processor is further configured to create, from a combination of data associated with the digital secured document, a unique string, sign the unique string using an elliptical curve cryptography scheme, and embed the encrypted message in the scannable code during creation of the scannable code.

In one or more of the above examples, the at least one processor is further configured to perform authentication of the digital secured document prior to minting the digital secured document, wherein the at least one processor is configured to receive data relating to a scan of the scannable code, identify the encrypted message in the received data, decrypt the encrypted message using the elliptical curve cryptography scheme, validate the authenticity of the digital secured document based on the decryption, and prove the truthfulness of the form and content of the digital secured document.

In one or more of the above examples, the at least one processor is further configured to receive a notification of (i) an event associated with the digital secured document or (ii) new information associated with the digital secured document and, in response, triggering, based on the plurality of rules established on the blockchain, an update event, wherein the update event includes updating the metadata on the blockchain associated with the digital secured document and/or embedding additional security data into the one or more defined areas of the digital secured document.

In one or more of the above examples, to create the machine-readable group, the at least one processor is further configured to create, from a combination of data associated with a proof of logical statements codifying the digital secured document, a zero knowledge proof, and render the machine-readable group for embedding in the secured digital document based on proving the zero knowledge proof.

In one or more of the above examples, the at least one processor is configured to perform proof of the digital secured document prior to minting the digital secured document, including receiving data relating to a scan of the machine-readable group, recognizing shapes, symbols, and alphanumeric characters included in the received data, translating data associated with a digital secured document to recreate the shapes, symbols, and alphanumeric characters included in the received data, and comparing the recreated shapes, symbols, and alphanumeric characters to the shapes, symbols, and alphanumeric characters in the received data.

In another example embodiment, a system for dynamically creating, securing, authenticating, proving, storing, and amending digital documents using a blockchain comprises a scalable server system including at least one processor. The at least one processor is configured to receive a request to generate a digital secured document. The at least one processor is also configured to generate the digital secured document and a unique identifier of the digital secured document. The at least one processor is also configured to construct, within the digital secured document, one or more defined areas for embedding security data. The at least one processor is also configured to embed a plurality of security data in at least one of the one or more defined areas of the digital secured document. The plurality of security data includes a scannable code linking the digital secured document to one or more web sources for viewing information pertaining to the digital secured document. The scannable code has embedded therein an encrypted message that, when decrypted by the scalable server system, validates an authenticity of the digital secured document. The at least one processor is also configured to embed a plurality of proof data in at least one of the one or more defined areas of the digital secured document. The plurality of proof data includes a machine-readable group of shapes and alphanumeric characters in various dimensions, orientations, shadings, and placements. The at least one processor is also configured to mint the digital secured document on a blockchain, including generate metadata on the blockchain associated with the digital secured document, store the metadata and one or more images associated with the digital secured document permanently with an on-chain permaweb protocol, and establish on the blockchain a plurality of rules for automatically updating the metadata and/or the digital secured document. The at least one processor is also configured to log a token identifier associated with the minted digital secured document.

In one or more of the above examples, to create the encrypted message in the scannable code, the at least one processor is further configured to create, from a combination of data associated with the digital secured document, a unique string, sign the unique string using an elliptical curve cryptography scheme, and embed the encrypted message in the scannable code during creation of the scannable code.

In one or more of the above examples, the at least one processor is further configured to perform authentication of the digital secured document prior to minting the digital secured document, wherein the at least one processor is configured to receive data relating to a scan of the scannable code, identify the encrypted message in the received data, decrypt the encrypted message using the elliptical curve cryptography scheme, and validate the authenticity of the digital secured document based on the decryption.

In one or more of the above examples, the at least one processor is further configured to perform proofing of the digital secured document prior to minting the digital secured document, wherein the at least one processor is configured to receive data relating to the declaration and proving of one or more logical statements such logical statements being comprised of one or more of the processes, parameters, functions, and results of one or more of the above examples.

In one or more of the above examples, the at least one processor is further configured to receive a notification of (i) an event associated with the digital secured document or (ii) new information associated with the digital secured document, and in response to receipt of the notification, triggering, based on the plurality of rules established on the blockchain, an update event, wherein the update event includes updating the metadata on the blockchain associated with the digital secured document and/or embedding additional security data into the one or more defined areas of the digital secured document.

In one or more of the above examples, the plurality of security data includes at least the unique identifier of the digital secured document and the token identifier.

In one or more of the above examples, the plurality of security data further includes one or more of a blockchain identifier, a watermark indicating an authentication or recordation status of the digital secured document, a group of shapes and alphanumeric characters in various dimensions, orientations, shadings, and placements indicating proof of the truthfulness of the form and content of the digital secured document, a URI to an image of a property associated with the digital secured document, a URI to an image of the digital secured document, a description of the property, and a visual symbol identifying a source of the scalable server system.

In one or more of the above examples, the scannable code appears as physical marks embedded in the digital secured document, and wherein the at least one processor is further configured to create the scannable code by using a combination of two or more of: a property owner identifier, an agent identifier, a property identifier, the unique identifier of the digital secured document, and the token identifier.

In one or more of the above examples, the machine-readable group of shapes and alphanumeric characters in various dimensions, orientations, shadings, and placements appears as physical marks embedded in the digital secured document, and wherein the at least one processor is further configured to create the machine-readable group by using a combination of two or more of: a random number, a random image, a raster image of one or more color maps, a vector image of one or more color maps, and a translation of one or more color maps.

In one or more of the above examples, the digital secured document is either a document establishing a restriction on a property or a document releasing a restriction on a property.

In one or more of the above examples, the plurality of proof data is a result of the solution to a zero knowledge proof of the proving of one or more logical statements such logical statements being comprised of one or more of the processes, parameters, functions, and results of one or more of the above examples.

In one or more of the above examples, the plurality of rules on the blockchain are organized in a non-fungible token (NFT) smart contract.

In one or more of the above examples, the scalable server system includes a front end layer used by the at least one processor to receive the request to generate the digital secured document, and a back end layer used by the at least one processor to process the request.

In one or more of the above examples, the front end layer includes an ingress controller, and wherein the at least one processor is further configured to use the ingress controller to route requests, including the request to generate the digital secured document, to one or more services executed by the back end layer based on a current load balance of the scalable server system.

In one or more of the above examples, the one or more services executed by the back end layer include one or more application pods, and wherein the at least one processor is further configured to automatically deploy the one or more application pods based on a current demand, wherein the one or more application pods are used by the at least one processor to perform at least the generation and minting of the digital secured document.

In one or more of the above examples, the at least one processor is further configured to embed, as part of the plurality of security data, intentionally altered information into the digital secured document, including at least one of corrupted data, modified data, and false data. The intentionally altered information is derived from at least one of a digitized image, a video, audio, and text data. The at least one processor is further configured to authenticate the digital secured document by extracting and confirming the intentionally altered information from the digital secured document.

In one or more of the above examples, the at least one processor is configured to declare and communicate the truthfulness of the form and content of the digital secured document by presenting and rendering one or more of the proof data as physical marks embedded in the digital secured document. The at least one processor is further configured to prove the truthfulness of the digital secured document by reading, scanning, optically recognizing, and confirming the correctness of the physical marks in the digital secured document.

In another example embodiment, a method for dynamically creating, securing, authenticating, proving, storing, and amending digital documents using a blockchain comprises receiving, by at least one processor of a scalable server system, a request to generate a digital secured document. The method also includes generating, by the at least one processor, the digital secured document and a unique identifier of the digital secured document. The method also includes constructing, by the at least one processor, within the digital secured document, one or more defined areas for embedding security data. The method also includes embedding, by the at least one processor, a plurality of security data in at least one of the one or more defined areas of the digital secured document, wherein the plurality of security data includes a scannable code linking the digital secured document to one or more web sources for viewing information pertaining to the digital secured document, wherein the scannable code has embedded therein an encrypted message that, when decrypted by the scalable server system, validates an authenticity of the digital secured document. The method also includes constructing, by the at least one processor, within the digital secured document, one or more defined areas for embedding proof data. The method also includes embedding, by the at least one processor, a plurality of proof data in at least one of the one or more defined areas of the digital secured document, wherein the plurality of proof data includes a group of machine-readable shapes and alphanumeric characters in various dimensions, orientations, shadings, and placements, wherein the group of machine-readable shapes and alphanumeric characters are therein generated upon the instance of the satisfactory completion of the proving of one or more logical statements wherein such logical statements being comprised of one or more of the processes, parameters, functions, and results of one or more of the above examples, proves the truthfulness of the form and content of the digital secured document. The method also includes minting, by the at least one processor, the digital secured document on a blockchain, including generating metadata on the blockchain associated with the digital secured document, storing the metadata and one or more images associated with the digital secured document permanently with an on-chain permaweb protocol, and establishing on the blockchain a plurality of rules for automatically updating the metadata and/or the digital secured document. The method also includes logging a token identifier associated with the minted digital secured document.

In one or more of the above examples, the method further comprises creating the encrypted message in the scannable code, including creating, from a combination of data associated with the digital secured document, a unique string, signing the unique string using an elliptical curve cryptography scheme, and embedding the encrypted message in the scannable code during creation of the scannable code.

In one or more of the above examples, the method further comprises performing authentication of the digital secured document prior to minting the digital secured document, including receiving data relating to a scan of the scannable code, identifying the encrypted message in the received data, decrypting the encrypted message using the elliptical curve cryptography scheme, and validating the authenticity of the digital secured document based on the decryption.

In one or more of the above examples, the method further comprises performing a zero knowledge proof of the digital secured document prior to minting the digital secured document, including receiving data relating to a scan and optical recognition of the machine-readable group of shapes and alphanumeric characters, confirming the correctness in the received data, verifying the map of regions of one or more colors, and proving the truthfulness of the digital secured document based on the zero knowledge proof.

In one or more of the above examples, the method further comprises creating the evidence of proof of the truthfulness of the form and content of the digital secured document through the rendering of the machine-readable group of shapes and alphanumeric characters, including creating, from a combination of proof data associated with the digital secured document, a random number, a unique map of regions of one or more colors, and revealing the evidence of proof of truthfulness of the form and content of the digital secured document as evidenced by the presence of the machine-readable group of shapes and alphanumeric characters during creation of the machine-readable group of shapes and alphanumeric characters.

In one or more of the above examples, the method further includes constructing, within the secured digital document, one or more defined areas for embedding proof data and embedding a plurality of proof data in at least one of the one or more of defined areas of digital secured document, wherein the plurality of proof data includes a machine-readable group of shapes and alphanumeric characters in various dimensions, orientations, shading, and placements, and wherein the machine-readable group appears as physical marks embedded in the digital secured document.

In one or more of the above examples, creating the machine-readable group includes creating, from a combination of data associated with a proof of logical statements codifying the digital secured document, a zero knowledge proof and rendering the machine-readable group for embedding in the secured digital document based on proving the zero knowledge proof.

In one or more of the above examples, the method further includes performing proof of the digital secured document after authenticating the digital secured document, including receiving data relating to a scan of the machine-readable group, recognizing shapes, symbols, and alphanumeric characters included in the received data, translating data associated with a digital secured document to recreate the shapes, symbols, and alphanumeric characters included in the received data, and comparing the recreated shapes, symbols, and alphanumeric characters to the shapes, symbols, and alphanumeric characters in the received data.

In one or more of the above examples, the method further comprises receiving, by the at least one processor, a notification of (i) an event associated with the digital secured document or (ii) new information associated with the digital secured document, and in response to receiving the notification, triggering, based on the plurality of rules established on the blockchain, an update event, wherein the update event includes updating the metadata on the blockchain associated with the digital secured document and/or embedding additional security data into the one or more defined areas of the digital secured document.

In one or more of the above examples, the plurality of security data includes at least the unique identifier of the digital secured document and the token identifier.

In one or more of the above examples, the plurality of proof data includes at least the group of machine-readable shapes and alphanumeric characters in various dimensions, orientations, shadings, and placements.

In one or more of the above examples, the plurality of security data further includes one or more of a blockchain identifier, a watermark indicating an authentication or recordation status of the digital secured document, a group of machine-readable shapes and alphanumeric characters in various dimensions, orientations, shadings, and placements, a URI to an image of a property associated with the digital secured document, a URI to an image of the digital secured document, a description of the property, and a visual symbol identifying a source of the scalable server system.

In one or more of the above examples, the scannable code appears as physical marks embedded in the digital secured document and the method further comprising creating, by the at least one processor, the scannable code using a combination of two or more of a property owner identifier, an agent identifier, a property identifier, the unique identifier of the digital secured document, and the token identifier.

In one or more of the above examples, the machine-readable group of shapes and alphanumeric characters in various dimensions, orientations, shadings, and placements appears as physical marks embedded in the digital secured document, and wherein the at least one processor is further configured to create the machine-readable group by using a combination of two or more of: a random number, a random image, a raster image of one or more color maps of regions, a vector image of one or more color maps of regions, and a translation of one or more color maps of regions.

In one or more of the above examples, the digital secured document is either a document establishing a restriction on a property or a document releasing a restriction on a property.

In one or more of the above examples, the plurality of rules on the blockchain are organized in a non-fungible token (NFT) smart contract.

In one or more of the above examples, the scalable server system includes a front end layer used by the at least one processor to receive the request to generate the digital secured document, and a back end layer used by the at least one processor to process the request.

In one or more of the above examples, the front end layer includes an ingress controller, the method further comprising using, by the at least one processor, the ingress controller to route requests, including the request to generate the digital secured document, to one or more services executed by the back end layer based on a current load balance of the scalable server system.

In one or more of the above examples, the one or more services executed by the back end layer include one or more application pods, the method further comprising automatically deploying, by the at least one processor, the one or more application pods based on a current demand, wherein the one or more application pods are used by the at least one processor to perform at least the generating and minting of the digital secured document.

In one or more of the above examples, the method further comprises embedding, as part of the plurality of security data, intentionally altered information into the digital secured document, including at least one of corrupted data, modified data, and false data, wherein the intentionally altered information is derived from at least one of a digitized image, a video, audio, and text data, and authenticating the digital secured document by extracting and confirming the intentionally altered information from the digital secured document.

In another example embodiment, a system for dynamically creating, securing, and amending digital documents using a blockchain includes a scalable server system including at least one processor. The at least one processor is configured to receive a request to generate a digital secured document. The at least one processor is also configured to generate the digital secured document and a unique identifier of the digital secured document. The at least one processor is also configured to construct, within the digital secured document, one or more defined areas for embedding security data. The at least one processor is also configured to construct, within the digital secured document, one or more areas for embedding proof data. The at least one processor is also configured to embed a plurality of proof data in at least one of the one or more defined areas of the digital secured document. The plurality of proof data includes a machine-readable group of shapes and alphanumeric characters in various dimensions, orientations, shadings, and placements. The at least one processor is also configured to tokenize and mint the digital secured document on a blockchain, including generate metadata on the blockchain associated with the digital secured document and establish on the blockchain a plurality of rules for automatically updating the metadata and/or the digital secured document, wherein the plurality of rules on the blockchain are organized in a non-fungible token (NFT) smart contract. The at least one processor is also configured to assign a token identifier associated with the tokenized and minted digital secured document. The at least one processor is also configured to embed a plurality of security data in at least one of the one or more defined areas of the digital secured document, wherein the plurality of security data includes at least the unique identifier of the digital secured document and the token identifier. The plurality of security data further includes one or more of a blockchain identifier, a scannable code linking the digital secured document to one or more web sources for viewing information pertaining to the digital secured document, wherein the scannable code appears as physical marks embedded in the digital secured document, and wherein the at least one processor is further configured to create the scannable code by the at least one processor using a combination of two or more of a property owner identifier, an agent identifier, a property identifier, the unique identifier of the digital secured document, and the token identifier, a watermark indicating an authentication or recordation status of the digital secured document, a machine-readable group of shapes and alphanumeric characters in various dimensions, orientations, shadings, and placements, a URI to an image of the digital secured document, a URI to an image of a property associated with the digital secured document, a description of the property, and a visual symbol identifying a source of the scalable server system. The at least one processor is also configured to receive a notification of (i) an event associated with the digital secured document or (ii) new information associated with the digital secured document and, in response, triggering, based on the plurality of rules established on the blockchain, an update event, wherein the update event includes updating the metadata on the blockchain associated with the digital secured document and/or embedding additional security data into the one or more defined areas of the digital secured document. The scalable server system includes a front end layer used by the at least one processor to receive the request to generate the digital secured document, and a back end layer used by the at least one processor to process the request. The front end layer includes an ingress controller, and wherein the at least one processor is further configured to use the ingress controller to route requests, including the request to generate the digital secured document, to one or more services executed by the back end layer based on a current load balance of the scalable server system. The one or more services executed by the back end layer include one or more application pods, and wherein the at least one processor is further configured to automatically deploy the one or more application pods based on a current demand, wherein the one or more application pods are used by the at least one processor to perform at least the generation and tokenization and minting of the digital secured document.

In one or more of the above examples, the digital secured document is either a document establishing a restriction on a property or a document releasing a restriction on a property.

In another example embodiment, a system for dynamically creating, securing, and amending digital documents using a blockchain includes a scalable server system including at least one processor. The at least one processor is configured to receive a request to generate a digital secured document. The at least one processor is also configured to generate the digital secured document and a unique identifier of the digital secured document. The at least one processor is also configured to construct, within the digital secured document, one or more defined areas for embedding security data. The at least one processor is also configured to construct, within the digital secured document, one or more areas for embedding proof data. The at least one processor is also configured to embed a plurality of proof data in at least one of the one or more defined areas of the digital secured document. The at least one processor is also configured to tokenize and mint the digital secured document on a blockchain, including generate metadata on the blockchain associated with the digital secured document and establish on the blockchain a plurality of rules for automatically updating the metadata and/or the digital secured document. The at least one processor is also configured to receive a token identifier associated with the tokenized and minted digital secured document. The at least one processor is also configured to embed a plurality of security data in at least one of the one or more defined areas of the digital secured document. The at least one processor is also configured to receive a notification of (i) an event associated with the digital secured document or (ii) new information associated with the digital secured document and, in response, triggering, based on the plurality of rules established on the blockchain, an update event, wherein the update event includes updating the metadata on the blockchain associated with the digital secured document and/or embedding additional security data and proof data into the one or more defined areas of the digital secured document.

In one or more of the above examples, the plurality of security data includes at least the unique identifier of the digital secured document and the token identifier.

In one or more of the above examples, the plurality of proof data includes at least the group of machine-readable shapes and alphanumeric characters in various dimensions, orientations, shadings, and placements.

In one or more of the above examples, the plurality of security data further includes one or more of a blockchain identifier, a scannable code linking the digital secured document to one or more web sources for viewing information pertaining to the digital secured document, a watermark indicating an authentication or recordation status of the digital secured document, a machine-readable group of shapes and alphanumeric characters in various dimensions, orientations, shadings, and placements, a URI to an image of the digital secured document, a URI to an image of a property associated with the digital secured document, a description of the property, and a visual symbol identifying a source of the scalable server system.

In one or more of the above examples, the scannable code appears as physical marks embedded in the digital secured document, and the at least one processor is further configured to create the scannable code by the at least one processor using a combination of two or more of: a property owner identifier, an agent identifier, a property identifier, the unique identifier of the digital secured document, and the token identifier.

In one or more of the above examples, the machine-readable group of shapes and alphanumeric characters in various dimensions, orientations, shadings, and placements appears as physical marks embedded in the digital secured document, and wherein the at least one processor is further configured to create the machine-readable group by the at least one processor using a combination of two or more of: a random number, a random image, a raster image of one or more color maps of regions, a vector image of one or more color maps of regions, and a translation of one or more color maps of regions.

In one or more of the above examples, the digital secured document is either a document establishing a restriction on a property or a document releasing a restriction on a property.

In one or more of the above examples, the plurality of rules on the blockchain are codified in a non-fungible token (NFT) smart contract.

In one or more of the above examples, the scalable server system includes a front end layer used by the at least one processor to receive the request to generate the digital secured document, and a back end layer used by the at least one processor to process the request.

In one or more of the above examples, the front end layer includes an ingress controller, and the at least one processor is further configured to use the ingress controller to route requests, including the request to generate the digital secured document, to one or more services executed by the back end layer based on a current load balance of the scalable server system.

In one or more of the above examples, the one or more services executed by the back end layer include one or more application pods, and the at least one processor is further configured to automatically deploy the one or more application pods based on a current demand, wherein the one or more application pods are used by the at least one processor to perform at least the generation and tokenization and minting of the digital secured document.

In another example embodiment, a method for dynamically creating, securing, and amending digital documents using a blockchain includes receiving, by at least one processor of a scalable server system, a request to generate a digital secured document. The method also includes generating, by the at least one processor, the digital secured document and a unique identifier of the digital secured document. The method also includes constructing, by the at least one processor, within the digital secured document, one or more defined areas for embedding security data. The method also includes constructing, by the at least one processor, within the digital secured document, one or more defined areas for embedding proof data. The method also includes tokenizing and minting, by the at least one processor, the digital secured document on a blockchain, including generating metadata on the blockchain associated with the digital secured document and establishing on the blockchain a plurality of rules for automatically updating the metadata and/or the digital secured document. The method also includes receiving a token identifier associated with the tokenized and minted digital secured document. The method also includes embedding, by the at least one processor, a plurality of security data in at least one of the one or more defined areas of the digital secured document. The method also includes embedding, by the at least one processor, a plurality of proof data in at least one of the one or more defined areas of the digital secured document. The method also includes receiving, by the at least one processor, a notification of (i) an event associated with the digital secured document or (ii) new information associated with the digital secured document and, in response, triggering, based on the plurality of rules established on the blockchain, an update event, wherein the update event includes updating the metadata on the blockchain associated with the digital secured document and/or embedding additional security data into the one or more defined areas of the digital secured document.

In one or more of the above examples, the plurality of security data includes at least the unique identifier of the digital secured document and the token identifier.

In one or more of the above examples, the plurality of security data further includes one or more of a blockchain identifier, a scannable code linking the digital secured document to one or more web sources for viewing information pertaining to the digital secured document, a watermark indicating an authentication or recordation status of the digital secured document, a machine-readable group of shapes and alphanumeric characters in various dimensions, orientations, shadings, and placements indicating evidence of proof, a URI to an image of the digital secured document, a URI to an image of a property associated with the digital secured document, a description of the property, and a visual symbol identifying a source of the scalable server system.

In one or more of the above examples, the scannable code appears as physical marks embedded in the digital secured document and the method further includes creating, by the at least one processor, the scannable code using a combination of two or more of: a property owner identifier, an agent identifier, a property identifier, the unique identifier of the digital secured document, and the token identifier.

In one or more of the above examples, the machine-readable group of shapes and alphanumeric characters in various dimensions, orientations, shadings, and placements appears as physical marks in the digital secured document, and the method further includes creating, by the at least processor, the machine-readable group by the at least one processor using a combination of two or more of: a random number, a random image, a raster image of one or more color maps of regions, a vector image of one or more color maps of regions, and a translation of one or more color maps of regions.

In one or more of the above examples, the digital secured document is either a document establishing a restriction on a property or a document releasing a restriction on a property.

In one or more of the above examples, the plurality of rules on the blockchain are codified in a non-fungible token (NFT) smart contract.

In one or more of the above examples, the scalable server system includes a front end layer used by the at least one processor to receive the request to generate the digital secured document, and a back end layer used by the at least one processor to process the request.

In one or more of the above examples, the front end layer includes an ingress controller, the method further includes using, by the at least one processor, the ingress controller to route requests, including the request to generate the digital secured document, to one or more services executed by the back end layer based on a current load balance of the scalable server system.

In one or more of the above examples, the one or more services executed by the back end layer include one or more application pods, the method further includes validly deploying, by the at least one processor, the one or more application pods based on a current demand, wherein the one or more application pods are used by the at least one processor to perform at least the generating and tokenizing and minting of the digital secured document.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, an image sensor, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding, reference is now made to the following description taken in conjunction with the accompanying Drawings in which:

FIG. 4A illustrates an example secure release document in accordance with embodiments of this disclosure;

FIG. 16C illustrates an example of source data from a secure document in accordance with various embodiments of this disclosure;

FIG. 16D illustrates a visualization of a mapping of a topological model onto a multi-dimensional surface model in accordance with embodiments of this disclosure.

DETAILED DESCRIPTION

Figure 1:
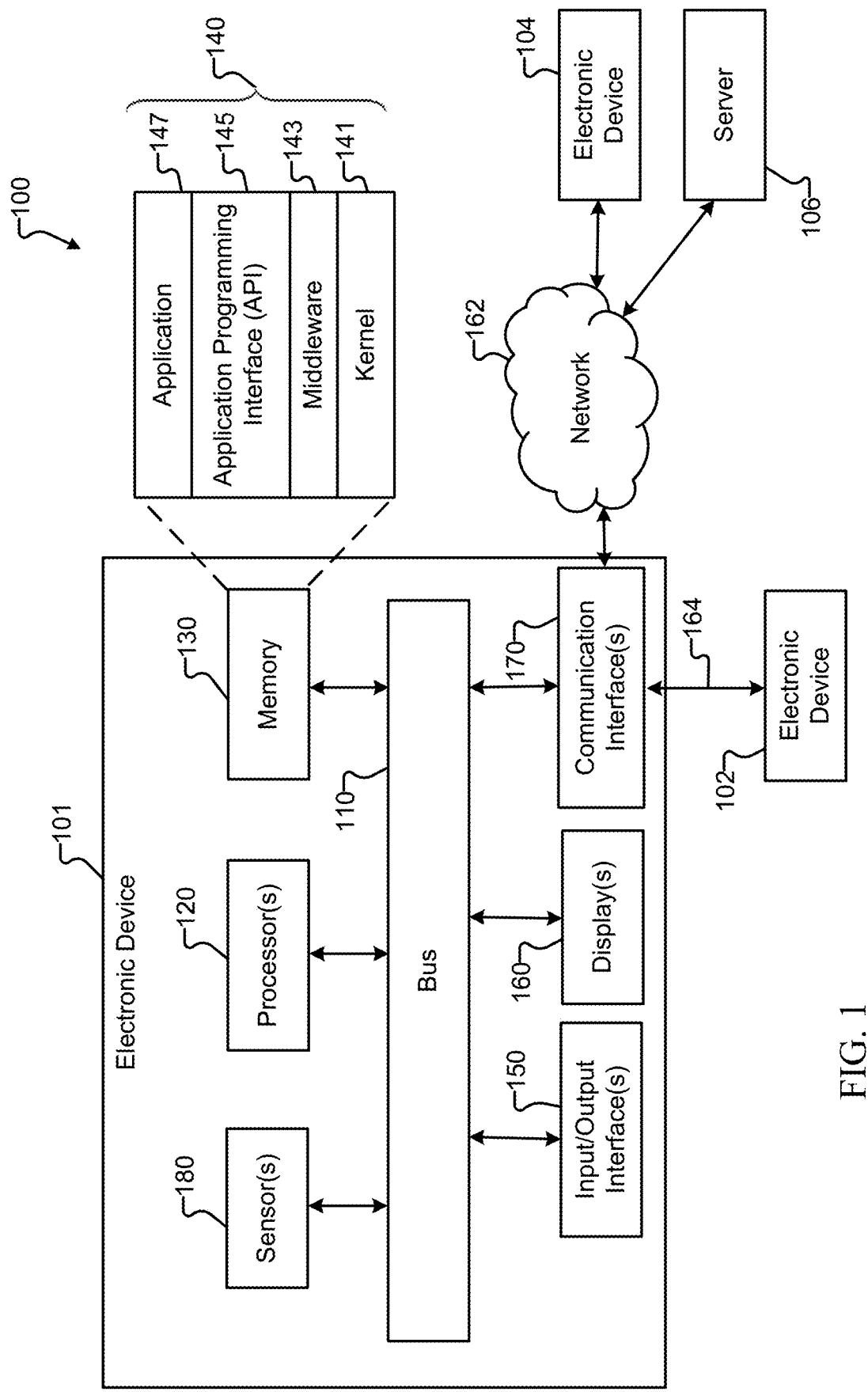
FIG. 1 illustrates an example network configuration including an electronic device in accordance with embodiments of this disclosure.

FIGS. 1 through 16E, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

Due to the ubiquity of document processing, document imaging, and document editing software available today, it has become increasingly easy for malicious actors to create fraudulent documents, forge signatures, and generally commit acts of identity theft, fraudulent conveyances of property, fraudulent hypothecation of property, such as real property, and/or other offenses. Manipulation of documents using such ubiquitous tools can result in substantial losses to the victims of such acts.

For example, in addition to problems in real estate ownership such as property damage, property encroachment, property trespass, and other property impairment, there exists a potential for the fraudulent conveyance and fraudulent hypothecation of real property. This real estate fraud activity only requires that a criminal submits and records a fraudulent filing of a non-authenticated paper document or PDF document in public deed records that buyers or lenders believe is real and valid. Often, this real estate fraud activity is unhindered and is not discovered until after the fact, and requires significant, time, money, and effort, including the engagement of lawyers to unwind the fraudulent transaction and remove the cloud it created upon title to the real property in question.

To alleviate the above issues, embodiments of this disclosure provide for systems and methods for a security suite concatenating validation elements for blockchain binding operations. Various embodiments of this disclosure provide for a multi-layer security stack applied to documents to thwart acts of fraud such as those discussed above. This multi-layer security stack includes using a blockchain binding system to generate, sign, notarize, mint, and record authenticated and proved documents that verify a user's identity and intent, and deter and restrict attempts to initiate subsequent transactions. Embodiments of this disclosure generate secured documents using tokenization and minting of non-fungible tokens (NFTs) through remote procedure calls (RPC) to blockchain ledgers via an application programming interface (API) that controls blockchain operations. The API consumes data provided from a client application and transforms the data into secured digital assets utilizing the multi-layer security stack. Embodiments of the systems and methods of this disclosure eschew the traditional NFT flow, and instead involve minting of NFTs by updating NFT metadata in multiple steps. Minting of NFTs in various embodiments can thus utilize dynamic NFTs to allow for these multiple updates. Such dynamic NFTs can retain their unique IDs while allowing for updates to their metadata by encoding alterations within an NFT, such as within an NFT smart contract, to provide instructions to the underlying NFT regarding when and how its metadata should change. Various embodiments of this disclosure also utilize an automatically load balanced and scalable system for managing multiple and concurrent requests.

For example, the systems and methods of this disclosure can be used to impede real property fraud by the generation of a technically sophisticated, highly authenticated, and secured document, e.g., a "Notice of Restrictions," which places a proactive, preemptive encumbrance or barrier on the title of real property against any transaction that would affect the title of the subject real property from occurring without authentication and permission after the date of filing. The Notice of Restrictions may only be affected by generating a technically sophisticated, highly authenticated, proved and secured document that modifies, releases, or removes the proactive, preemptive encumbrance or barrier on the real property, e.g., a "Release of Restrictions". In this example, both the Notice of Restrictions and the Release of Restrictions are secured using the multi-layer security stack to mint and tokenize the documents, verify a user's identity and intent, and deter and restrict attempts to initiate subsequent transactions.

The systems and methods of this disclosure provide distinct advantages that include both a proactive advantage and a preemptive advantage. This disclosure provides a proactive advantage because the systems and methods act in advance to void and nullify any transaction document filed in the future. This disclosure also provides a preemptive advantage because the systems and methods singularly reveal and emphasize the fraudulent intention and absence of validity and authenticity of transaction documents filed after a first secured document (e.g., a Notice of Restrictions).

In some embodiments of this disclosure, the systems and methods can be used to impede and prevent real estate property fraud. For example, fraudulent conveyance and fraudulent hypothecation of real property typically only requires that a criminal submits a fraudulent filing of a non-authenticated paper document or PDF document in public deed records that buyers or lenders believe is real and valid. The systems and methods of this disclosure can be used to impede real property fraud by generation of a technically sophisticated, highly authenticated, and secured document that places a proactive, preemptive encumbrance or barrier on the real property against any transaction of the subject real property from occurring without authentication by and permission from the system after the date of filing. The system disables and removes the Notice of Restrictions by generating a technically sophisticated, highly authenticated, and secured document that modifies, releases, or removes the proactive, preemptive encumbrance or barrier on the real property (the "Release of Restriction"). The Notice of Restriction remains in force and effect if a real property owner does not or will not authorize the Release of Restriction.

The security suite of the various embodiments of this disclosure includes a plurality of security protocols and features including authentication of the relationship between a service provider, e.g., a real estate title company, and a client, e.g., a real property owner, and authentication of the entirety of the signed, notarized, digitized, and recorded secure documents. The security suite using these modern security protocols and features creates a robust authentication and verification process. In addition to the protections provided by the security protocols and features that generate and protect the secure documents described above, in some embodiments, additional security protocols can be used by the systems such as Transport Layer Security (TLS) 1.3, Multi Factor Authentication utilizing a Time-Based One-Time Password Algorithm, a blockchain Proof of Stake (PoS) Consensus Validation utilizing Byzantine fault tolerance (pBFT), and an Edwards Curve Digital Signature Algorithm (Ed448-Goldilocks).

In various embodiments of this disclosure, the systems and methods using the security suite can be exclusively accessible through vetted and authorized agents, such as title agents working for title companies vetted and authorized by a central entity. The agents in turn use the systems and methods to authenticate their relationship with the clients such as real property owners. In various embodiments, the clients, although they may be generally restricted from accessing the system, can also use a secured portion of the system to acknowledge and consent to the generation and security applied to the secure documents, such as acknowledging and consenting to the generating and securing of Notice of Restrictions and Release of Restrictions. This process allows the system to remain exclusively used by the vetted and authorized agents, while being able to authenticate the identity and intention of the client. The systems and methods of this disclosure provides for impeding and precluding fraudulent activities. Thwarting fraud results in greatly reducing the risk of, and potentially high cost of, removing clouds on and other impairments to property.

The systems and methods of this disclosure eliminate the missing ability to constructively and proactively establish, confirm, and enforce the authenticity of the signatory, notary, and transaction, and the authenticity of the entirety of the relationship between the signatory, notary, and transaction. The various embodiments of this disclosure provide for a combination of digital security, blockchain tokenization, archival and retrieval of immutable metadata from the decentralized web with non-predictable results, incorporated into a paper or document that is physically or digitally recorded and placed into a chain of title or other public record for the property in question.

The systems and methods of this disclosure provides numerous practical benefits including that (i) the original signatory is compelled to comply with the secure system, non-users of the system adopt and enforce compliance of the system on users, (ii) the elevation to the decentralized web of the authentication metadata optimizes searches, such as by a real property description and physical address, and (iii) there is emphasis of the fraudulent intent or deficient nature of non-permitted filings of transaction documents. The systems and methods of this disclosure thus provide a barrier and authentication service, provide proactive and preemptive advantages, and are persistent. Other attempted solutions to the problems described herein only provide for third-party monitoring and alert services, are passive and non-preemptive, and are subscriptive in nature.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, at least one input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). In some cases, the processor 120 can receive and process inputs, such as security and authentication requests, requests for secure document generation, requests for QR code generation, requests for document proving and/or proof data generation and embedding, requests for NFT minting operations, etc. The processor 120 can also instruct other devices to perform certain operations, such as instructing other devices to perform NFT minting, provide authentication details, etc.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications supporting the generation, digitization, minting, and transmission of secure documents. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, display control, image processing, or text control.

The I/O interfaces 150 serve as an interface that can, for example, transfer commands or data input from a user or other external devices to other component(s) of the electronic device 101. The I/O interfaces 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WIFI, BLUETOOTH, near field communications (NFC), long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network. In some embodiments, the communication interface can be a power interface to provide electrical power to another electronic device or charge the electronic device, such as a via a wired connection, e.g., NEMA, IEC, USB, USB-C cables, Power over Ethernet (PoE), etc., or a wireless connection, e.g., induction or resonant charging.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can support exchange of information between electronic devices, such as by receiving user input or information associated with user input from one device and providing the user input or the information associated with the user input (with or without processing by the server 106) to another device.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
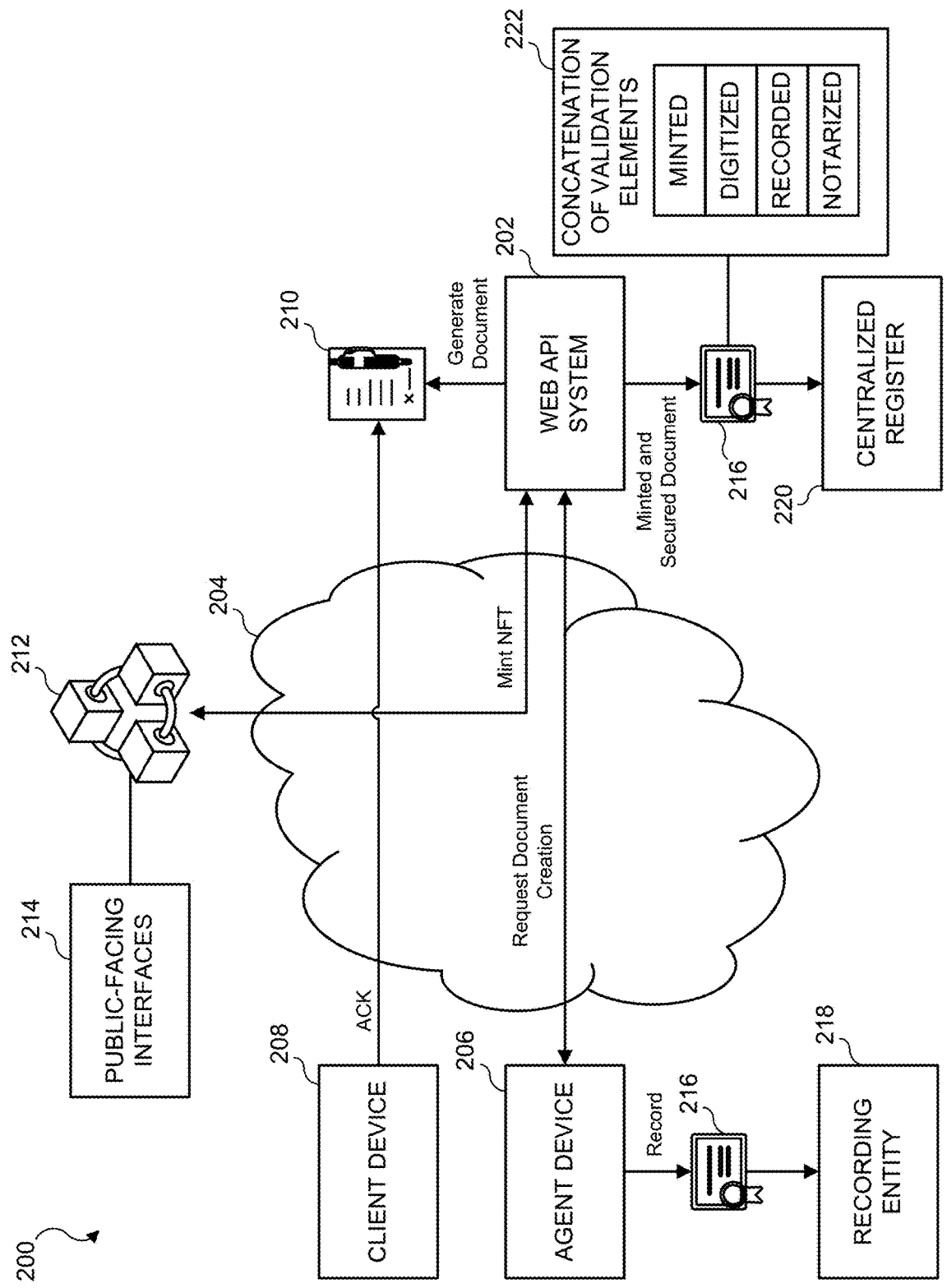
FIG. 2 illustrates an example document generation and security system in accordance with embodiments of this disclosure.

FIG. 2 illustrates an example document generation and security system 200 in accordance with embodiments of this disclosure. For ease of explanation, the system 200 is described as being used as part of the network configuration 100 to support the exchange of information between electronic devices (such as multiple instances of the electronic device 101, server 106, etc.).

The system 200 includes a web API system 202. In some embodiments, the web API system 202 can be part of a scalable server system, such as described with respect to FIG. 6 for example. The web API system 202 is in communication with other devices over a network 204, such as an agent device 206 and a client device 208. In various embodiments, the web API system 202, the agent device 206, and the client device 208, etc. each is, or incorporates components similar to, electronic device 101. In various embodiments, the web API system 202 can be at least a part of the server 106. In embodiments of this disclosure, the agent device 206 can initiate secure document creation by transmitting a document creation request to the web API system 202. In some embodiments, prior to accepting a document creation request, the agent device 206 first is authenticated using a multi-factor authentication (MFA) process in which both a username and password as well as an authentication code must be provided and passed by the web API system 202 prior to accepting transmissions or requests from the agent device 206.

The agent device 206, as part of the document creation request, can provide information to the web API system 202 using a front end web application. For example, the agent device 206 can provide, using the front end web application, a document type selection, property owner information, and a legal description of the property, which is transmitted to the web API system 202. Upon receiving the document creation request from the agent device 206, the web API system 202 can generate an initial document 210 and then transmit a client authorization request including a preview image of the document 210 to the client device 208. In some embodiments, only a preview image is initially created. The client authorization request can be received and presented on the client device 208 using a dedicated application executed on the client device 208, using a web-based front end application, via email or text including a selectable link that redirects the client device to a web source for providing authorization, etc. The client device 208, upon receiving an instruction from a user either accepting or denying the creation of the document 210, transmits the acknowledgement of the user's selection over the network 204 to the web API system 202. If the client device 208 transmits a denial message in response to the authorization request, the overall document creation request can be aborted. If the client device 208 sends an authorization message in response to the authorization request, the processes carried out by the system 200 continues.

If the web API system 202 receives an authorization message from the client device 208, the web API system 202 can generate the document 210, if not already generated such as if only a preview image was previously created. The web API system 202 can then transmit to the client device 208 the document 210 for signing, such as via application of a digital signature by the client device 208. In some embodiments, the document 210 can be transmitted to the agent device 206, such that the agent can obtain the client's signature on the document 210, either with a physical or digital signature. After receiving the signed document 210, the web API system 202 can access a blockchain 212. In various embodiments, the web API system 202 controls all read and write operations with the blockchain 212, such as via remote procedure calls (RPC) to blockchain ledgers associated with the blockchain 212.

The web API system 202 mints the document 210 using the blockchain 212 and embeds various information into the document 210, such as an identification of the blockchain 212, an NFT minting token ID that uniquely identifies the document as an NFT, a unique scannable code generated by the web API system 202, a document name, a symbol, icon, or image that provides a source identification, such as the identity of the system 200 and/or the agent using the agent device 206, a document identifier that uniquely identifies the document within the web API system 202 or within other systems, and other information such as information on a property, such as a legal description of the property, a link or URI to an image of the digital secured document, a link or URI to an image of the property, etc. The unique scannable code can be in the form of a QR code in some embodiments. The scannable code can for example be a unique 117×117 scan code to embed in the document using a combination of unique owner, agent, and property IDs or keys in addition to an NFT ID, and appearing as physical marks on the document. The scannable code can be scanned using other electronic devices to direct the other electronic devices to view more information regarding the document, such as via the public-facing interfaces 214. This process results in the creation of a minted and secured document 216.

Public-facing interfaces 214, for example web-based interfaces such as web browser interfaces, can access the blockchain 212 to view information stored on the blockchain 212, such as information on documents minted using the system 200. In some embodiments, devices can be directed to use the public-facing interfaces 214 to view information on the blockchain 212 in response to scanning a scan code such as a QR code embedded within the document. In some embodiments, scanning the scan code allows users to view information on public servers associated with the web API system 202.

The minted and secured document 216 is then transmitted to the agent device 206 for recording with a recording entity 218. For example, the recording entity 218 can be a county deeds office that records documents associated with properties, such as title documents, liens, and the secure and minted document 216, e.g., a Notice of Restrictions or a Release of Restrictions. Once the minted document is recorded, the agent device 206 notifies, by upload of an image of the recorded document and entry of the recording entity document number or filing number, the web API system 202 of the successful recordation of the minted and secured document. In various embodiments, metadata on the blockchain 212 associated with the minted document 216 can be updated in multiple steps. For example, the document 216 may be minted prior to the client signing the document 216, and the web API system 202 then updates the document 216 to be the signed version and updates the metadata on the blockchain 212 associated with the NFT for the document to show a signed status in the NFT metadata. In some embodiments, the document 216 can be minted as an NFT, and then the document 216 and the NFT metadata are updated with additional information as it is generated or becomes available, such as with the scannable code information, property image information, etc. In some embodiments, once the document 216 is recorded with the recording entity, the document 216 and its NFT metadata can be updated, such as by applying a watermark to the document 216 indicating the document is recorded and/or authenticated, and updating the NFT metadata to indicate that the document 216 has been recorded and/or authenticated.

For example, the systems and methods of this disclosure can be used to impede or block real property fraud by the generation of a technically sophisticated, highly authenticated, and secured document, e.g., a "Notice of Restrictions," which places a proactive, preemptive encumbrance or barrier on the title of real property against any transaction that would affect the title of the subject real property from occurring without authentication and permission after the date of filing. For example, a restriction document can be created in the real estate context whenever a property owner wishes to buy, sell, pledge, encumber or otherwise affect title to its property including the total or partial release and modification of any of the foregoing. The Notice of Restrictions may only be affected by generating a technically sophisticated, highly authenticated, and secured document that modifies, releases, or removes the proactive, preemptive encumbrance or barrier on the real property, e.g., a "Release of Restrictions". In this example, both the Notice of Restrictions and the Release of Restrictions are secured using the multi-layer security stack to mint and tokenize the documents, verify a user's identity and intent, and deter and restrict attempts to initiate subsequent transactions. A property owner may engage the services of an agent when the current owner wishes to create a block, when the current owner wishes to create a block while refinancing, when a new purchasing owner wishes to create a block while purchasing new property, when the current owner wishes to create a release of a block when selling, when the current owner wishes to update a block while refinancing, etc.

In embodiments of this disclosure, the minted and secured document 216 is also stored in a centralized register 220 associated with the web API system 202. A copy of the secure document 216, now protected via a security stack 222 that includes at least information indicating that the secure document 216 is minted, digitized, recorded, and notarized, can be stored in the centralized register 220 in association with identifications including a unique ID for the secure document 216, the NFT token, the document name, the owner/client name, the agent name, etc. Upon completion of the secure document creation, minting, and recordation process, the web API system 202 can transmit a completion notification to the client device 208, along with copies of the document(s) and information for viewing the document and/or its metadata using the public-facing interfaces 214. For example, using a web browser to view the document 216 allows for others to freely access the document 216 as it remains visible and persistent over network and Internet connections, which provides for excellent archiving of the intent of the property owner. Scanning of the scannable code also allows users to quickly view information regarding the document 216, such as blockchain metadata. The document 216 can be minted as a dynamic NFT, allowing for the metadata to be updated over time, and viewing of the metadata informs users of the status of the NFT and the document 216.

Although FIG. 2 illustrates one example of a document generation and security system 200 various changes may be made to FIG. 2. For example, various components or functions shown or described may be combined, further subdivided, replicated, omitted, or rearranged and additional components or functions may be added according to particular needs. In general, this disclosure is not limited to any particular system configuration.

Figure 3A:
FIG. 3A illustrates an example secure restriction document in accordance with embodiments of this disclosure.

FIG. 3A illustrates an example secure restriction document 300 in accordance with embodiments of this disclosure. In various embodiments, the restriction document 300 can be the minted document 216 described with respect to FIG. 2. The restriction document 300 includes various information depending on the nature of the document. For example, as shown in FIG. 3A, the restriction document 300 includes a property description area 302 including a description of a subject property that a restriction is being placed on. For example, if the property is real estate, the property description area 302 can include a legal description of the property, such as including block or parcel information, county recording information, addresses, etc.

The restriction document 300 also includes a notice area 304 that describes the nature of the document. For example, as shown in FIG. 3A, the restriction document 300 can be a "Notice of Restrictions" document that includes a statement (s) in the notice area 304 that indicates the property designated in the property description area 302 is being restricted from any attempted modification, for example a title transfer, and that such attempted modifications are void and ineffective unless authenticated and authorized using the system 200 described herein. The restriction document 300 therefore notifies others that a technology dependent condition exists such that proper release of the restrictions is required for any subsequent property modifications to be valid and enforceable. As described in various embodiments of this disclosure, the restrictions placed on the property via the restriction document 300 may only be lifted via the minting and recording of a subsequent release document created and secured using the system 200.

As further shown in FIG. 3A, the restriction document 300 can further include a property owner designation and signature area 306, which can include the owner name, a line for the owner's physical or digital signature to be applied, and can also be accompanied by a notarization. The restriction document 300 further includes a scannable code 308, such as a dynamic QR code, which can be scanned by an electronic device to provide one or more links to view information concerning the document, such as NFT data and restriction/release status information.

The restriction document 300 further includes a blockchain authentication data area 310 that includes various embedded security and blockchain information concerning the restriction document 300, such as a blockchain identifier, a blockchain/NFT token, a document name, a symbol designation that can identify the system that generated the restriction document 300, a unique identifier for the document, a URI to an image of the digital secured document, and/or, in some embodiments, a URI for an image of the property. Once the restriction document 300 is created, signed, encoded, and minted/tokenized, the restriction document 300 can be recorded to put others on notice of the restriction notice included in the notice area 304 of the restriction document 300.

Figure 3B:
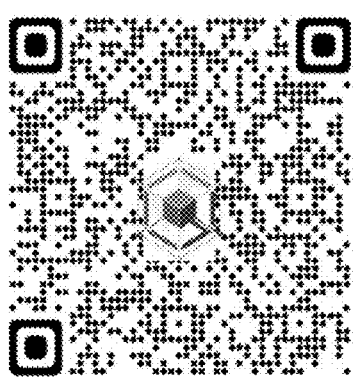
FIG. 3B illustrates an example secure restriction document that includes optional embedded visual validity information in accordance with embodiments of this disclosure.

In some embodiments, such as shown in FIG. 3B, which illustrates an example secure restriction document 300 that includes optional embedded visual validity information in accordance with embodiments of this disclosure, once the restriction document 300 is finalized and recorded, optional embedded visual validity information can be additionally added to the document. For example, a watermark 312 can be applied over the restriction document 300 to designate that the creation, minting, securing, and recording of the document is complete. Users viewing the document, such as via the public-facing interfaces 214, may see the watermark 312 to be made aware that the full process to secure and record the restriction document has been completed.

Additionally or alternatively, a plurality of poof data 314 can be embedded within the restriction document 300. In various embodiments, this plurality of proof data 314 is visually represented on the restriction document 300 as a machine-readable group of shapes and alphanumeric characters in various dimensions, orientations, shadings, and placements, appearing as physical marks embedded in the digital secured document. In various embodiments, an electronic device creates the machine-readable group of proof data 314 by using a combination of two or more of a random number, a random image, a raster image of one or more color maps, a vector image of one or more color maps, and a translation of one or more color maps. In some embodiments, the plurality of proof data 314 is a result of the solution to a zero knowledge proof of the proving of one or more logical statements, such logical statements being comprised of one or more of the processes, parameters, functions, and results of one or more of the above examples, where the results of the zero knowledge proof are used to generate the particular shapes and alphanumeric characters, as well as display properties such as dimensions, orientations, shadings, and placements of the plurality of proof data 314.

Although FIGS. 3A and 3B illustrate examples of a restriction document 300, various changes may be made to FIGS. 3A and 3B. For example, the information presented on the restriction document 300 can be rearranged, such as by rearranging the locations within the restriction document 300 of one or more of the property description area 302, the notice area 304, the property owner designation and signature area 306, the scannable code 308, the blockchain authentication data area 310, and the plurality of proof data 314. Additionally, the restriction document 300 is but one example of a document that can be generated, secured, tokenized, and minted using the various embodiments of this disclosure, and other document types can also be used, such as sales agreements, service agreements, intellectual property assignments, business entity formation and operation documents, etc. These other document types can be similarly tokenized and minted on the blockchain and have security and/or blockchain information embedded within them as well.

FIG. 4A illustrates an example secure release document 400 in accordance with embodiments of this disclosure. In various embodiments, the release document 400 can be the minted document 216 described with respect to FIG. 2. The release document 400 includes various information depending on the nature of the document. For example, as shown in FIG. 4A, the release document 400 includes a property description area 402 including a description of a subject property to which a release is applied. For example, if the property is real estate, the property description area 402 can include a legal description of the property, such as including block or parcel information, county document information, addresses, etc.

The release document 400 also includes a notice area 404 that describes the nature of the document. For example, as shown in FIG. 4A, the release document 400 can be a "Release of Restrictions" document that includes a statement(s) in the notice area 404 that indicates the property designated in the property description area 402 is being released from previous restrictions placed upon the property. For example, if the owner of the property intends to sell or otherwise transfer the property to a new owner, the release document 400 can be created, encoded, secured, minted, and recorded prior to the transfer so that the property is free from the previous restrictions placed upon it prior to the transfer. The release document 400 therefore notifies others that a technology dependent condition exists such that there now exists a valid and proper release of the previous restrictions placed on the subject property, lifted via the creation, encoding, minting and recording of the release document 400 using the system 200.

As further shown in FIG. 4A, the release document 400 can further include a property owner designation and signature area 406, which can include the owner name, a line for the owner's physical or digital signature to be applied, and can also be accompanied by a notarization. The release document 400 further includes a scannable code 408, such as a dynamic QR code, which can be scanned by an electronic device to provide one or more links to view information concerning the document, such as NFT data and restriction/release status information.

The release document 400 further includes a blockchain authentication data area 410 that includes various embedded security and blockchain information concerning the release document 400, such as a blockchain identifier, a blockchain/NFT token, a document name, a symbol designation that can identify the system that generated the release document 400, a unique identifier for the document, a URI to an image of the digital secured document, and a URI for an image of the property. Once the release document 400 is created, encoded, signed, and minted/tokenized, the release document 400 can be recorded to put others on notice of the release notice included in the notice area 404 of the release document 400.

Figure 4B:
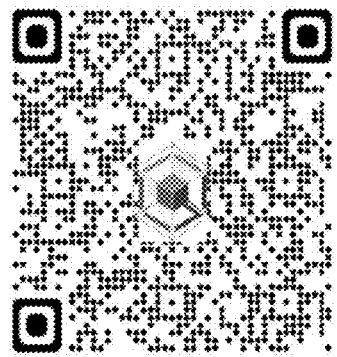
FIG. 4B illustrates an example secure release document that includes optional embedded visual validity information in accordance with embodiments of this disclosure.

In some embodiments, such as shown in FIG. 4B, which illustrates an example secure release document 400 that includes optional embedded visual validity information in accordance with embodiments of this disclosure, once the release document 400 is finalized and recorded, optional embedded visual validity information can be additionally added to the document. For example, a watermark 412 can be applied over the release document 400 to designate that the creation, minting, securing, and recording of the document is complete. Users viewing the document, such as via the public-facing interfaces 214, may see the watermark 412 to be made aware that the full process to secure, record, and authenticate the release document has been completed.

Additionally or alternatively, a plurality of poof data 414 can be embedded within the release document 400. In various embodiments, this plurality of proof data 414 is visually represented on the release document 400 as a machine-readable group of shapes and alphanumeric characters in various dimensions, orientations, shadings, and placements, appearing as physical marks embedded in the digital secured document. In various embodiments, an electronic device creates the machine-readable group of proof data 414 by using a combination of two or more of a random number, a random image, a raster image of one or more color maps, a vector image of one or more color maps, and a translation of one or more color maps. In some embodiments, the plurality of proof data 414 is a result of the solution to a zero knowledge proof of the proving of one or more logical statements, such logical statements being comprised of one or more of the processes, parameters, functions, and results of one or more of the above examples, where the results of the zero knowledge proof are used to generate the particular shapes and alphanumeric characters, as well as display properties such as dimensions, orientations, shadings, and placements of the plurality of proof data 414.

Although FIGS. 4A and 4B illustrate examples of a release document 400, various changes may be made to FIGS. 4A and 4B. For example, the information presented on the release document 400 can be rearranged, such as by rearranging the locations within the release document 400 of one or more of the property description area 402, the notice area 404, the property owner designation and signature area 406, the scannable code 408, the blockchain authentication data area 410, and the plurality of proof data 414. Additionally, the release document 400 is but one example of a document that can be generated, encoded, secured, and minted using the various embodiments of this disclosure, and other document types can also be used, such as sales agreements, service agreements, intellectual property assignments, business entity formation and operation documents, etc. These other document types can be similarly minted on the blockchain and have security and/or blockchain information embedded within them as well.

Figure 5:
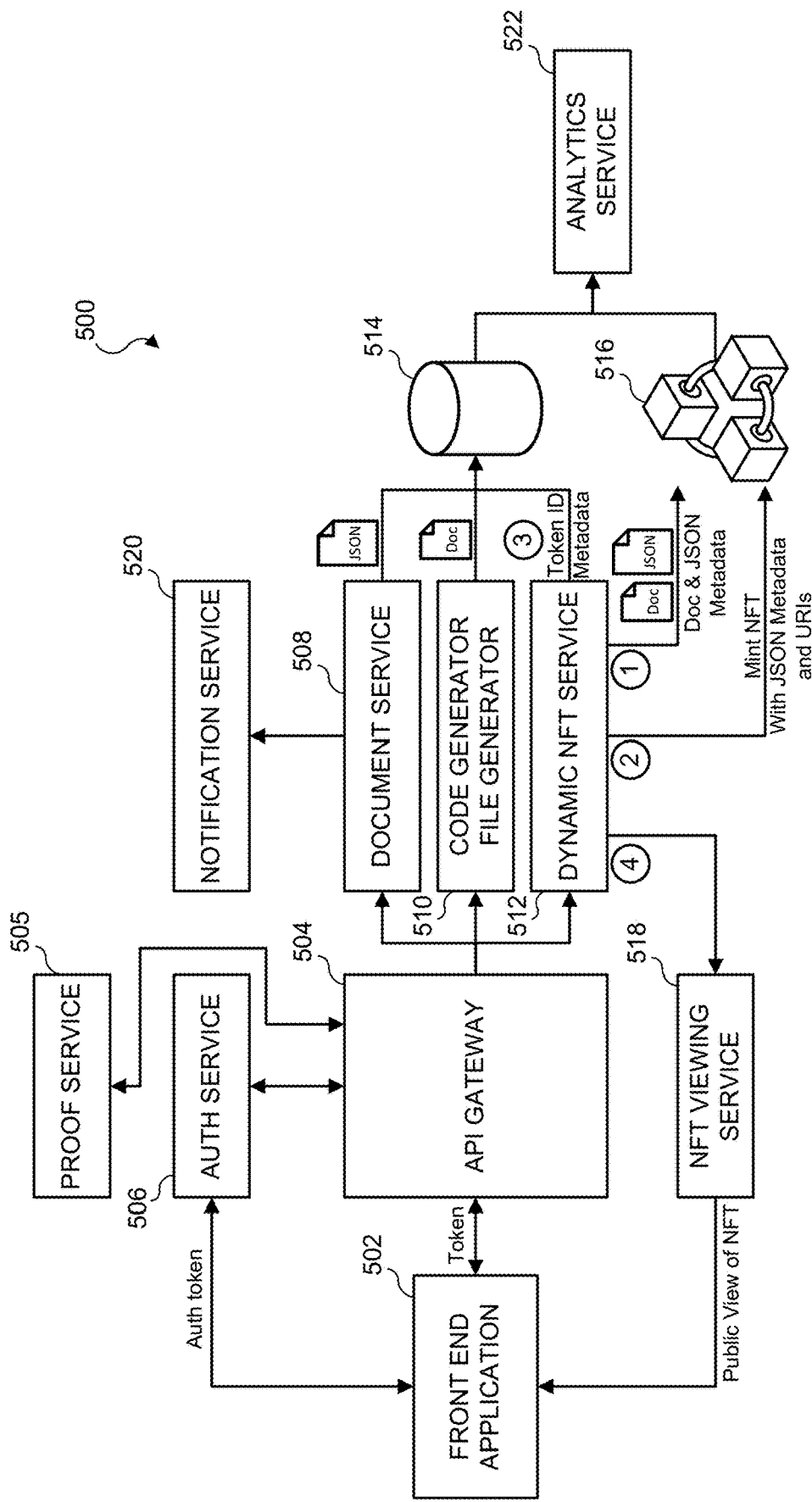
FIG. 5 illustrates an example document generation and security architecture in accordance with embodiments of this disclosure.

FIG. 5 illustrates an example document generation and security architecture 500 in accordance with embodiments of this disclosure. For ease of explanation, devices included in, or execution components of, the architecture 500 are described as being used as part of the network configuration 100 to support the exchange of information between electronic devices utilizing the architecture 500 (such as multiple instances of the electronic device 101, the server 106, etc.). However, the architecture 500 may be used with any other suitable devices and in any other suitable environments. In some embodiments, the architecture 500 can be included as at least a part of or implemented by the system 200.

The architecture 500 includes a front end application 502. The front end application 502 can be executed, for example, by the agent device 206. The front end application communicates with an API gateway 504, which can be at least a portion of the web API system 202. In various embodiments of this disclosure, communications between the front end application 502 and the API gateway 504 are first established by providing a token, such as a JavaScript Object Notation (JSON) Web Token (JWT), identifying a user of the front end application 502, with the front end application 502 transmitting this token to an authentication service 506 associated with the API gateway 504. The token may be generated via a login or authentication process in which the user inputs certain information, and, in some embodiments, the authentication process can be a multifactor authentication process. The authentication token provided by the front end application 502 can be included in an authorization header of a Hypertext Transfer Protocol (HTTP) request. The authentication service 506 then validates the token on behalf of the server-side system.

The authentication token can include the credentials of the user or device using or executing the front end application 502. The authentication token itself can include a header, payload, and signature portion. The header includes at least a token type and a signing algorithm used, such as HMAC SHA256 or RSA. The payload can include various information such as a user or device identification, a subject, an expiration time, etc. The signature is created from the header, the payload, and a secret, and the signing algorithm specified in the header uses these elements to create the secret which is used to verify the message was not changed during transmission between the front end application 502 and the API gateway 504. The token can also be signed using private/public key pairs to provide that the signature also certifies that only the party holding the private key signed the token. Once the authentication service 506 initially authenticates and authorizes the user or device of the front end application 502, in some embodiments the token can be provided by the front end application 502 with each subsequent request, which allows the user or device to continue to access services offered by the API gateway 504 and its associated components of the architecture 500.

For example, if the front end application 502 is an application for creating restriction and release documents for property, such as title companies creating restriction and release documents pertaining to real estate, the token authentication and use of tokens in communication processes described above ensures that only authorized and certified entities such as the title company can create the restrictions or release of restrictions, excluding any malicious actors from being able to use systems or architectures described herein, such as the system 200 and/or the architecture 500, and from being able to create minted, secured and authenticated documents such as the document 216 described with respect to FIG. 2, or for example the restriction document 300 or release document 400 described with respect to FIGS. 3A-4B. Attempts to fabricate such documents by malicious actors, even by placing fake NFT token strings or fake scannable codes in the fabricated document, could easily be scrutinized, invalidated, and delegitimized by scanning the scannable code and discovering it does not link to an NFT, or links to a rogue NFT, or links to one in which the NFT metadata does indicate a restriction or release is in place, or by using the NFT token to similarly view public data regarding the NFT and document, if one exists at all.

The architecture 500 further includes various services that cooperate to create, encode, tokenize, secure, and authenticate documents, including a document service 508, a code generator and file generator service 510, and a dynamic NFT service 512. The document service 508 processes requests for initial creation of documents, such as requests for restriction or release documents received from the front end application 502 via the API gateway 504, and assembles data received as part of the request, such as owner information, property information, notice information, etc., into an document information object (e.g., a JSON object) that can be used by the other services and stored in a database 514 in association with created documents. The information included in the document information object is used by the code generator and file generator service 510 to create the initial document, such as the document 210 described with respect to FIG. 2, including embedding information within the object, such as embedding owner information, property information, property image(s), notice information, etc. into the document. Additional data such as a document ID, a document name, a source identifying symbol, or other information can be generated and/or embedding into the document. Creating the document can also include creating other portions of the document, such as a scannable code area, a signature/notarization area, and a blockchain authentication data area, though such areas may be incomplete or blank upon creation of the initial document.

The code generator and file generator service 510 also creates a scannable code, such as a QR code, that links to a record associated with the created document, and embeds the scannable code into the document. For example, in some embodiments the scannable code can be scanned by an electronic device to automatically retrieve information from the database 514 regarding the document, which can include at least some of the information included in the document information object. This allows those viewing the document to quickly retrieve and examine information pertaining to the document and its status. In some embodiments, the code generation and file generation can be handled by two discreet services.

The architecture 500 also includes a proof service 505. In various embodiments, a plurality of poof data can be embedded within the generated documents. This plurality of proof data can be visually represented on the documents as a machine-readable group of shapes and alphanumeric characters in various dimensions, orientations, shadings, and placements, appearing as physical marks embedded in the documents. In various embodiments, an electronic device associated with the API gateway 504, and that executes the proof service 505, creates the machine-readable group of proof data by using a combination of two or more of a random number, a random image, a raster image of one or more color maps, a vector image of one or more color maps, and a translation of one or more color maps. In some embodiments, the plurality of proof data is a result of the solution to a zero knowledge proof of the proving of one or more logical statements, such logical statements being comprised of one or more of the processes, parameters, functions, and results of one or more of the above examples, where the results of the zero knowledge proof are used to generate the particular shapes and alphanumeric characters, as well as display properties such as dimensions, orientations, shadings, and placements of the plurality of proof data.

The dynamic NFT service 512 takes the document information object and the document created by the document service 508 and the code generator and file generator service 510, respectively, and accesses a blockchain system 516 to securely tokenize and mint the document. NFTs created using the dynamic NFT service 512 can be dynamic NFTs that are updated in multiple steps. For example, in some embodiments, the document and document metadata are first provided to the blockchain system 516 to create an initial NFT record with metadata, and an NFT ID is created. Once an NFT string/ID is created and the document is minted using object metadata and URIs associated with the document, the dynamic NFT service 512, or the code generator and file generator service 510 in some embodiments, takes NFT information and embeds the information into the document, such as in a blockchain authentication area of the document.

The NFT information embedded into the document can include the NFT token ID, a blockchain identifier, and/or other information. In some embodiments, the code generator and file generator service 510 creates the scannable code using the NFT ID among other data as described in the embodiments of this disclosure, and updates the document to include the scannable code. The dynamic NFT service 512 can then update the metadata and the document in another step using the blockchain system 516 to publicly update the information related to the document. The dynamic NFT service 512 can then store the NFT token ID and NFT metadata in the database 514 in association with the document and its other associated information.

The architecture 500 further includes an NFT viewing service 518 accessible to other applications such as the front end application 502 to allow viewing of the NFT, including the associated document and the NFT metadata. Once client/owner authorization is provided and the document is signed by the client/owner, and also once the document is recorded with a recording entity in some embodiments, the dynamic NFT service 512, individually or in conjunction with the other services 508, 510, can execute an additional NFT update step to update the associated document to show the signature and/or notarization and/or a watermark indicating successful completion/recordation of the document, update the NFT metadata for the document on the blockchain system 516, and store the document and updated information and metadata in the database 514. In some embodiments, various data described above, including the security document and/or images or copies thereof, can be stored using an on-chain permaweb protocol. During each of these steps, a notification service 520 can notify an agent device (s), a client device(s), or both devices of the progress of the secure document creation through minting processes. In some embodiments, the notification service 520 can also issue alerts to the agent device, client device, or both of activity such as attempting tampering or altering of the NFT, document, or metadata associated with either, to put agent(s) and client(s) on alert of any potentially malicious activity.

The architecture 500 further includes an analytics service 522. The analytics service 522 can retrieve information on documents and NFTs included in the database 514, the blockchain system 516, or both, and examine the information to analyze various data and data trends. For example, the analytics service 522 may pull information such as the number of restriction documents created over a period of time, and how many of these restriction documents have had their restrictions released via an associated release document or what, if any, is the pattern of these restriction documents that have been retrieved for public viewing. It will be understood that many different analytics may be gathered by the analytics service 522.

The architecture 500 thus provides various benefits and improvements in the art and in the devices of the architecture 500. For example, the authentication performed using the authentication service 506, which can include using elliptical curve cryptography as described in the various embodiments therein, provides a more efficient means of verifying by an electronic device the authenticity of a document. Where previously the electronic device may have to compare all the raw data of the original document and a purported authentic copy, this disclosure provides for a more efficient process of creating a unique string used as part of a digital signing process, such that only decryption using the digital signing process can be performed to authenticate the document rather than comparing the raw data, substantially improving the speed and efficiency of the electronic device to perform such document authentication.

Additionally, proving documents, such as via the proof service 505, to create a machine-readable group of shapes and alphanumeric characters in various dimensions, orientations, shadings, and placements that are embedded as physical marks embedded in the documents, provide various benefits and improvements. This can be done by using a combination of two or more of a random number, a random image, a raster image of one or more color maps, a vector image of one or more color maps, and a translation of one or more color maps, and/or using a zero knowledge proof solution. Generating proof data and embedding the proof data in the documents allows for substantially higher security around the secure documents, as it will be incredibly difficult for a malicious actor to recreate or forge such embedded proof data. For example, in the case of forged release documents, even if a malicious actor were to embed similarly-styled proof data in a document, the system and processes described in this disclosure could easily determine that such false embedded proof data was not generated using the system and processes of this disclosure. Further, checking the validity of proof data in a document can be performed much more efficiently than other document validity routines, such as routines that require comparing the full raw data of two documents.

Although FIG. 5 illustrates one example of a document generation and security architecture 500, various changes may be made to FIG. 5. For example, various components or functions shown or described may be combined, further subdivided, replicated, omitted, or rearranged and additional components or functions may be added according to particular needs. In general, this disclosure is not limited to any particular architecture configuration. In various embodiments of this disclosure, the API gateway, 504, the document service 508, the code generator and file generator service 510, the dynamic NFT service 512, the database 514, the NFT viewing service 518, the notification service 520, and the analytics service 522 can be a part of a server system, such as including one or more servers 106.

Figure 6:
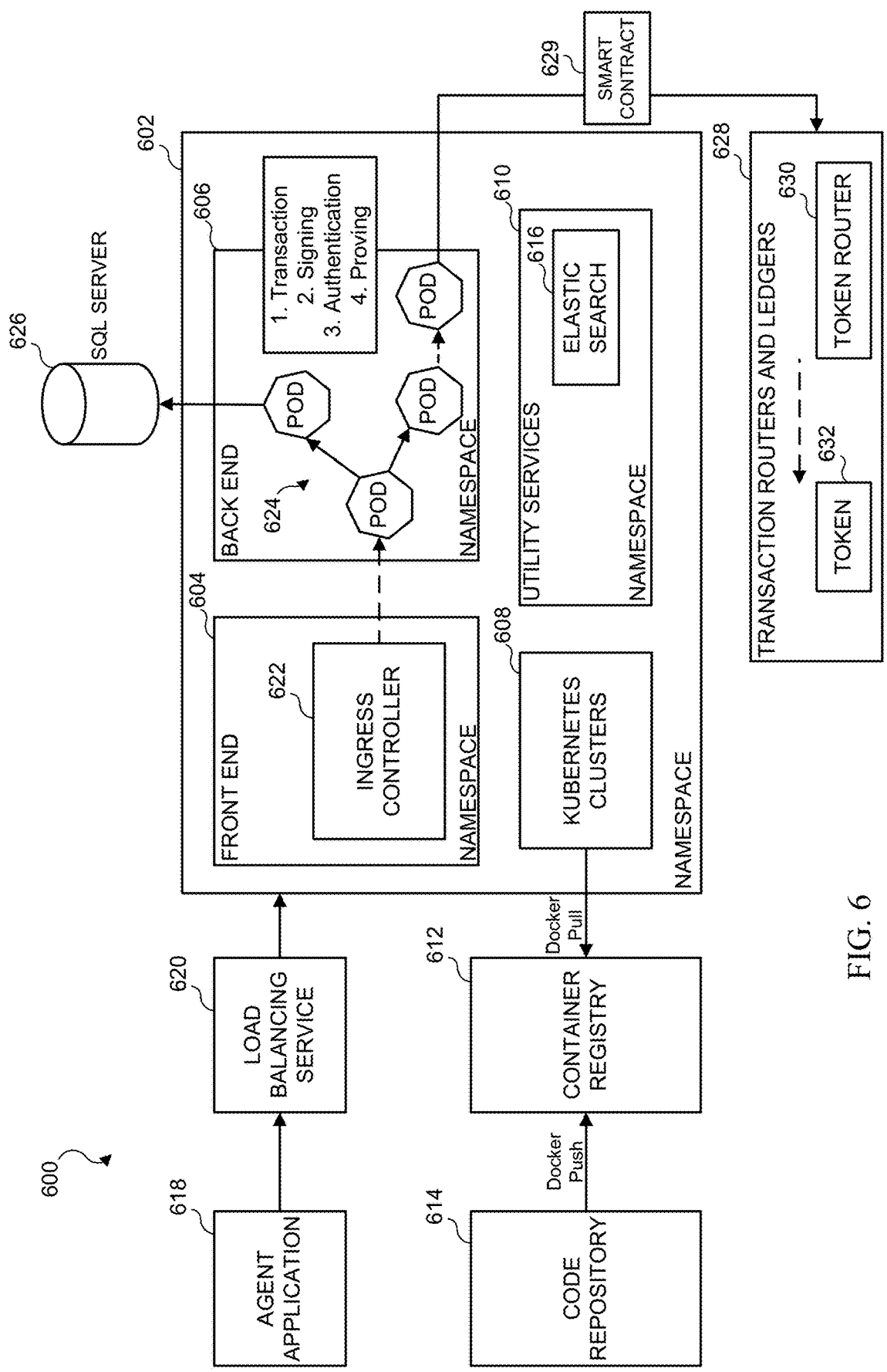
FIG. 6 illustrates an example document generation and security deployment and scaling architecture in accordance with embodiments of this disclosure.

FIG. 6 illustrates an example document generation and security deployment and scaling architecture 600 in accordance with embodiments of this disclosure. For ease of explanation, devices included in, or execution components of, the architecture 600 are described as being used as part of the network configuration 100 to support the exchange of information between electronic devices utilizing the architecture 600 (such as multiple instances of the electronic device 101, the server 106, etc.). In various embodiments, the architecture 600 can be part of the architecture 500 and/or the system 200. However, the architecture 600 may be used with any other suitable devices and in any other suitable environments.

The architecture 600 includes a scalable deployment environment 602. In some embodiments, the scalable deployment environment can be at least a part of the web API system 202. In various embodiments, the scalable deployment environment 602 includes a front end layer 604, a back end layer 606, a Kubernetes clusters system 608, and a utility services system 610. In various embodiments, the scalable deployment environment 602 can be executed on one or more servers 106. As illustrated in FIG. 6, the various components of the scalable deployment environment 602 can each have its own namespace to provide a set of names within the namespace that are used to identify and refer to objects of various kinds. Each component having its own namespace allow for the grouping of symbols and identifiers around a particular functionality and also avoids name collisions between multiple identifiers that share the same name.

The front end layer 604 is the presentation layer of software or physical infrastructure or hardware, or a combination of both. Similarly, the back end layer 606 is a data access layer of software or physical infrastructure or hardware, or a combination of both. The Kubernetes clusters system 608 is a container orchestration system that automates software development, scaling, and management of the scalable deployment environment 602. For example, the Kubernetes clusters system 608 can pull software containers (e.g., Docker container images) from a container registry 612, with the container registry 612 receiving the containers from a push operation from a code repository 614.

The utility services system 610 is used to support the scalable deployment environment 602 by providing software services designed to assist with the analysis, configuration, optimization, and maintenance of the scalable deployment environment 602. For example, the authentication service 506, the notification service 520, the proof service 505, and/or the analytics service 522 could be part of the utility services system 610. Additionally or alternatively, the utility services system 610 can include an elastic search service 616 to provide a search engine that can log analytics and provide full-text search, security intelligence, business analytics, and operational intelligence uses.

The architecture further includes an agent application 618, which in various embodiments can be the front end application 502, and can be executed using for example the agent device 206. In some embodiments, requests sent to the scalable deployment environment 602 can be first received and/or intercepted by a load balancing service 620. The load balancing service 620 is configured to distribute a set of requests (such as HTTP requests for document creation and security) over a set of computing units. Particularly, the load balancing service 620 allows for multiple requests received from one or more agent applications 618 to be balanced by assigning the requests to be performed by the set of computing units to effectively allow concurrent processing of the multiple requests in an efficient manner, which enables the architecture 600 to be sufficiently scaled to meet demand.

Requests received in this manner are provided to the front end layer 604. An ingress controller 622 of the front end layer 604 can be an application executed within a cluster that is configured to work with the load balancer 620 to configure the load balancer 620 for applications running on Kubernetes, to deliver those applications to clients outside of the cluster, and based on current available resources. In some embodiments, the load balancer 620 can be a software load balancer running in the cluster or, in some embodiments, can be a hardware or cloud load balancer running externally. In some embodiments, the ingress controller 622 can provide host-based routing, e.g., routing requests with a one host header to one group of services and requests with a different host header to another group of services. In some embodiments, the ingress controller 622 can provide path-based routing, e.g., routing requests with a URI that starts with a service designator to a service associated with the service designator, and routing requests with an URI that starts with a different service designator to a different service.

For example, as illustrated in FIG. 6, the ingress controller 622 of the front end layer 604 routes requests to services executed via the back end layer 606. The back end layer 606 can execute multiple pods 624. The pods 624 are autoscaled to automatically deploy additional pods as needed to meet current demand. For example, the services described herein to create and secure documents, such as the document service 508, the code generator and file generator service 510, the dynamic NFT services 512, etc., can be executed as pods 624, with any number of these services being scaled to meet request demand. The pods 624 can process document transactions, including digitally signing documents, proving documents and creating and embedding proof data, authenticating documents, etc., and store information on the documents in a database 626, which can be a SQL server, and/or can be the database 514 of FIG. 5.

As part of creating and securing documents, the pods 624 utilize a smart contract protocol 629 that can automatically execute, control, and/or document legally relevant events and actions according to the terms of a contract or an agreement. For example, the smart contract protocol 629 can be used when minting digitally enhanced documents with an NFT with blockchain transaction routers and ledgers 628. For example, the smart contract protocol 629 may not allow for a record associated with a particular property to be changed after a restrictions document, such as the restrictions document 300, is minted and finalized on the ledger, until an associated release document, such as the release document 400, is minted and finalized. The smart contract protocol 629 can thus enforce the ownership of the NFTs associated with documents, authenticate data, prevent counterfeiting, enforce use of unique token IDs, and/or facilitate further business transactions. The blockchain routers and ledgers 628 can include a token router 630 that receives a unique token ID and routes viewers to the particular associated token 632 for viewing of information related to the particular NFT, which, as provided in the various embodiments of this disclosure, can provide publicly accessible confirmation and tracking of secured documents, ownership status of properties, etc.

Although FIG. 6 illustrates one example of a document generation and security deployment and scaling architecture 600, various changes may be made to FIG. 6. For example, various components or functions shown or described may be combined, further subdivided, replicated, omitted, or rearranged and additional components or functions may be added according to particular needs. In general, this disclosure is not limited to any particular architecture configuration.

Figure 7:
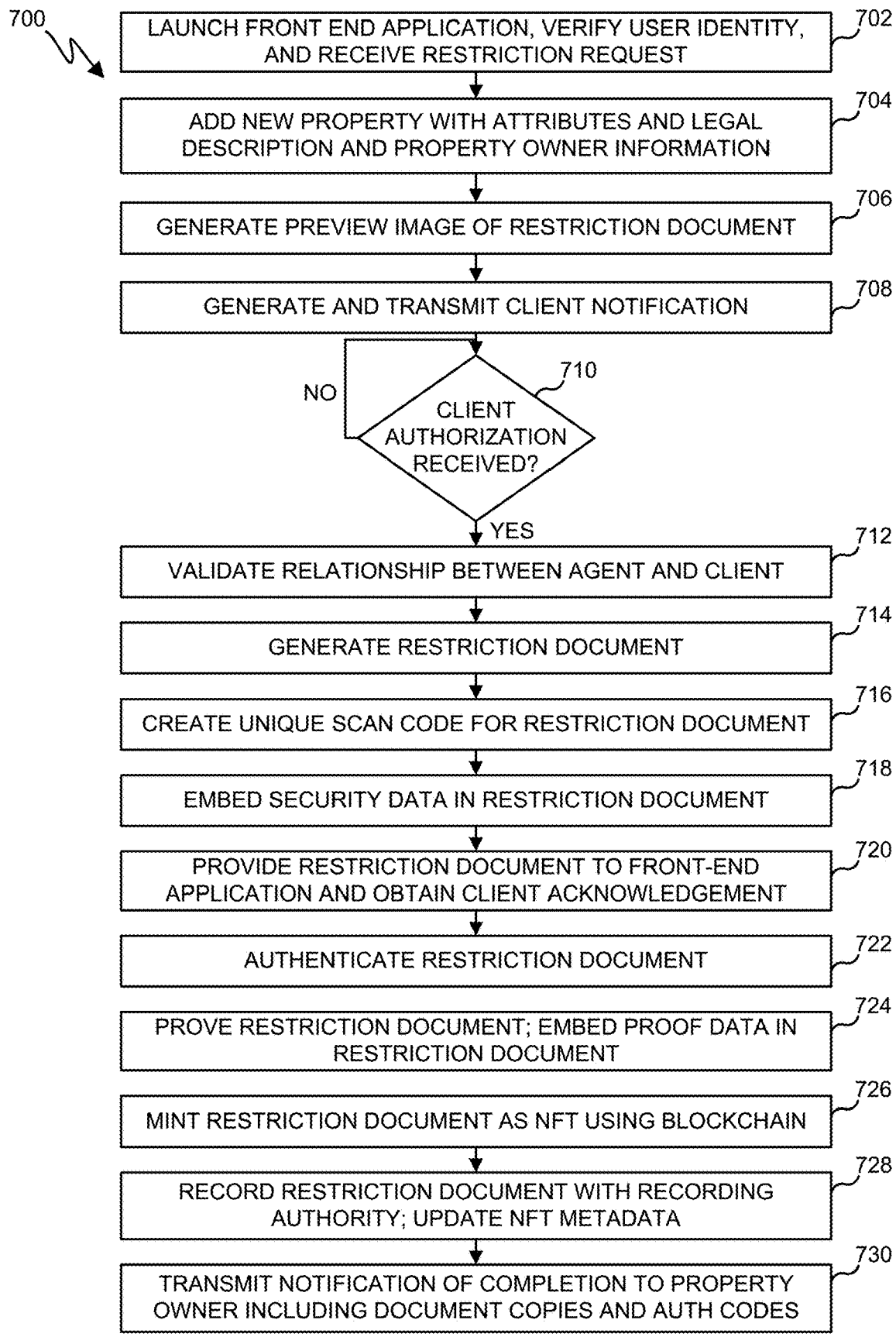
FIG. 7 illustrates an example restriction document creation and security process in accordance with embodiments of this disclosure.

FIG. 7 illustrates an example restriction document creation and security process 700 in accordance with embodiments of this disclosure. For ease of explanation, the process 700 is described as being performed using the system 200 of FIG. 2 within the network configuration 100 of FIG. 1, and/or using the architectures 500 and/or 600. It will be understood that various steps of the process 700 can be carried out or instructed by a processor of the identified device, such as the processor 120. However, the process 700 may be performed using any other suitable device(s) and in any other suitable system(s).

The process 700 begins at block 702. At block 702, a user, such as a title agent, launches a front end application, such as the front end application 502. Additionally at block 702, the processor verifies the identity of the user such as via a login or authentication process in which the user inputs certain information, and, in some embodiments, the authentication process can be a multifactor authentication process. Additionally, at block 702, the processor receives a restriction request from the front end application, that is, a request to create a restriction document such as the restriction document 300. At block 704, the processor receives information for adding new property information with attributes and a legal description to a document, property owner information, and, in some embodiments, particular restriction language to include in the document. In some embodiments, the property information, legal description, property owner information, and restriction language can be input via various fields of the front end application, or via uploading an initial restriction document as an attachment using the front end application. The data provided via the front end application can be provided to the processor via an API.

At block 706, the processor generates a preview image of the restriction document, and, at block 708, generates and transmits a client notification to a client device, such as the client device 208. The client notification can include a preview image as well as one or more prompts to the client, e.g., the property owner, to authorize the creation, finalization and minting of the restriction document. At decision block 710, the processor determines if a client authorization for proceeding with creating, finalizing, and minting the restriction document is received. In some embodiments, to receive the client authorization, the client is first authenticated using an authentication process such as multifactor authentication. Additionally or alternatively, in some embodiments, the client receives a notification such as an email sent to the client's email address, which can include a link or button to provide client authorization for the transaction. In various embodiments, the client interactions and transmissions can be performed using another front end application configured to handle and communicate client notifications, authentication, authorization, and acknowledgements. Once authenticated, the client can respond to a prompt provided to the client to either accept or reject, i.e., authorize or not authorize, the request to create a restriction document. If client authorization is not received, the process 700 can loop at decision block 710 until an authorization is received, or the process 700 can simply end in some embodiments, or end after a predetermined amount of time or attempts for authorization are made in some embodiments.

If, at decision block 710, the processor determines that a client authorization is received, the process 700 moves to block 712. At block 712, the processor validates the relationship between the property owner or client and the agent. For example, the processor can verify the identity of the property owner or client and match the information the property owner or client information with the information submitted by the agent. The processor can also validate the agent-client relationship based on the receipt of the client authorization. At block 714, the processor then generates the restriction document, which includes information provided by the agent, such as owner and property information.

At block 716, the processor creates a unique scan code for the restriction document. In some embodiments, the unique scan code can be created using a combination of unique owner, agent, and property IDs or keys in addition to an NFT ID. At block 718, the processor embeds security data in the restriction document. As described in the various embodiments of this disclosure, the embedded security data can include the unique scan code, which can appear as physical marks on the document, as well as other data such as various embedded security and blockchain information concerning the restriction, such as a blockchain identifier, a blockchain/NFT token, a document name, a symbol designation that can identify the system that generated the restriction document, a unique identifier for the document, a URI to an image of the digital secured document, and a URI for an image of the property.

At block 720, the processor provides the restriction document to the front end application of the agent. The processor then obtains a client acknowledgement. In some embodiments, the client acknowledgement can be in the form of a digital signature or a scanned handwritten signature provided by the client on the generated document. In some embodiments, the client could provide the acknowledgement when presented with the preview image of the document. In some embodiments, when the front end application receives the restriction document after block 718, the agent can provide the document to the client for review and acknowledgement. For example, the processor can receive, such as from the agent device, a request to send the document to the client, such as in an email as an attachment or via other means, and the client can provide the acknowledgement on the document, e.g., by signing the document.

At block 722, after receiving the acknowledged document, the processor can authenticate the document, such as by confirming the validity of the security data that was embedded in the document at block 718. In some embodiments, the processor then can update the restriction document, such as by adding visual signs of a completed, acknowledged, and valid/authenticated document, e.g., applying a watermark to the restriction document indicating successful authentication.

At block 724, the restriction document is proved. In various embodiments, proving the restriction document can include using data within the signed and uploaded restriction document and/or outside data, to create a machine-readable group of proof data such as by using a combination of two or more of a random number, a random image, a raster image of one or more color maps, a vector image of one or more color maps, and a translation of one or more color maps. In some embodiments, the plurality of proof data is a result of the solution to a zero knowledge proof of the proving of one or more logical statements, such logical statements being comprised of one or more of the processes, parameters, functions, and results of one or more of the above examples, where the results of the zero knowledge proof are used to generate the particular shapes and alphanumeric characters, as well as display properties such as dimensions, orientations, shadings, and placements of the plurality of proof data. Once the restriction document is proved, a plurality of poof data is embedded within the restriction document. In various embodiments, this plurality of proof data is visually represented on the restriction document as a machine-readable group of shapes and alphanumeric characters in various dimensions, orientations, shadings, and placements, appearing as physical marks embedded in the digital secured document, such as shown in FIGS. 3A and 3B. It will be understood that the authentication at block 722 can occur before the proving in block 724, as shown in FIG. 7, or the authenticating at block 722 could occur after the proving at block 724 in various embodiments.

At block 726, the processor then tokenizes and mints the restriction document as an NFT, as described in the various embodiments of this disclosure. In some embodiments, at block 728, the agent then records the restriction document with a recording entity/authority, and transmits a successful recordation notice to the processor. The processor then can, in some embodiments, update the NFT metadata to indicate a restriction status of the restriction document. At block 730, the processor transmits a completion notification to the client or property owner including one or more copies of the restriction document and authentication codes for the restriction document. Various public-facing interfaces can allow the owner and possibly others to view the restriction document or NFT metadata for the restriction document, as described in the various embodiments of this disclosure, to verify the memorialized intent of the owner, the nature of the restrictions, and the current status of the restrictions, such as a release status.

Although FIG. 7 illustrates one example of a restriction document creation and security process 700, various changes may be made to FIG. 7. For example, while shown as a series of steps, various steps in FIG. 7 may overlap, occur in parallel, occur in a different order, or occur any number of times.

Figure 8:
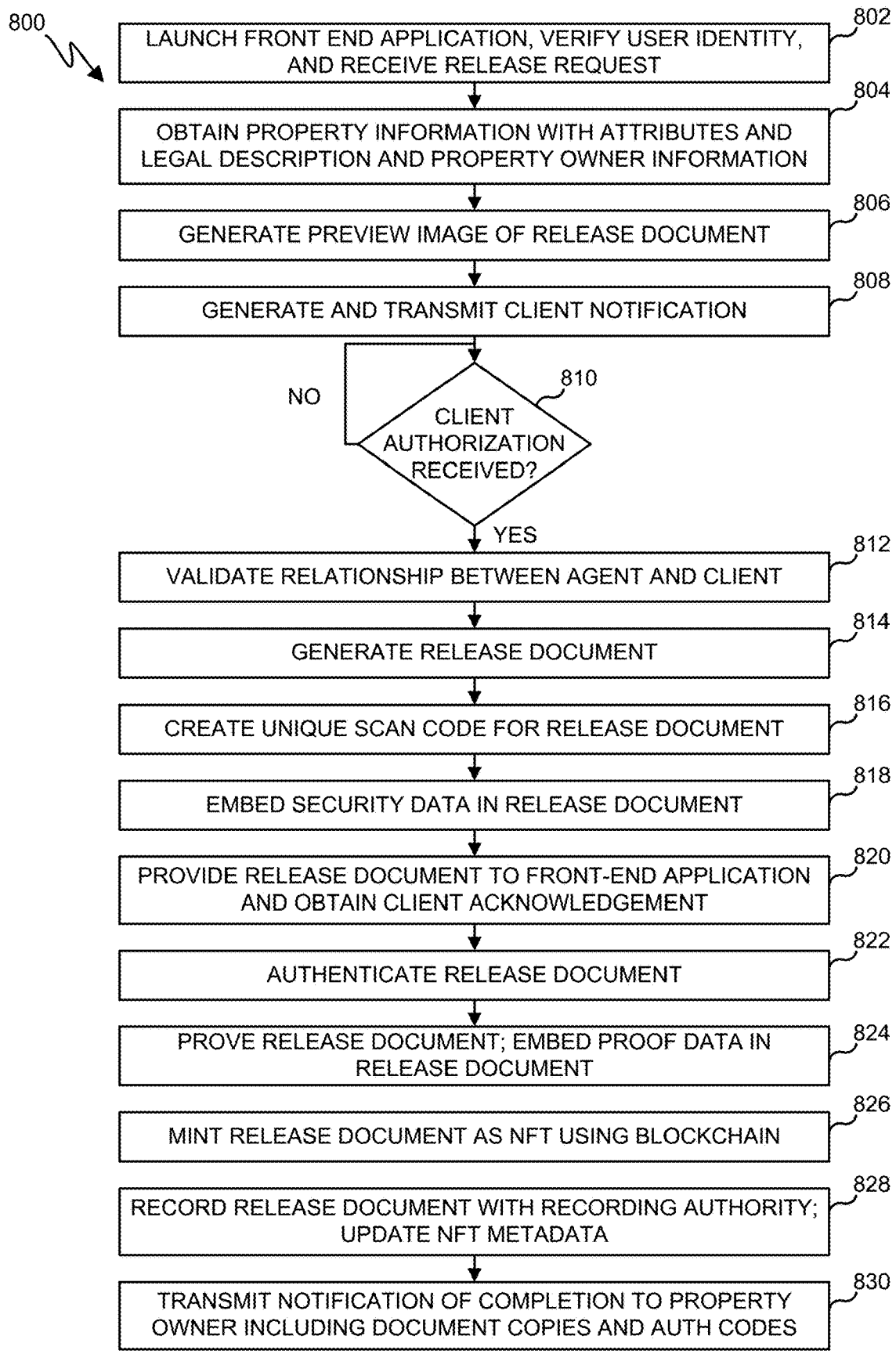
FIG. 8 illustrates an example release document creation and security process in accordance with embodiments of this disclosure.

FIG. 8 illustrates an example release document creation and security process 800 in accordance with embodiments of this disclosure. For ease of explanation, the process 800 is described as being performed using the system 200 of FIG. 2 within the network configuration 100 of FIG. 1, and/or using the architectures 500 and/or 600. It will be understood that various steps of the process 800 can be carried out or instructed by a processor of the identified device, such as the processor 120. However, the process 800 may be performed using any other suitable device(s) and in any other suitable system(s).

The process 800 begins at block 802. At block 802, a user, such as a title agent, launches a front end application, such as the front end application 502. Additionally at block 802, the processor verifies the identity of the user such as via a login or authentication process in which the user inputs certain information, and, in some embodiments, the authentication process can be a multifactor authentication process. Additionally, at block 802, the processor receives a release request from the front end application, that is, a request to create a release document such as the release document 400. At block 804, the processor obtains property information with attributes and a legal description to a document, property owner information, and, in some embodiments, particular release language to include in the document. In some embodiments, this information is already available due to a previous restrictions document already having been created previously, and to which the new release document is being created to release such prior releases. In some embodiments, the property information, legal description, property owner information, and release language can be newly input via various fields of the front end application, or via uploading an initial release document as an attachment using the front end application. The data provided via the front end application can be provided to the processor via an API.

At block 806, the processor generates a preview image of the release document, and, at block 808, generates and transmits a client notification to a client device, such as the client device 208. The client notification can include a preview image as well as one or more prompts to the client, e.g., the property owner, to authorize the creation, finalization and minting of the release document. At decision block 810, the processor determines if a client authorization for proceeding with creating, finalizing, and minting the release document is received. In some embodiments, to receive the client authorization, the client is first authenticated using an authentication process such as multifactor authentication. Additionally or alternatively, in some embodiments, the client receives a notification such as an email sent to the client's email address, which can include a link or button to provide client authorization for the transaction. In various embodiments, the client interactions and transmissions can be performed using another front end application configured to handle and communicate client notifications, authentication, authorization, and acknowledgements. Once authenticated, the client can respond to a prompt provided to the client to either accept or reject, i.e., authorize or not authorize, the request to create a release document. If client authorization is not received, the process 800 can loop at decision block 810 until an authorization is received, or the process 800 can simply end in some embodiments, or end after a predetermined amount of time or attempts for authorization are made in some embodiments.

If, at decision block 810, the processor determines that a client authorization is received, the process 800 moves to block 812. At block 812, the processor validates the relationship between the property owner or client and the agent. For example, the processor can verify the identity of the property owner or client and match the information the property owner or client information with the information submitted by the agent. The processor can also validate the agent-client relationship based on the receipt of the client authorization. At block 814, the processor then generates the release document, which includes information provided by the agent, such as owner and property information.

At block 816, the processor creates a unique scan code for the release document. In some embodiments, the unique scan code can be created using a combination of unique owner, agent, and property IDs or keys in addition to an NFT ID. At block 818, the processor embeds security data in the release document. As described in the various embodiments of this disclosure, the embedded security data can include the unique scan code, which can appear as physical marks on the document, as well as other data such as various embedded security and blockchain information concerning the release, such as a blockchain identifier, a blockchain/NFT token, a document name, a symbol designation that can identify the system that generated the release document, a unique identifier for the document, a URI to an image of the digital secured document, and a URI for an image of the property.

At block 820, the processor provides the release document to the front end application of the agent. The processor then obtains a client acknowledgement. In some embodiments, the client acknowledgement can be in the form of a digital signature or a scanned handwritten signature provided by the client on the generated document. In some embodiments, the client could provide the acknowledgement when presented with the preview image of the document. In some embodiments, when the front end application receives the release document after block 818, the agent can provide the document to the client for review and acknowledgement. For example, the processor can receive, such as from the agent device, a request to send the document to the client, such as in an email as an attachment or via other means, and the client can provide the acknowledgement on the document, e.g., by signing the document.

At block 822, after receiving the acknowledged document, the processor can authenticate the document, such as by confirming the validity of the security data embedded that was in the document at block 818. In some embodiments, the processor then can update the release document, such as by adding visual signs of a completed, acknowledged, and valid/authenticated document, e.g., applying a watermark to the restriction document indicating successful authentication.

At block 824, the release document is proved. In various embodiments, proving the release document can include using data within the signed and uploaded release document and/or outside data, to create a machine-readable group of proof data such as by using a combination of two or more of a random number, a random image, a raster image of one or more color maps, a vector image of one or more color maps, and a translation of one or more color maps. In some embodiments, the plurality of proof data is a result of the solution to a zero knowledge proof of the proving of one or more logical statements such logical statements being comprised of one or more of the processes, parameters, functions, and results of one or more of the above examples, where the results of the zero knowledge proof are used to generate the particular shapes and alphanumeric characters, as well as display properties such as dimensions, orientations, shadings, and placements of the plurality of proof data. Once the release document is proved, a plurality of poof data is embedded within the release document. In various embodiments, this plurality of proof data is visually represented on the release document as a machine-readable group of shapes and alphanumeric characters in various dimensions, orientations, shadings, and placements, appearing as physical marks embedded in the digital secured document, such as shown in FIGS. 4A and 4B. It will be understood that the authentication at block 822 can occur before the proving in block 824, as shown in FIG. 8, or the authenticating at block 822 could occur after the proving at block 824 in various embodiments.

At block 826, the processor then tokenizes and mints the release document as an NFT, as described in the various embodiments of this disclosure. In some embodiments, at block 828, the agent then records the restriction document with a recording entity/authority, and transmits a successful recordation notice to the processor. The processor then can, in some embodiments, update the NFT metadata to indicate a release status of the release document. At block 830, the processor transmits a completion notification to the client or property owner including one or more copies of the release document and authentication codes for the release document. Various public-facing interfaces can allow the owner and possibly others to view the release document or NFT metadata for the release document, as described in the various embodiments of this disclosure, to verify the memorialized intent of the owner, the nature of the any restrictions or releases, and the current status of the release.

Although FIG. 8 illustrates one example of a restriction document creation and security process 800, various changes may be made to FIG. 8. For example, while shown as a series of steps, various steps in FIG. 8 may overlap, occur in parallel, occur in a different order, or occur any number of times.

Figure 9:
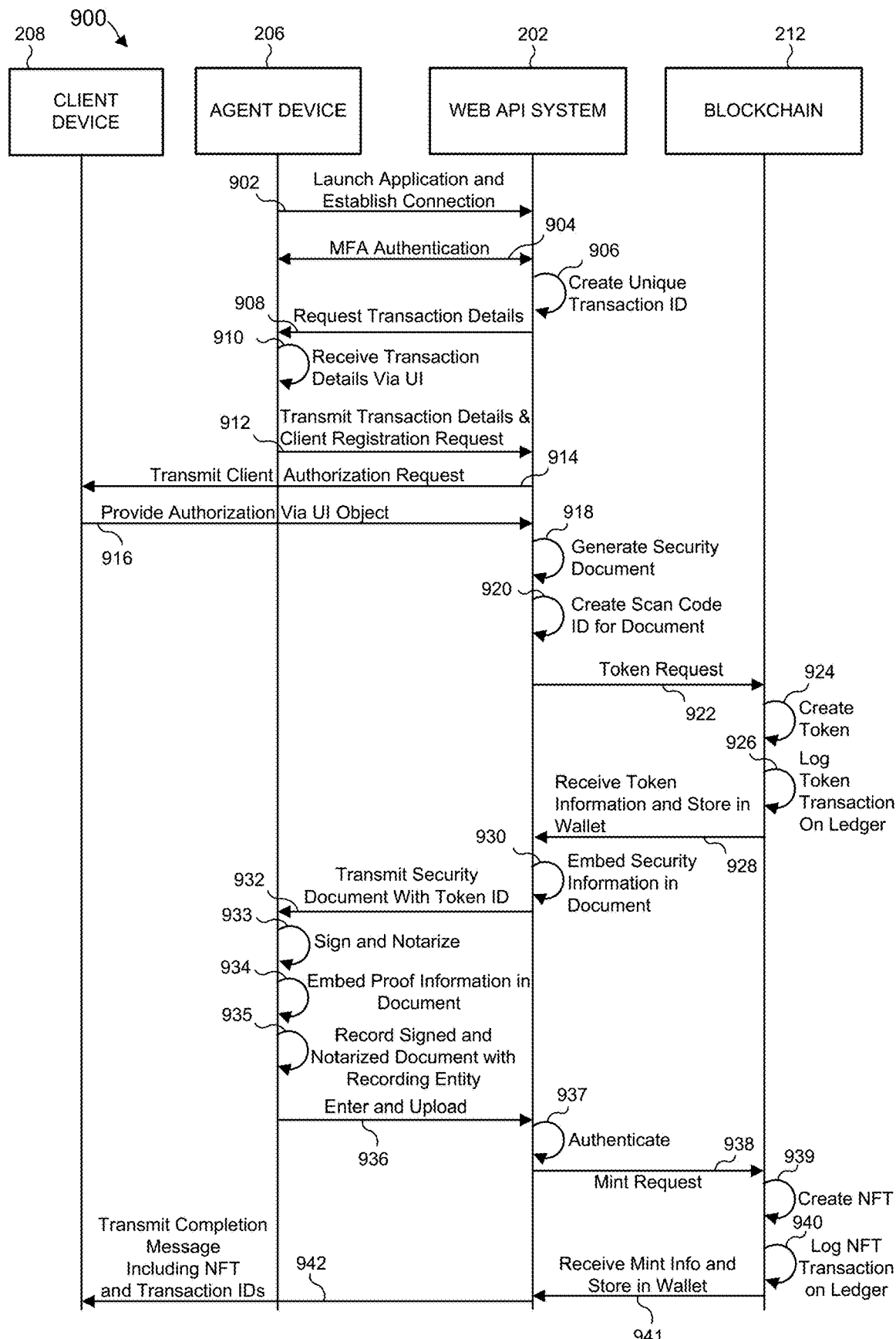
FIG. 9 illustrates an example document creation and security sequence in accordance with embodiments of this disclosure.

FIG. 9 illustrates an example document creation and security sequence 900 in accordance with embodiments of this disclosure. For ease of explanation, the sequence 900 is described as being performed using the system 200 of FIG. 2 within the network configuration 100 of FIG. 1 and/or using the architectures 500 and/or 600. It will be understood that various steps of the sequence 900 can be carried out or instructed by a processor of the associated device, such as the processor 120. However, the sequence 900 may be performed using any other suitable device(s) and in any other suitable system(s).

At step 902, the agent device 206 launches an application, such as the front end application 502, and, via the application, establishes a connection with the web API system 202. The web API system 202 and the agent device 206 then undergo a multifactor authentication process at step 904 to ensure the agent device 206 and/or the agent using the agent device 206 is authorized to use the system, such as to create security documents, e.g., restriction and release documents. At step 906, after the authentication is complete, the web API system 202 creates a unique transaction ID for a transaction to be completed between at least the agent device 206 and the web API system 202.

At step 908, the web API system 202 requests transaction details from the agent device 206. For example, the web API system 202 can provide to the front end application on the agent device 206 a web-based interface for entering various information to be used in the transaction and to be used in the generation of security documents, such as property information with attributes and a legal description of the property, property owner information, and, in some embodiments, particular restriction or release language to include in the security document. At step 910, the agent device 206 receives all of the data to be used for the transaction from a user interface, such as the web-based interface described above. At step 912, the agent device 206 transmits the transaction details and a client registration request to the web API system 202. The client registration request is generated by the agent device 206 after the agent verifies the property owner's identity and information, including the property owner's contact information, such as an email address for the property owner.

Using this information, the web API system 202 transmits a client authorization request to the client device 208, such as via an email to the property owner's email address. The client authorization request can be a registration request if the client is not identified as having an account with the web API system 202, such as if the client's email address is not in a client database associated with the web API system 202, or the client authorization request can include a multifactor authentication of the client if the client already has an account with the web API system 202. In some embodiments, the request can include a preview image of the security document. At step 914, the client device 208 provides authorization for the security document via a UI object. For example, the client authorization request may include a link or button in a user interface to provide the client authorization. In some embodiments, as part of providing the client authorization at step 916, the client can also provide a scanned physical signature or a digital signature for the presented security document, and that signature can be used by the web API system 202 in generating the finalized security document.

At step 918, the web API system 202 generates a security document (e.g., a restriction document or a release document) based on the information received by the web API system 202 thus far. At step 920, the web API system 202 creates a scannable code for the security document. The scannable code can be, for example, a unique 117×117 scan code to embed in the document. The scannable code can be created using a combination of at least unique owner, agent, and property IDs or keys, and appearing as physical marks on the document after embedding into the document. In some embodiments, the scannable code can also be created later after minting of an NFT for the security document, using in addition an NFT ID in creating the scannable code. The scannable code can be embedded in the document at step 920, or later such as at step 930.

At step 922, the web API system 202 transmits a token request to the blockchain 212. At step 924, the blockchain 212 creates a token using metadata provided in the token request of step 922. At step 926, the blockchain system 212 logs the token transaction on the blockchain ledger and, at step 928, the blockchain system 212 transmits token information to the web API system 202 and the token is stored in a wallet associated with or accessible by the agent and/or agent device 206. At step 930, the web API system embeds security information in the document, which can include a blockchain identifier, a blockchain token, a document name, a symbol designation that can identify the system that generated the security document, a unique identifier for the transaction or document, a URI to an image of the digital secured document, and a URI for an image of the property. In some embodiments, the blockchain metadata can be updated after step 930 to reflect the information embedded into the security document.

At step 932, the web API system 202 transmits the security document with a Token ID to the agent device 206. At step 933, the agent handles having the security document signed and notarized. At step 934, as described in the various embodiments of this disclosure, the security document is proved and proof information is embedded within the security document. In some embodiments, the proof data can be considered as a portion of the security data embedded within the document. At step 935, the agent device records the signed and notarized security document with a recording entity, although in some embodiments the recordation step can occur later, such as after minting of the document. At step 936, the agent device 206 enters and uploads the signed, notarized, and (possibly) recorded document to the web API system 202 for authentication and minting as an NFT. At step 937, the web API system authenticates the uploaded document by validating the security data included in the uploaded document, such as at least validating data included in the scannable code.

At step 938, the web API system 202 transmits a mint request to the blockchain 212. At step 939, in response to the mint request, the blockchain 212 creates an NFT associated with the security document. At step 940, the blockchain 212 logs the completed NFT transaction on the ledger. In some embodiments, the security document and/or the NFT metadata can be updated again after step 940, to reflect that the security document has been finalized or to reflect other changes in status as described in embodiments of this disclosure. Minting of the NFT can include assigning a unit value (e.g., 1.0) to the token associated with the NFT and security document. In some embodiments, after minting is complete, the minting authority for this NFT and security document can be disabled to disallow any further changes to the NFT. At step 941, the web API system 202 receives the mint information related to the newly created NFT and stores the information in the wallet. At step 942, the web API system transmits a completion message to the client device 208, including the NFT and transaction IDs, as well as one or more copies of the minted security document.

Although FIG. 9 illustrates one example of a document creation and security sequence 900, various changes may be made to FIG. 9. For example, various components shown or described may be combined, further subdivided, replicated, omitted, or rearranged and additional components or functions may be added according to particular needs. Additionally, while shown as a series of steps, various steps in FIG. 9 may overlap, occur in parallel, occur in a different order, or occur any number of times.

Figure 10:
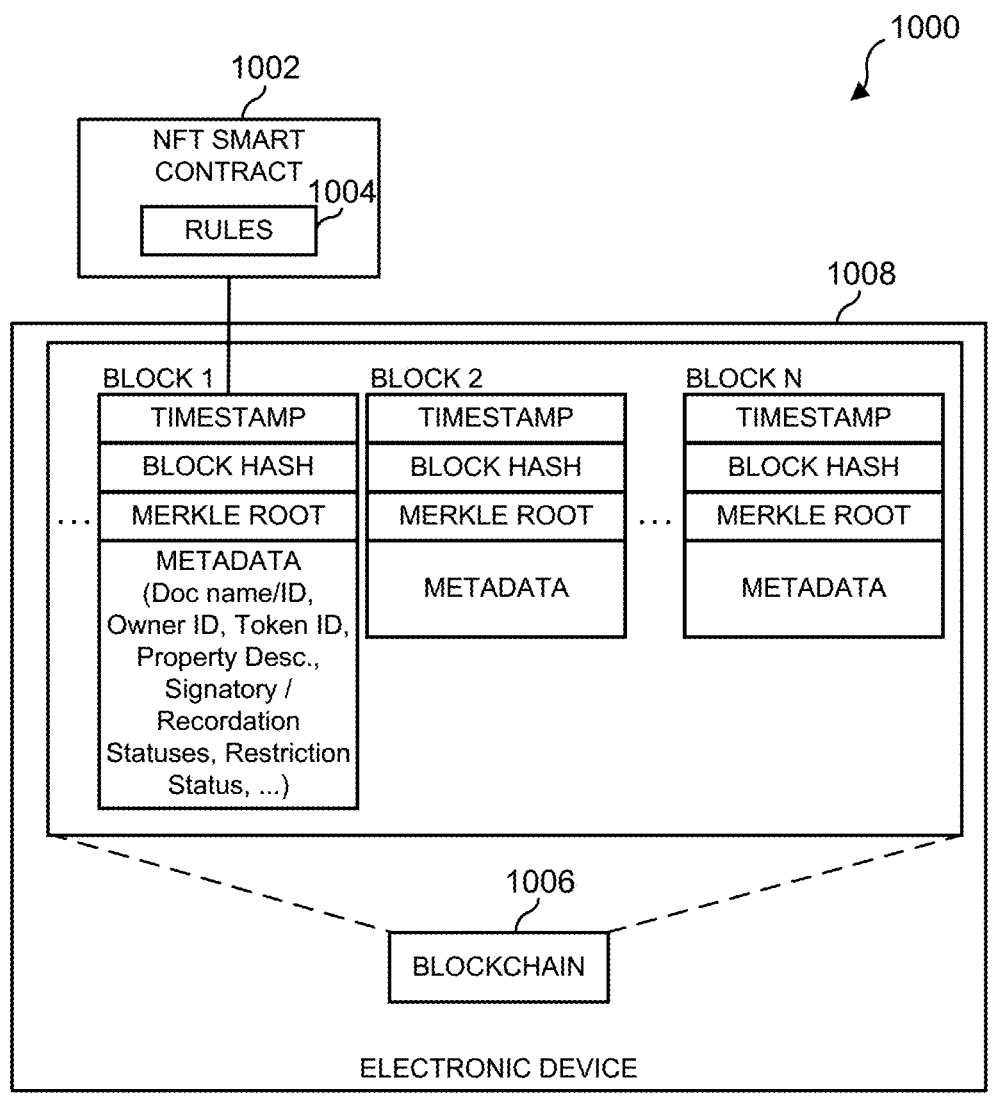
FIG. 10 illustrates an example blockchain architecture for dynamic NFT amendments and control in accordance with various embodiments of this disclosure.

FIG. 10 illustrates an example blockchain architecture 1000 for dynamic NFT amendments and control in accordance with various embodiments of this disclosure. As described in the various embodiments herein, the dynamic NFTs can be associated with digitized documents protected by a security stack, at least a part of which is governed by an NFT smart contract 1002 including a set of rules 1004 that define how the NFT and its underlying secure document can be accessed, amended, and/or transferred, etc. In various embodiments of this disclosure, the NFT smart contract 1002 can be a program, software, or transaction protocol that automatically executes, controls, or documents relevant events and actions according to terms of a contract, agreement, or set of rules. As described in the various embodiments of this disclosure, the underlying secure document can have various security and blockchain data embedded within, including a blockchain identifier, a blockchain/NFT token, a document name, a symbol designation that can identify the system that generated the secure document, a unique identifier for the document, a URI to an image of the digital secured document, and a URI for an image of the property. Unlike normal NFTs that do not allow for the NFT or its underlying assets to be altered after creation, in embodiments of this disclosure, using the rules 1004 of the NFT smart contract, the secure document can be updated in multiple steps to update the underlying secure document itself, such as by embedding one or more of the various security and blockchain data into the document, and/or the NFT metadata associated with the secure document can be amended to reflect changes made to the underlying document and/or status changes regarding the NFT associated with the underlying document.

For example, when a dynamic NFT for an associated digitized and secure document is created using the various systems and methods of the embodiments of this disclosure, an initially created document can be securely tokenized and minted on a blockchain 1006 with initial metadata and an associated NFT smart contract 1002. During this initial creation the secure document may not yet include the embedded security and blockchain data, such as a blockchain identifier, a blockchain/NFT token, a document name, a symbol designation that can identify the system that generated the secure document, a unique identifier for the document, a URI to an image of the digital secured document, and/or a URI for an image of the property. Using the restriction document 300 as an example, when initially tokenizing and minting the restriction document 300, the restriction document 300 may not yet include certain information in areas 306, 308, and 310.

Based on a triggering event as defined by the rules 1004 of the NFT smart contract 1002, these areas in the secure document can be updated to include various information, and/or the metadata stored on the blockchain 1006 can be updated to reflect changes to the NFT and/or the underlying document. For example, a triggering event may occur when the secure document is initially tokenized and minted, which automatically causes the blockchain and security information to be embedded into the document, such as embedding a blockchain identifier, a blockchain/NFT token, a document name, a symbol designation identifying the system that generated the secure document, and/or a unique identifier for the document, as available. The NFT metadata can also be updated to include at least some of this same information, such as updating the metadata to include the document name, the unique identifier for the document, etc.

If any information that is programmed to be embedded within the document comes available at a later date, the rules 1004 and of the NFT smart contract 1002 can include parameters for detecting such changes and automatically carrying out updates to the underlying document or to the NFT metadata. For example, in some embodiments, a property may not yet have an associated image for the property yet available, but, once such information becomes available, such as a property image with an associated URI being stored in the database 514 of FIG. 5, the NFT smart contract 1002 can be notified of this change regarding data related to the property related to the underlying secure document, and update the secure document and/or metadata accordingly, such as causing a URI linked to the property image to be embedded within the secure document, added to the NFT metadata, or both. As another example, the rules 1004 of the NFT smart contract 1002 can include an automated instruction that, when a scannable code using the NFT ID among other data as described in the embodiments of this disclosure is created, the secure document can be automatically updated by embedding the scannable code within the document. As yet another example, the rules 1004 of the NFT smart contract 1002 can include an automated instruction that, upon receiving notification that the underlying document has been signed, notarized, and/or recorded, NFT metadata for the appropriate block on the blockchain 1006 can be updated to include the signatory, notarization status, and/or recordation status of the document, and, in some embodiments, can cause a watermark to be applied to the underlying secure document.

As yet another example, if the purpose of the underlying secure document is to restrict or block a property from unauthorized conveyance or hypothecation, the NFT metadata stored on the blockchain 1006 can reflect the restriction status associated with the property and the underlying document, e.g., with a "restricted" status shown in the metadata. When the subject property is later released, such as via a release document that can also be created, tokenized, minted, and updated via a dynamic NFT as described herein, in some embodiments, the restriction status in the NFT metadata for the original restriction document can be set to a "released" state to put those viewing the metadata on notice that a subsequent release was created. In some embodiments, this "released" state may also be associated with the token ID for the subsequent release document, or other identifying information for the release document such as the release document's document ID, etc., to direct users to the subsequent release document. The dynamic NFT can be updated in various ways, such as updating NFT metadata dynamically with timestamps of write events, access events, storage events, etc.

A blockchain is a distributed ledger including records or blocks secured by cryptographic principles. Blockchains are typically decentralized, validated, secure, and immutable. As illustrated in FIG. 10, an electronic device 1008 includes a copy of the blockchain 1006 that includes a plurality of blocks representing a plurality of transactions, NFTs, etc., such as NFTs associated with the underlying secure and authenticated documents as described in the various embodiments of this disclosure. Other copies of the blockchain 1006 can be stored on other electronic devices, creating the decentralized nature of the blockchain. In some embodiments, the electronic device 1008 is a lightweight node that does not store a full copy of the blockchain 1006, but just the block headers of the blockchain 1006 to reduce the storage requirements. In some embodiments, the blockchain 1006 can either be a private blockchain or a public blockchain.

When a secure document is created using the systems and methods of the embodiments of this disclosure, information regarding the secure document is stored in a new block, such as block 1, in the blockchain 1006. As illustrated in the example of FIG. 10, block 1 includes metadata regarding the secure document such as owner information, a document ID, a property description, restriction or release status, etc., as described in the various embodiments of this disclosure. Blocks can also include a timestamp for the creation of the block, a block hash of the previous block, a nonce, a Merkle root, and other information included in the blockchain blocks. The Merkle root is a hash of the root of a Merkle tree included in the block's transactions. The Merkle tree stored is a data structure providing information on all transactions stored in the block. A hash is a numeric value of a fixed length that uniquely identifies the data. In some embodiments, the block hash and Merkle root hash can be generated using a cryptographic process such as SHA256. For example, the block hash can be created using a plurality of inputs, such as an index (number of current block in chain), a previous hash (for blocks after the genesis block), the timestamp, the data (document ID), and the nonce. The nonce can be a random number used to find or verify a valid hash.

Although FIG. 10 illustrates one example of a blockchain architecture 1000 for dynamic NFT amendments and control, various changes may be made to FIG. 10. For example, various components or functions shown or described may be combined, further subdivided, replicated, omitted, or rearranged and additional components or functions may be added according to particular needs. In general, this disclosure is not limited to any particular architecture configuration. It will be understood that the blocks shown in FIG. 10 are examples, and the blocks can include additional information without departing from the scope of this disclosure.

Figure 11A:
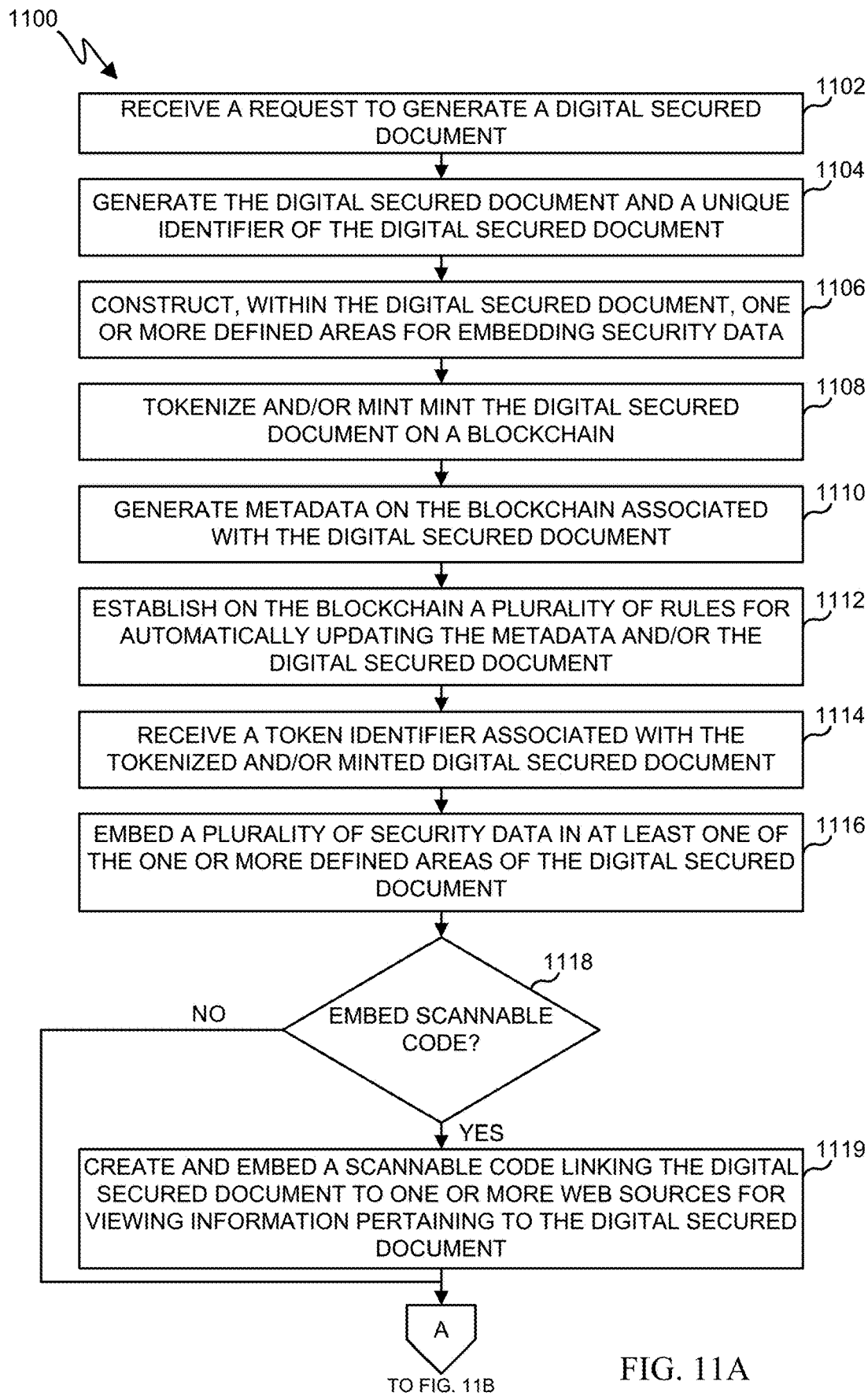
FIGS. 11A and 11B illustrate an example process for dynamically creating, securing, and amending documents using a blockchain in accordance with various embodiments of this disclosure.
Figure 11B:
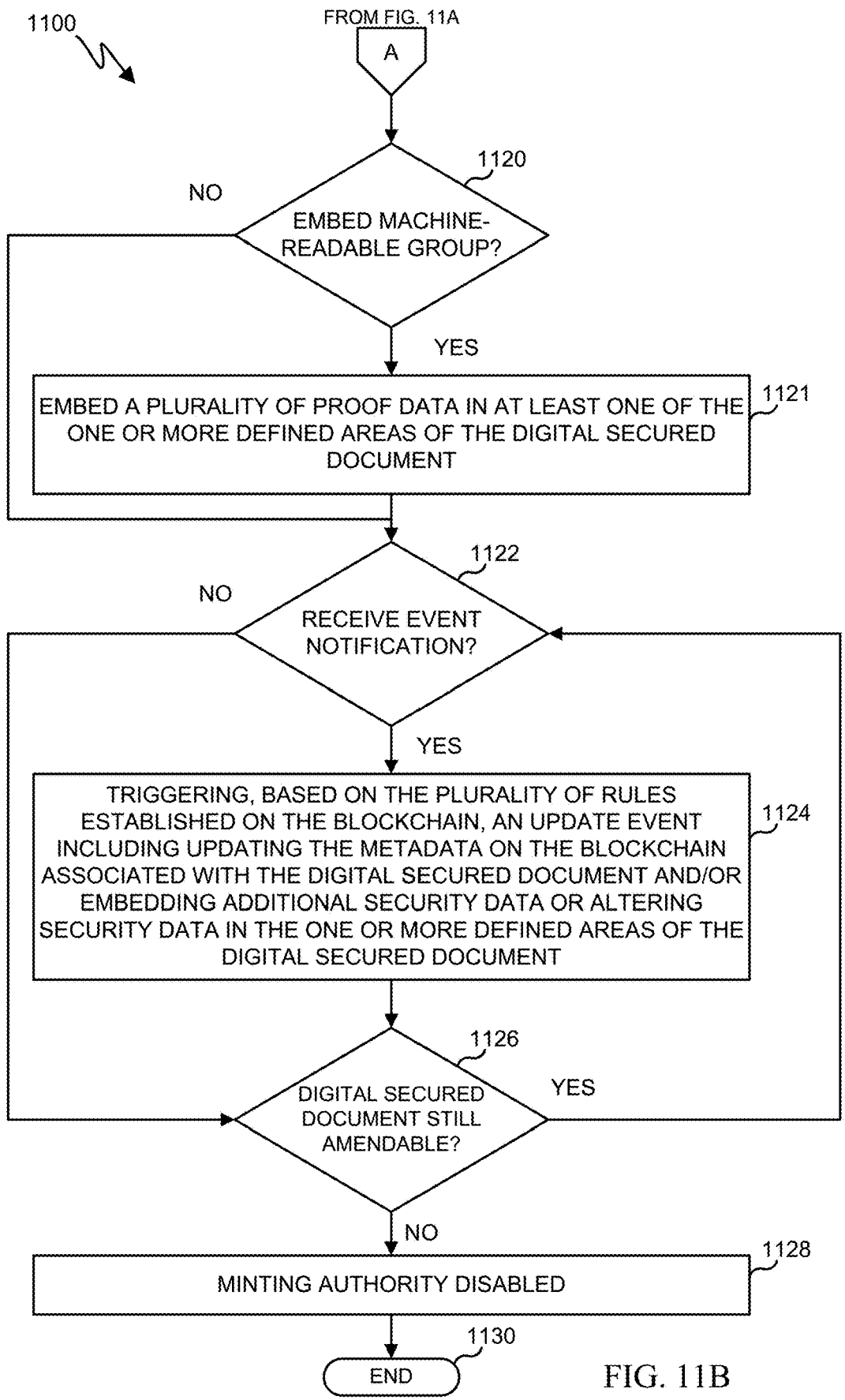

FIGS. 11A and 11B illustrate an example process 1100 for dynamically creating, tokenizing, securing, authenticating, proving, storing, and amending documents using a blockchain in accordance with various embodiments of this disclosure. For ease of explanation, the process 1100 is described as being performed using the system 200 of FIG. 2 within the network configuration 100 of FIG. 1, and/or using the architectures 500 and/or 600. It will be understood that various steps of the process 1100 can be carried out or instructed by a processor of the identified device, such as the processor 120, such as at least one processor of the scalable server system described in embodiments of this disclosure. However, the process 1100 may be performed using any other suitable device(s) and in any other suitable system(s).

At block 1102, the at least one processor receives a request to generate a digital and tokenized secured document. For example, as described in the various embodiments of this disclosure, the digital secured document can be a document establishing a restriction on a property or a document releasing a restriction on a property. At block 1104, the at least one processor generates the digital secured and tokenized document and a unique identifier of the digital secured and tokenized document. In some embodiments, the scalable server system includes a front end layer used by the at least one processor to receive the request to generate the digital secured and tokenized document, and a back end layer used by the at least one processor to process the request. In some embodiments, the front end layer includes an ingress controller, and the at least one processor uses the ingress controller to route requests, including the request to generate the digital secured and tokenized document, to one or more services executed by the back end layer based on a current load balance of the scalable server system.

At block 1106, the at least one processor constructs, within the digital secured document, one or more defined areas for embedding security data, such as the area 302, 304, 306, 308, 310, 314 described with respect to FIG. 3A. At block 1108, the at least one processor tokenizes and mints the digital secured document on a blockchain. Tokenizing and minting the digital secured document on the blockchain can include, at block 1110, the at least one processor generating metadata on the blockchain associated with the digital secured document, and, at block 1112, the at least one processor establishing on the blockchain a plurality of rules for automatically updating the metadata and/or the digital secured document, where the plurality of rules on the blockchain can be organized in a non-fungible token (NFT) smart contract.

At block 1114, the at least one processor receives a token identifier associated with the tokenized and minted digital secured document. At block 1116, the at least one processor embeds a plurality of security data in at least one of the one or more defined areas of the digital secured document. In some embodiments, the plurality of security data includes at least the unique identifier of the digital secured document and the token identifier. In some embodiments, the plurality of security data further includes one or more of a blockchain identifier, a watermark indicating an authentication or recordation status of the digital secured document, a URI to an image of a property associated with the digital secured document, a URI to an image of the digital secured document, a description of the property, and a visual symbol identifying a source of the scalable server system.

At decision block 1118, the at least one processor determines whether to embed a scannable code into the document. Decision block 1118 can occur when enough information has been gathered, received, or generated to create the scannable code. If, at decision block 1118, the at least one processor determines a scannable code is not to be created, the process 1100 moves to decision block 1120. If, at decision block 1118, the at least one processor determines a scannable code is to be created, the process 1100 moves to block 1119.

At block 1119, a scannable code is created and embedded within the digital secured document. In various embodiments, the scannable code links the digital secured document to one or more web sources for viewing information pertaining to the digital secured document. In some embodiments, the scannable code appears as physical marks embedded in the digital secured document. In some embodiments, the at least one processor creates the scannable code by using a combination of two or more of a property owner identifier, an agent identifier, a property identifier, the unique identifier of the digital secured document, and the token identifier.

At decision block 1120, the at least one processor determines whether to embed a machine-readable group into the document. If not, the process 1100 moves to decision block 1122. If so, the process 1100 moves to block 1121. At block 1121, the at least one processor proves the document and embeds in the document a plurality of proof data in the form of a machine-readable group. In various embodiments, proving the document can include using data within the document and/or outside data, to create a machine-readable group of proof data such as by using a combination of two or more of a random number, a random image, a raster image of one or more color maps, a vector image of one or more color maps, and a translation of one or more color maps. In some embodiments, the plurality of proof data is a result of the solution to a zero knowledge proof of the proving of one or more logical statements such logical statements being comprised of one or more of the processes, parameters, functions, and results of one or more of the above examples, where the results of the zero knowledge proof are used to generate particular shapes and alphanumeric characters, as well as display properties such as dimensions, orientations, shadings, and placements of the plurality of proof data. Once the document is proved, the machine-readable group is embedded within the document. In various embodiments, the machine-readable group is visually represented on the document as shapes and alphanumeric characters in various dimensions, orientations, shadings, and placements, appearing as physical marks embedded in the digital secured document. It will be understood that, in some embodiments, blocks 1120 and 1121 could be performed after block 1124, or as part of embedding additional security information in the document at block 1124.

At decision block 1122, the at least one processor determines if an event notification is received. In various embodiments, the event notification can be a notification of (i) an event associated with the digital secured document or (ii) new information associated with the digital secured document, such as a notification of a release of a restriction document or other data as described in the various embodiments of this disclosure. If, at decision block 1122, no event notification is received, the process 1100 moves to decision block 1126. If, at decision block 1122, an event notification is received, in response, at block 1124, the at least one processor triggers, based on the plurality of rules established on the blockchain, an update event, wherein the update event includes updating the metadata on the blockchain associated with the digital secured document and/or embedding additional security data into the one or more defined areas of the digital secured document.

In various embodiments of this disclosure, the security document, and/or copies or images thereof, can be stored according to an on-chain permaweb protocol. Permaweb refers to a blockchain-based decentralized storage network that provides immutable and permanent storage of data. Unlike storing data on traditional storage servers, the data stored according to the permaweb protocol cannot be removed, avoiding the possibility that a web resource such as the security document of the various embodiments of this disclosure will be deleted and access to the resource lost. A traditional server structure is eschewed and instead an auto-scaling, decentralized, set of storage devices is used, scaled based on required storage capacity for a particular entity.

At decision block 1126, the at least one processor determines if the digital secured document is still amendable. For example, a digital secured document may be set to no longer be amendable based on the rules of the smart contract, such as if a restriction in a restriction document has been released. In such an example, since the restrictions are released, further modification of the restriction document or its NFT metadata may be locked. If, at decision block 1126, the at least one processor determines the digital secured document is still amendable, the process 1100 can loop back to decision block 1122 to determine if another event notification is received. If, at decision block 1126, the at least one processor determines the digital secured document is no longer amendable, at block 1128, the minting authority can be disabled, disallowing any further changes to the metadata or other data associated with the NFT. The process 1100 can end at block 1130.

Although FIGS. 11A and 11B illustrate one example of a process 1100 for dynamically creating, securing, and amending documents using a blockchain, various changes may be made to FIGS. 11A and 11B. For example, while shown as a series of steps, various steps in FIGS. 11A and 11B may overlap, occur in parallel, occur in a different order, or occur any number of times. As another example, one or more services executed by the back end layer can include one or more application pods or modules. The process can further include the at least one processor automatically deploying the one or more application pods or modules based on a current demand of the scalable server system, wherein the one or more application pods or modules are used by the at least one processor to perform at least the generation and tokenization and minting of the digital secured document described with respect to blocks 1104-1126.

Figure 12:
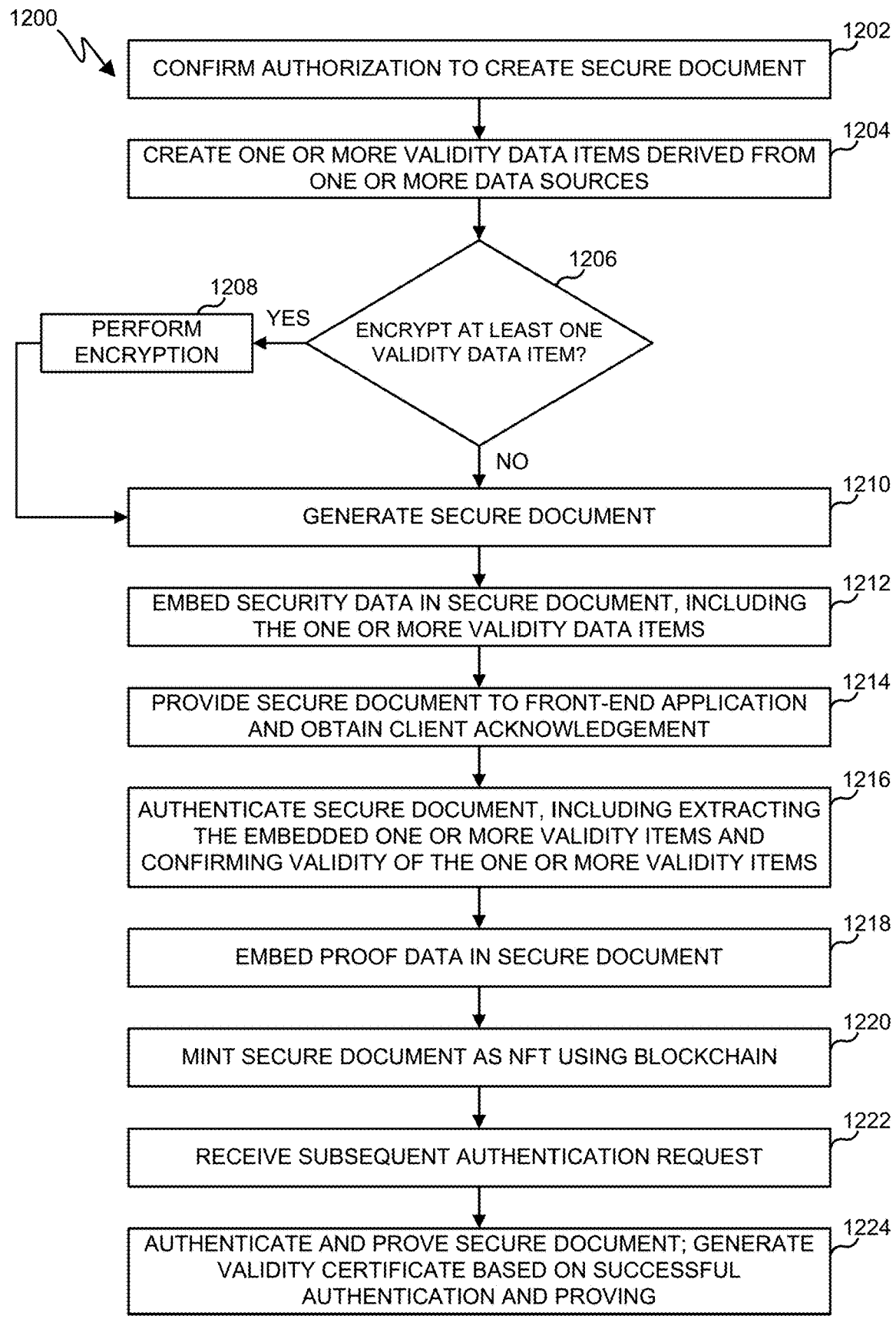
FIG. 12 illustrates an example process for creating validity data for embedding within a digital secure document in accordance with embodiments of this disclosure.

FIG. 12 illustrates an example process 1200 for creating validity data for embedding within a digital secure document in accordance with embodiments of this disclosure. For ease of explanation, the process 1200 is described as being performed using the system 200 of FIG. 2 within the network configuration 100 of FIG. 1, and/or using the architectures 500 and/or 600. It will be understood that various steps of the process 1200 can be carried out or instructed by a processor of the identified device, such as the processor 120. However, the process 1200 may be performed using any other suitable device(s) and in any other suitable system(s). Additionally, the process 1200 can be performed as part of one or more other processes of this disclosure, such as the processes 700 and/or 800.

As described in this disclosure, in various embodiments, a client authorization for proceeding with creating, finalizing, and minting a digital secure document is sought to ensure the client associated with the digital secure document consents to creation of the digital secure document. At block 1202, the processor confirms a client authorization is received to create a secure document. At block 1204, the processor creates one or more validity data items derived from one or more data sources. In various embodiments of this disclosure, in addition to embedding security data such as security and blockchain information concerning the secure document (e.g., a blockchain identifier, a blockchain/NFT token, a document name, a symbol designation that can identify the system that generated the secure document, a unique identifier for the document, a URI to an image of the digital secured document, and/or, in some embodiments, a URI for an image of a property), other validity data items can be derived from one or more sources and embedded into the document as either visual validation information and/or hidden validation information.

For example, visual validation information can include validation data items that are embedded into the secure document and that can act as a human-detectable visual marker that indicates to a reviewer whether the information typically found in such a secure document is present. Such visual validation information can provide an overall impression of the secure document that reviewers who are familiar with the secure document type may instinctively notice if such visual identification information is missing. The visual identification information can include the security and blockchain information, such as the types of information found in the blockchain authentication data area 310, 410 described with respect to FIGS. 3A and 4A, and/or other types of visual information embedded in the secure document such as a watermark or proof data (such as described with respect to FIGS. 3B and 4B), an image (such as an image of a property), video and/or audio elements, a logo indicating a source of the secure document, false, corrupted, or random text or characters embedded in one or more areas of the secure document, or other visual data.

In some embodiments, hidden validation information can include unique data strings derived or created from data associated with the secure document. For example, a unique string could be created by combining record data associated with the secure document, such as combining a secure document ID, a secure document type, and a property identification (e.g., an address) into a unique string. As another example, data values (such as a subset of data values from metadata or raw file data) can be extracted from digital images, video, audio, text documents, and/or other media and hidden within the secure document, such as a within the scannable code of the secure document, within metadata of the secure document, or other areas of the secure document. For example, the image referenced by the URI in the secure document as described with respect to FIGS. 3A-4B could have at least portions of its metadata or raw data extracted and embedded within the secure document.

In some embodiments, the validity data can be further manipulated by adding intentionally altered data into the derived data, increasing the uniqueness of the data, which in turn makes it increasingly difficult for a would-be counterfeiter to create either a visually or machine-detectable authentic document. Embodiments of this disclosure thus can include performing error detection of extracted data through creation, population, insertion, seeding, doping, or otherwise entering intentionally corrupted, altered, modified, non-true, or otherwise false data; that is, perfecting validity by creating invalidity, such as by embedded proof data as described in this disclosure. Embodiments of this disclosure can also include the validation, authentication, proving, and/or certification of secure documents through extracting and confirming false data values in digitized images, documents, video, audio, and other media; that is, proving what is valid by revelation of the invalid.

Additionally or alternatively, embodiments of this disclosure can include performing error detection of extracted data values encrypted through elliptical curve cryptography functions, such as an Edwards Curve Digital Signature Algorithm (EdDSA) and other forms of elliptical curve cryptography functions; that is hiding or obscuring what is invalid. Additionally or alternatively, embodiments of this disclosure also can use elliptical curve cryptography functions within functions and operations of QR code scanning, reading, and authenticating.

For example, at decision block 1206, the processor determines whether at least one validity data item it to be encrypted, such as via elliptical curve cryptography. If not, the process 1200 moves to block 1210. If so, at block 1208, the encryption of the at least one data item is performed. For example, at least one validity data item derived from the one or more sources can be encrypted/signed, and the encrypted/signed at least one data item can be then embedded into the secure document.

At block 1210, the processor generates the secure document, which includes default information such as information provided by an agent, such as owner and property information. At block 1212, the processor embeds security data in the secure document. As described in the various embodiments of this disclosure, the embedded security data can include a unique scan code, which can appear as physical marks on the document, as well as other data such as various embedded security and blockchain information concerning the secure document, such as a blockchain identifier, a blockchain/NFT token, a document name, a symbol designation that can identify the system that generated the secure document, a unique identifier for the document, a URI to an image of the digital secured document, and a URI for an image of the property. Additionally, the embedded security data can include the one or more validity items created at block 1204, and possibly encrypted/signed at block 1208. As described above, the embedded one or more validity data items can be embedded visually in the secure document, or embedded as hidden information.

At block 1214, the processor provides the secure document to the front end application of the agent. The processor then obtains a client acknowledgement, as described in embodiments of this disclosure. At block 1216, after receiving the acknowledged document, the processor can authenticate the document, such as by confirming the validity of the security data embedded in the document, which can include extracting and possibly decrypting the embedded one or more validity data items.

At block 1218, the at least one processor can provide additional security information by proving the document and embedding in the document a plurality of proof data in the form of a machine-readable group. In various embodiments, proving the document can include using data within the document and/or outside data, to create a machine-readable group of proof data such as by using a combination of two or more of a random number, a random image, a raster image of one or more color maps, a vector image of one or more color maps, and a translation of one or more color maps. In some embodiments, the plurality of proof data is a result of the solution to a zero knowledge proof of the proving of one or more logical statements such logical statements being comprised of one or more of the processes, parameters, functions, and results of one or more of the above examples, where the results of the zero knowledge proof are used to generate particular shapes and alphanumeric characters, as well as display properties such as dimensions, orientations, shadings, and placements of the plurality of proof data. Once the document is proved, the machine-readable group is embedded within the document. In various embodiments, the machine-readable group is visually represented on the document as shapes and alphanumeric characters in various dimensions, orientations, shadings, and placements, appearing as physical marks embedded in the digital secured document. It will be understood that the authentication at block 1216 can occur before the proving in block 1218, as shown in FIG. 12, or the authenticating at block 1216 could occur after the proving at block 1218 in various embodiments.

At block 1220, the processor then tokenizes and mints the secure document as an NFT, as described in the various embodiments of this disclosure. Various public-facing interfaces can allow the owner and possibly others to view the secure document or NFT metadata for the secure document, as described in the various embodiments of this disclosure, to verify the memorialized intent of the owner, the nature of the transaction underlying the secure document, etc. In some embodiments, a subsequent authentication of the secure document can be performed. For example, an agent or other third-party may obtain what is reportedly a stored or recorded secure document, such as accessing a public website or other public information source that includes a copy of the secure document, such as county deed records in some embodiments. In such circumstances, the agent or third-party may wish to seek certification of the validity of the secure document, e.g., if a recorded restriction or release document is valid or whether it is a forgery.

At block 1222, the processor receives a subsequent authentication request, such as from the agent or third-party. It may be that, at a later date of a secure document being created and publicly recorded, that an agent or another third-party wishes to verify the recorded document is authentic or a copy of the secure document in their possession is genuine. Using the embedded security and/or proof data, it can be determined by the system/processor whether the provided document is authentic, such as by using a digital signing scheme in conjunction with the embedded security information and/or by using the embedded proof data to prove the document is genuine using the various techniques provided in this disclosure. At block 1224, the processor performs authentication and proving of the (potentially) secure document received at block 1220. The authentication and proving performed can be the same as or similar to that performed at blocks 1216 and 1218. If the document is deemed to not be authentic, the processor can cause a message of failed authentication to be output to the agent or other third-party. If the secure document is deemed authentic, in some embodiments, in addition to providing a message that the secure document is authentic, the processor may also cause the generation of an authentication certificate that can be used as evidence that the secure document is an authentic document.

Although FIG. 12 illustrates one example process 1200 for creating validity data for embedding within a digital secure document, various changes may be made to FIG. 12. For example, while shown as a series of steps, various steps in FIG. 12 may overlap, occur in parallel, occur in a different order, or occur any number of times.

Figure 13:
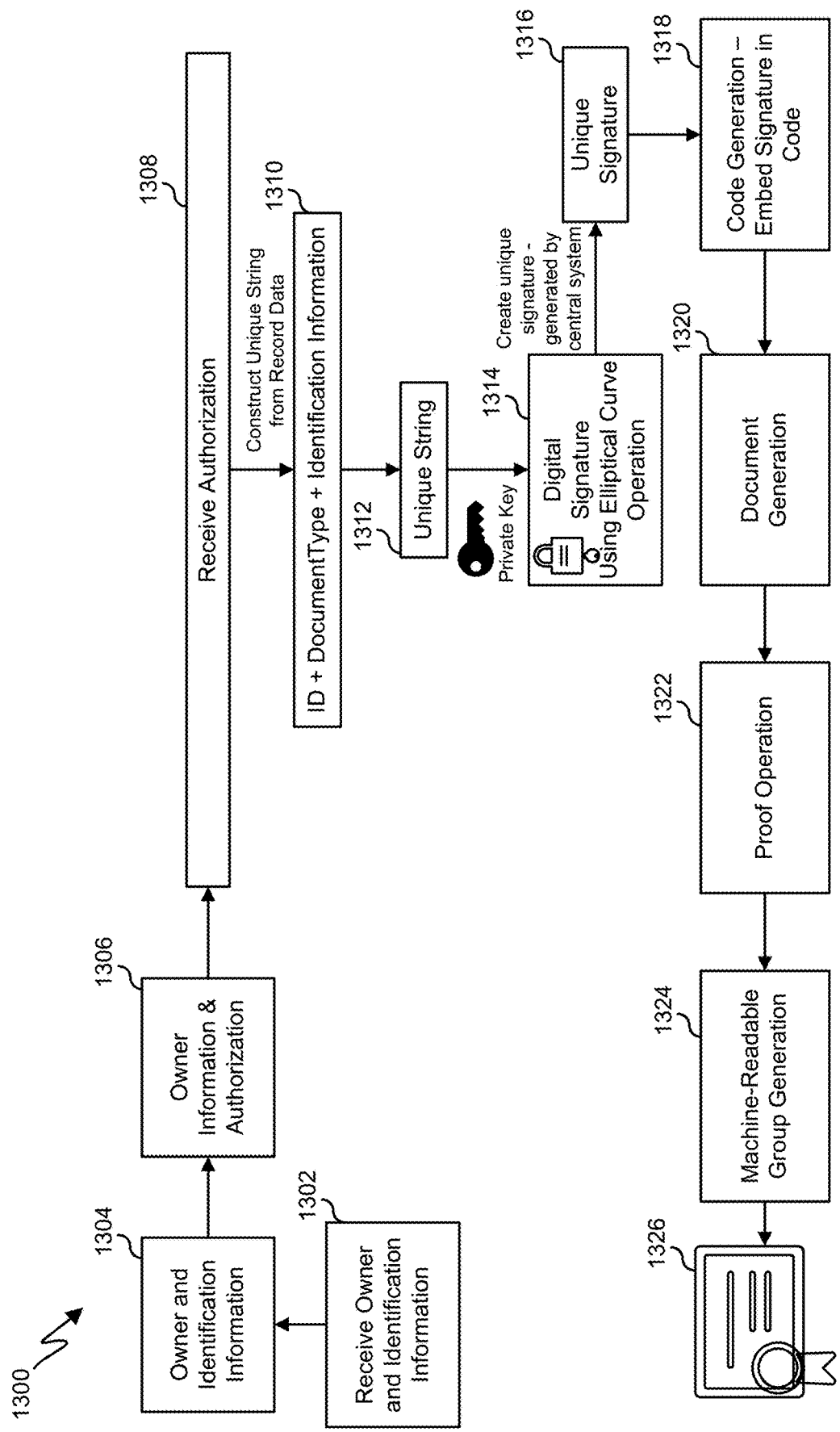
FIG. 13 illustrates an example process for embedding a unique and authenticatable unique signature into a scannable code of a secure document in accordance with various embodiments of this disclosure.

FIG. 13 illustrates an example process 1300 for embedding a unique and authenticatable unique signature into a scannable code of a secure document in accordance with various embodiments of this disclosure. For ease of explanation, the process 1300 is described as being performed using the system 200 of FIG. 2 within the network configuration 100 of FIG. 1, and/or using the architectures 500 and/or 600. It will be understood that various steps of the process 1300 can be carried out or instructed by a processor of the identified device, such as the processor 120. However, the process 1300 may be performed using any other suitable device(s) and in any other suitable system(s). Additionally, the process 1300 can be performed as part of one or more other processes of this disclosure, such as the processes 700, 800, 1100, and/or 1200.

At step 1302, owner and identification information to be included in a secure document is received, such as from an agent as described in embodiments of this disclosure. The owner and identification information 1304 is provided for an owner information and authorization step 1306 in which, as described in this disclosure, the owner and identification information 1304 is used to request authorization from an owner related to a subject property of the secure document. At step 1308, owner authorization is received, triggering further creation of a secure document.

At step 1310, the processor begins creating a unique string from record data associated with the secure document to be created. The processor generates and/or retrieves an identifier, such as a secure document identifier to be associated with the secure document being created, a document type of the secure document to be created, and identification information that is relevant to the transaction underlying the secure document (such as a property address). The processor combines the identifier, the document type, and the identification information (e.g., 12345-nor-3501-lancaster). To further enhance the uniqueness of the unique string, for example, the identifier, the document type, and the identification information can be input into a hash function. In some embodiments, the hash function takes the identifier, document type, and the identification information as a variable length input key and folds the input using a parity-preserving operator such as ADD or XOR, scrambling the bits of the key so that resulting values are mapped over a keyspace, and mapping the key values. Additionally, to minimize possible duplication/collision of output values, a randomly generated nonce can be added to the combination of the identifier, the document type, and the identification information prior to execution of the hash function. This produces a unique string 1312. At step 1314, the processor signs the unique string 1312 using a private key and using an elliptical curve singing process, such as via an Edwards curve digital signing scheme, to create a unique signature 1316.

For example, the Edwards curve digital signing scheme can be used to obfuscate the unique string by signing the unique string using the private key, (the signing key). The input message can be hashed and then the signature calculated by the signing algorithm. The signed unique string can then be verified using the corresponding public key (the authentication key). The signed message can be hashed and decryption calculations are performed by the signature algorithm using the message hash and the public key. The EdDSA signature algorithm uses elliptical curves like Curve25519 and Curve448, which are highly optimized for performance and security. The result from signing can be a Boolean value (valid or invalid signature). In various embodiments, the EdDSA signing operation generates a deterministic (not random) integer r (computed by hashing the message and the hash of the private key), then computes the signature {Rs, s }, where Rs is computed from r and s is computed from the hash of (the message+the public key derived from the private+the number r)+the private key. The signature is deterministic, that is, the same message signed by the same key always gives the same signature). The EdDSA signature verification algorithm involves elliptic-curve computations, based on the message (hashed together with the public key and the EC point Rs from the signature)+the public key+the number s from the signature {Rs, s }. In some embodiments, the keys can fit in 32 bytes (64 hex digits), signatures fit in 64 bytes (128 hex digits), which can allow for signing and verification to be faster and to provide increased security.

At step 1318, the processor creates a scannable code and embeds the unique signature 1316 into the scannable code. At step 1320, the processor generates the secure document 1326 and embeds at least the scannable code that has embedded and hidden therein the unique signature 1316. The secure document 1326 can thus be authenticated only by a central authority with access to the key used to sign the unique string, and by first extracting the signed unique string from the scannable code embedded within the secure document 1326.

At step 1322, the processor performs a proof operation in which the generated secure document 1326 is proved. As described in the various embodiments of this disclosure, proving the document can include using data within the document and/or outside data, to create a machine-readable group of proof data such as by using a combination of two or more of a random number, a random image, a raster image of one or more color maps, a vector image of one or more color maps, and a translation of one or more color maps. In some embodiments, the plurality of proof data is a result of the solution to a zero knowledge proof of the proving of one or more logical statements such logical statements being comprised of one or more of the processes, parameters, functions, and results of one or more of the above examples, where the results of the zero knowledge proof are used to generate particular shapes and alphanumeric characters, as well as display properties such as dimensions, orientations, shadings, and placements of the plurality of proof data. Once the document is proved, at step 1324, the processor generates and embeds the machine-readable group within the secure document 1326. In various embodiments, the machine-readable group is visually represented on the document as shapes and alphanumeric characters in various dimensions, orientations, shadings, and placements, appearing as physical marks embedded in the secure document 1326. The process 1300 ends by outputting the secure document 1326 that includes the security data and proof data.

Although FIG. 13 illustrates one example process 1300 for embedding a unique and authenticatable unique signature into a scannable code of a secure document, various changes may be made to FIG. 13. For example, while shown as a series of steps, various steps in FIG. 13 may overlap, occur in parallel, occur in a different order, or occur any number of times.

Figure 14:
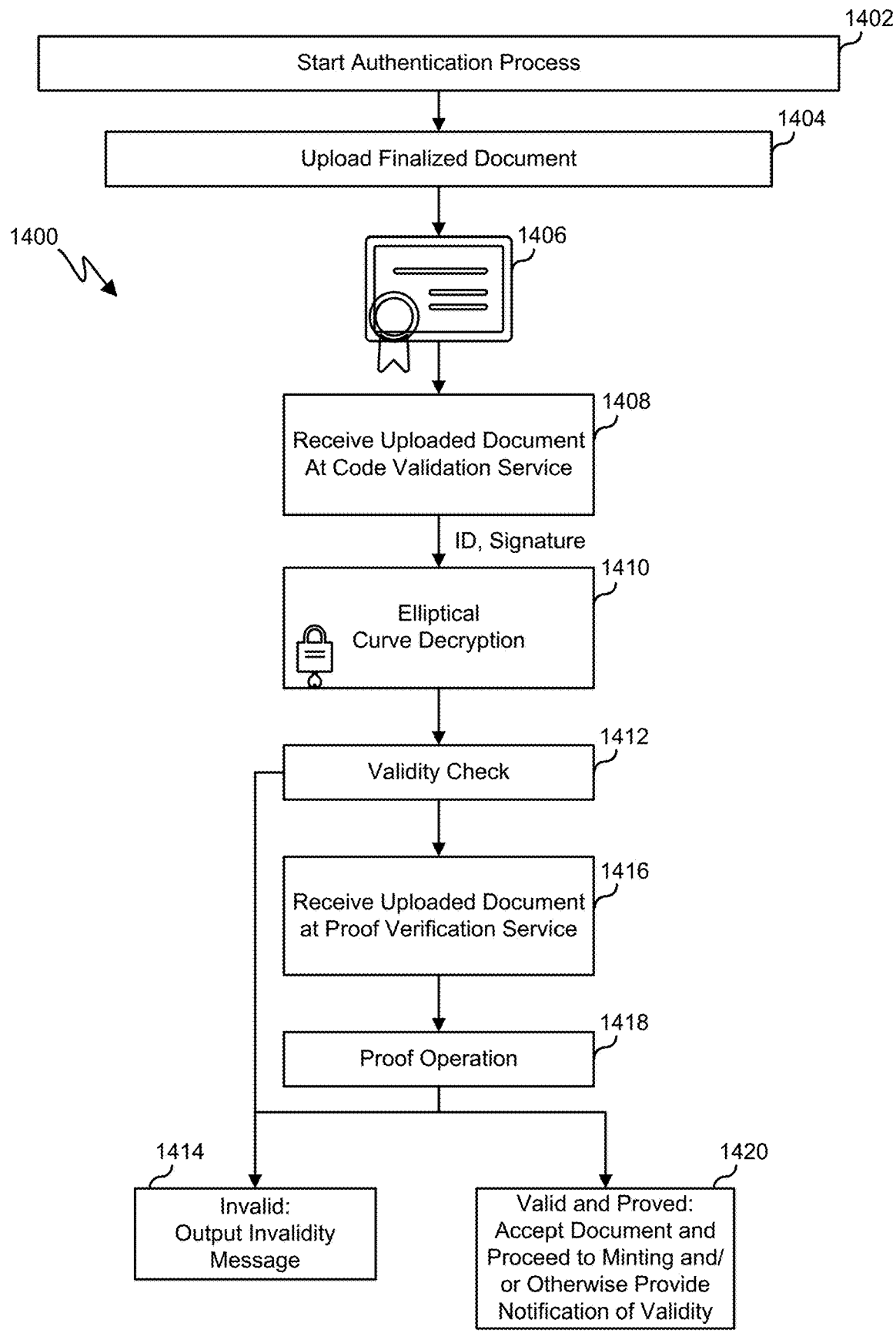
FIG. 14 illustrates an example process for authenticating a secure document having an embedding unique signature in accordance with various embodiments of this disclosure.

FIG. 14 illustrates an example process 1400 for authenticating a secure document having an embedded unique signature in accordance with various embodiments of this disclosure. For ease of explanation, the process 1400 is described as being performed using the system 200 of FIG. 2 within the network configuration 100 of FIG. 1, and/or using the architectures 500 and/or 600. It will be understood that various steps of the process 1400 can be carried out or instructed by a processor of the identified device, such as the processor 120. However, the process 1400 may be performed using any other suitable device(s) and in any other suitable system(s). Additionally, the process 1400 can be performed as part of one or more other processes of this disclosure, such as the processes 700, 800, 1100, 1200, and/or 1300.

As shown in FIG. 14, an authentication process is started or triggered at step 1402. For example, authentication of a secure document may be triggered after a client or other user signs the secure document and provides the secure document for further processing. In some embodiments, authentication can also be triggered at other times, such as if a user retrieves a recorded secure document and wishes to obtain a certification that the secure document is authentic and not a forgery or other false document.

At step 1404, the secure document to be authenticated is uploaded and an uploaded secure document 1406 is received at step 1408 by a code validation service executed or instructed by the processor. At step 1410, the secure document ID is used to retrieve a public key associated with the private key used to originally sign the unique string or message, as the secure document ID can be associated with the private key by the central system when the secure document was created. It will be understood that, although the key used to decrypt the data is referred to as a public key, the public key may not be available publicly, but retained confidentially by the central system to be securely used in authentication processes.

At step 1410, the processor scans the scannable code embedded within the document 1406, extracts the data from the scannable code, and identifies the unique signed string included within the scannable code. The processor then decrypts the unique signed string using an elliptical curve decryption scheme, such as an Edwards curve scheme as described above, to obtain the original unique string. At step 1412, the processor performs a validity check by determining if the decrypted unique string matches the original unique string created for the secure document 1406.

If the processor determines the validity check is not passed, at step 1414, the processor can cause an invalidity message to be output and/or transmitted to the user or entity that requested the authentication process. If the processor determines the validity check is passed, at step 1416 the uploaded document can be received by a proof verification service, and a proof operation is performed on the uploaded document at step 1418. The proof operation can include the various techniques as described in this disclosure to prove that proof data embedded in the secure document is accurate, such as by referencing the original source data used to generated the proof data, recreating the proof data, and determining if the embedded proof data in the secure document matches the newly recreated proof data. If the proof operation is not successful, that is, the proof data does not match, the invalidity message can be output at step 1414.

If the proof operation is successful, at step 1420, the processor can accept the document and proceed to minting of the secure document, if authentication and proving takes place during the creation of the secure document, such as after a signed/acknowledged secure document is uploaded during the creation/minting process. A separate message of successful authentication and proving can also be provided at or near this time. As described above, in some embodiments, authentication and proving can also be triggered at other times, such as if a user retrieves a recorded secure document and wishes to obtain a certification that the secure document is authentic and not a forgery or other false document. In this case, the processor can cause the central system to output or transmit a message indicating the secure document is valid, and/or can provide other proof of validity, such as a certificate of validity generated by the central system.

The process 1400 and the other systems and processes disclosed herein thus provide various benefits and improvements in the art and in electronic devices or networks. For example, the authentication performed, which can include using elliptical curve cryptography as described in the various embodiments therein, provides a more efficient means of verifying by an electronic device the authenticity of a document. Where previously the electronic device may have to compare all the raw data of the original document and a purported authentic copy, this disclosure provides for a more efficient process of creating a unique string used as part of a digital signing process, such that only decryption using the digital signing process can be performed to authenticate the document rather than comparing the raw data, substantially improving the speed and efficiency of the electronic device to perform such document authentication.

Additionally, proving documents that result in a machine-readable group of shapes and alphanumeric characters in various dimensions, orientations, shadings, and placements that are embedded as physical marks embedded in the documents, provides various benefits and improvements. This proving can be done by using a combination of two or more of a random number, a random image, a raster image of one or more color maps, a vector image of one or more color maps, and a translation of one or more color maps, and/or using a zero knowledge proof solution. Generating proof data and embedding the proof data in the documents allows for substantially higher security around the secure documents, as it will be incredibly difficult for a malicious actor to recreate or forge such embedded proof data. For example, in the case of forged release documents, even if a malicious actor were to embed similarly-styled proof data in a document, the system and processes described in this disclosure could easily determine that such false embedded proof data was not generated using the system and processes of this disclosure. Further, checking the validity of proof data in a document can be performed much more efficiently than other document validity routines, such as routines that require comparing the full raw data of two documents.

Although FIG. 14 illustrates one example process 1400 for authenticating a secure document having an embedding unique signature, various changes may be made to FIG. 14. For example, while shown as a series of steps, various steps in FIG. 14 may overlap, occur in parallel, occur in a different order, or occur any number of times. As one example, in some embodiments, steps 1416 and 1418 may not be included in the process 1400, such as in embodiments in which proof data is not added to the secure document, or in embodiments in which only authentication of the document using the other embedded security information is requested.

Figure 15:
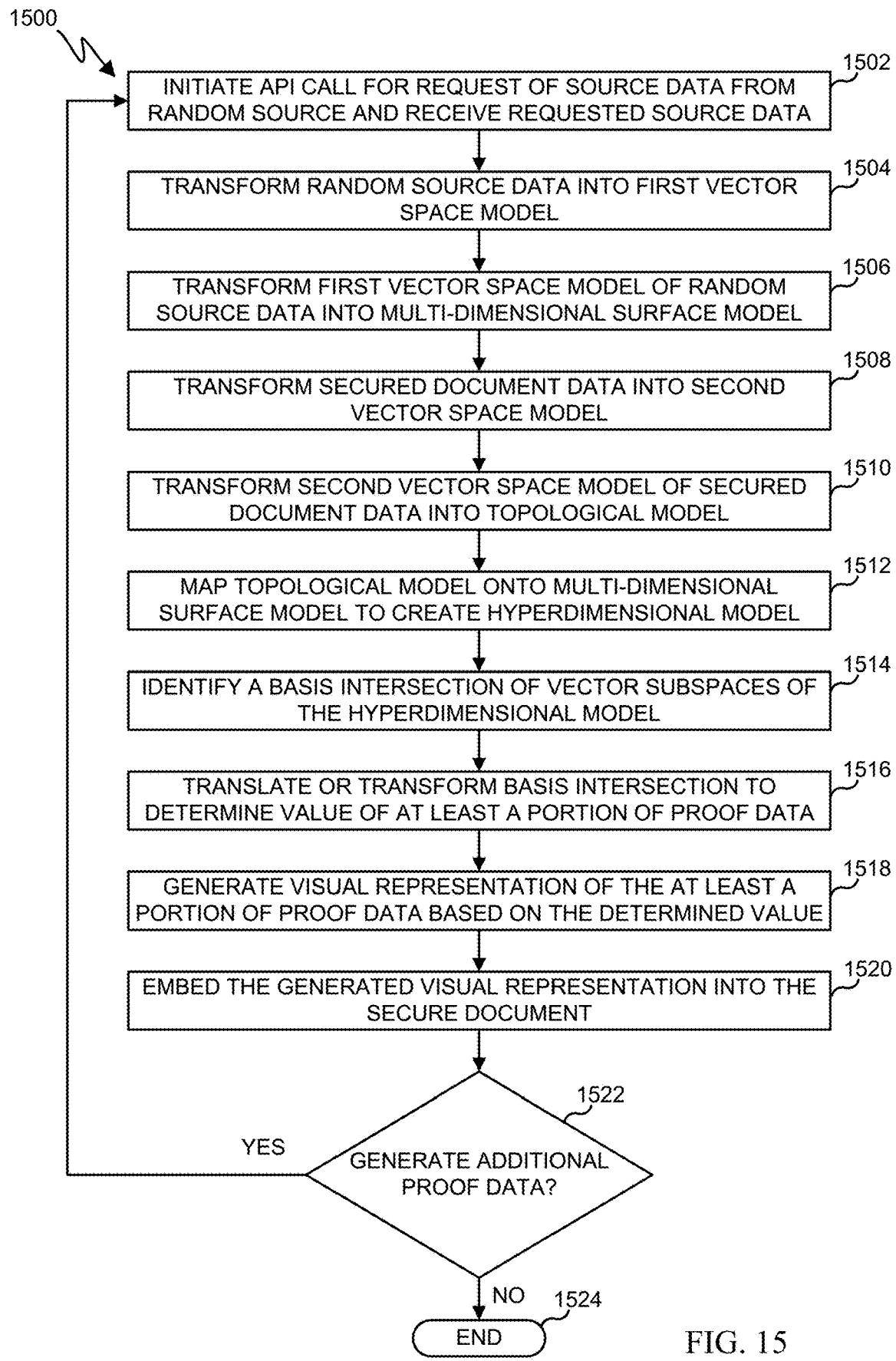
FIG. 15 illustrates an example process for proving a secure document and embedding proof data in the secure document in accordance with various embodiments of this disclosure.

FIG. 15 illustrates an example process 1500 for proving a secure document and embedding proof data in the secure document in accordance with various embodiments of this disclosure. For ease of explanation, the process 1500 is described as being performed using the system 200 of FIG. 2 within the network configuration 100 of FIG. 1, and/or using the architectures 500 and/or 600. It will be understood that various steps of the process 1500 can be carried out or instructed by a processor of the identified device, such as the processor 120. However, the process 1500 may be performed using any other suitable device(s) and in any other suitable system(s). Additionally, the process 1500 can be performed as part of one or more other processes of this disclosure, such as the processes 700, 800, 1100, 1200, 1300, and/or 1400.

As described in this disclosure, proof data can be embedded into secure documents to evidence the truthfulness or genuineness of the secure document. The proving of secure documents can be performed in a variety of ways using various source data. For instance, at block 1502, the processor initiates an API call to request source data from a random source. The source data is used as the basis of the proof and to generate the proof data that is to be embedded in the secure document. Using a random source substantially decreases the likelihood that a malicious actor or party can recreate the proof data, thus improving the overall security provided by, and in relation to, the secure document. In some embodiments, the system can store a list of data sources and randomly choose one for the proof data generation. In some embodiments, the data sources can be data unrelated to the secure document, such as data relating to naturally occurring phenomena, to further remove and obfuscate how the proof data is generated.

Figures 16A, 16B:
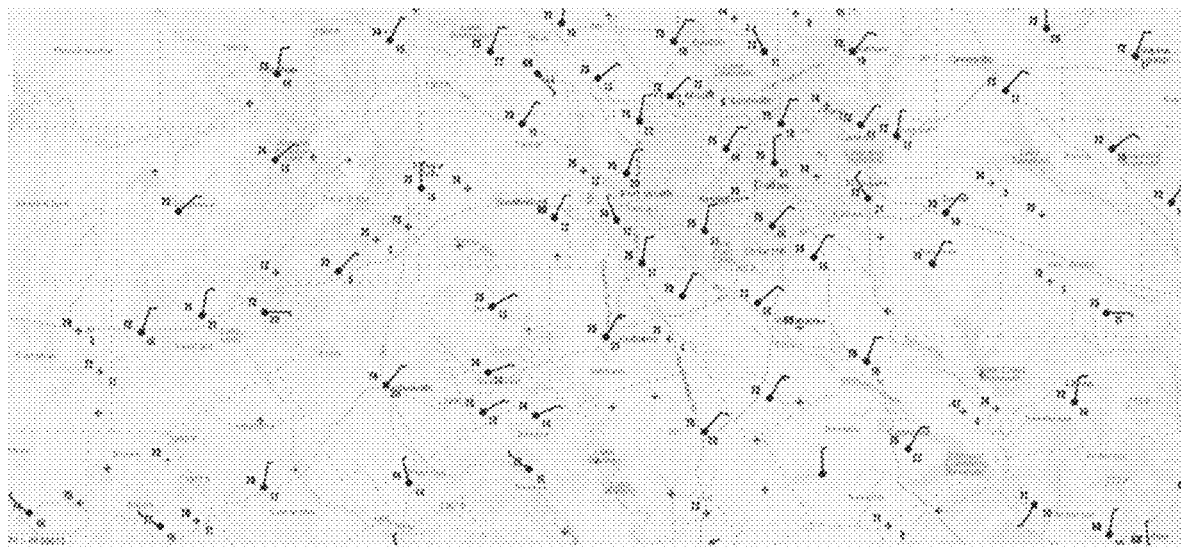
FIGS. 16A and 16B illustrate example source data from naturally occurring phenomena in accordance with various embodiments of this disclosure.

As one example, FIGS. 16A and 16B illustrate example source data from naturally occurring phenomena in accordance with various embodiments of this disclosure. In particular, the source data of this example is retrieved from a particular public data source (North Texas dated Apr. 21, 2023, NWS Weather & Hazards Data Viewer (https://www.wrh.noaa.gov/map) that includes information regarding wind speed and wind direction for a geographical area. It will be understood that the source data can be retrieved from any available data source. In this one example, the source data includes an image of a wind speed and wind direction map 1601 shown in FIG. 16A. Regions in the map contain visual objects, such as colored numbers and wind barbs with pennants in this example, that are human readable projections of wind speed and wind direction. This image can have associated raw data 1602, such as shown in FIG. 16B, that is further used in the process 1500. The raw data 1602 can thus be source data of imagery-based basemap content, which in this example includes a list of multiple data types including wind speed and wind direction that is used for rendering the visual objects of the map 1601. At block 1504, the processor transforms the source data into a vector space model.

For instance, using the raw data 1602, the processor can transform the raw data 1602 that includes the list of data types into a vector space model. In this example, a matrix is created as the vector space model utilizing a transformation operator that transforms the list of random naturally occurring phenomena into a matrix of random naturally occurring phenomena, to be then used in a subsequent operation to create a multi-dimensional mathematical surface. The transformation at block 1504 can be represented as:

$$\{\text{"wind\_speed", "wind\_direction"}\} \rightarrow \begin{bmatrix} X_{11} & X_{12} & X_{1n} \\ X_{21} & X_{22} & X_{2n} \\ X_{n1} & X_{n2} & X_{nn} \end{bmatrix}$$

As shown above, the source data (in this example, a list) is transformed by a transformation operator (in this example, a vector) to a vector space model (in this example a n X n matrix). At block 1506, the processor, using the vector space model created at block 1504, and using another transformation operator, transforms the vector space model into a multi-dimensional surface model (in this example, a matrix) of random naturally occurring phenomena. In this example, the transformation at block 1506 can be represented as:

$$\begin{bmatrix} X_{11} & X_{12} & X_{1n} \\ X_{21} & X_{22} & X_{2n} \\ X_{n1} & X_{n2} & X_{nn} \end{bmatrix} \rightarrow \begin{bmatrix} S_{11} & S_{12} & S_{1n} \\ S_{21} & S_{22} & S_{2n} \\ S_{n1} & S_{n2} & S_{nn} \end{bmatrix}$$

As shown above, the vector space model (an n X n matrix) is transformed at block 1506 using a transformation operator, such as a vector, into a multi-dimensional surface model, which is another n X n matrix. The multi-dimensional surface model obtained as the result of the transformation operation on the matrix of random naturally occurring phenomenon has unique attributes, qualities, quantities, values, measurables, and observables for purposes of mapping.

Figures 16C, 16D:
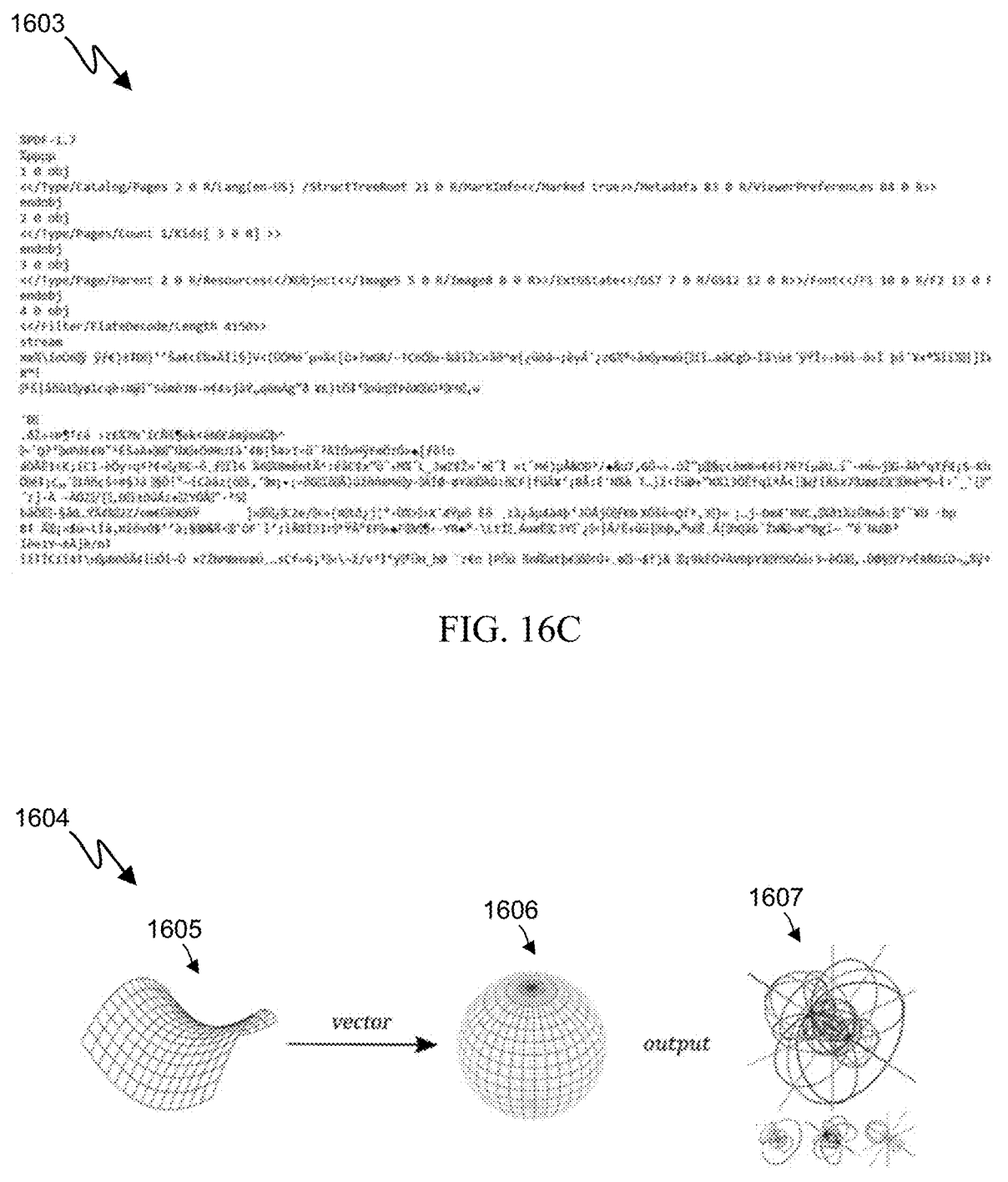

At block 1508, the processor transforms data sourced from the secured document, such as a restriction or release document as described in this disclosure, into a second vector space model using yet another transformation operator (e.g., a vector). For example, FIG. 16C illustrates an example of source data 1603 from a secure document in accordance with various embodiments of this disclosure, which in this example is a list of PDF document source data. The transformation at block 1508 can be represented as:

$$\{.\partial \bar{Z} \div \div p\P\dagger £\acute{e} > z £3/47N' \ldots \} \rightarrow \begin{bmatrix} D_{11} & D_{12} & D_{1n} \\ D_{21} & D_{22} & D_{2n} \\ D_{n1} & D_{n2} & D_{nn} \end{bmatrix}$$

As shown in the example above, a list of data extracted from the raw source data 1603 is transformed using the transformation operator to a second vector space model that is also an n X n matrix in this example. At block 1510, the processor transforms the second vector space model created from the secure document source data into a topological model using yet another transformation operator. For example, the second vector space model can be transformed into another n X n matrix, which can be represented as:

$$\begin{bmatrix} D_{11} & D_{12} & D_{1n} \\ D_{21} & D_{22} & D_{2n} \\ D_{n1} & D_{n2} & D_{nn} \end{bmatrix} \rightarrow \begin{bmatrix} T_{11} & T_{12} & T_{1n} \\ T_{21} & T_{22} & T_{2n} \\ T_{n1} & T_{n2} & T_{nn} \end{bmatrix}$$

At block 1512, the topological model created at block 1510 is mapped onto the multi-dimensional surface model that was created at block 1506. This can be represented as:

$$\begin{bmatrix} T_{11} & T_{12} & T_{1n} \\ T_{21} & T_{22} & T_{2n} \\ T_{n1} & T_{n2} & T_{nn} \end{bmatrix} \xRightarrow{\vec{M}} \begin{bmatrix} S_{11} & S_{12} & S_{1n} \\ S_{21} & S_{22} & S_{2n} \\ S_{n1} & S_{n2} & S_{nn} \end{bmatrix} \xrightarrow{output} \begin{bmatrix} H_{11} & H_{12} & H_{1n} \\ H_{21} & H_{22} & H_{2n} \\ H_{n1} & H_{n2} & H_{nn} \end{bmatrix}$$

Particularly, the processor transforms or maps the topological model associated with the secured document (in this example, a matrix), created at block 1510, using another transformation operator (in this example, a vector $\vec{M}$) onto the multi-dimensional surface model associated with the random source data (in this example, a matrix), created at block 1506, such that the another transformation operator under various deformations of the topological model preserves the topological properties of the topological model during transformation or mapping onto the multi-dimensional surface model. As shown above, the resulting output is a hyperdimensional model (in this example, a matrix). This transformation or mapping of the topological model onto the multi-dimensional surface model creates regions of area on the hyperdimensional model. FIG. 16D illustrates an example visualization 1604 of the mapping of a topological model onto a multi-dimensional surface model 1606 (a spherical volume in this example) in accordance with various embodiments of this disclosure, using a transformation operator such as a vector, to obtain an output 1607 that is a hyperdimensional model (a hypersphere projected in 3-dimensional space in this example).

At block 1514, the processor identifies a basis intersection of vector subspaces of the hyperdimensional model that was created at block 1512. For example, the processor can compute the basis intersection (in this example, a vector denoted by an element of complex numbers, a) of the vector subspaces, whether two or more (in this example, vector subspaces denoted by W and U), of the hyperdimensional model (in this example, a n X n matrix). This can be represented as:

$$W \cap U = (a_1, a_2, a_3, a_n, \ldots) \text{ where } a \in \mathbb{C}$$

Here, computation of the basis intersection of the vector subspaces of the hyperdimensional model (in this example, an X n matrix), where $(a_1, a_2, a_3, a_n, \ldots )$, is a vector which is the basis intersection, and a is an element of the complex numbers. Identification of the basis intersection is for purposes of unique translation or mapping. At block 1516, the processor transforms or translates the basis intersection to determine a value of at least a portion of proof data that is to be embedded into a secure document. For example, the processor can translate or transform the basis intersection (in the above example, a vector) of the vector subspaces of the hyperdimensional model (in this example, an X n matrix), where $(a_1, a_2, a_3, a_n, \ldots )$, using another transformation operator, or using other computational or non-computational methods in various embodiments, to compute or determine a value (in this example, an alphanumeric data type) which is assigned to or represents at least a portion of the proof data to be embedded in the secure document. This operation at block 1516 can be represented as:

$$(a_1, a_2, a_3, a_n, \ldots) \xrightarrow{transform} (v3r1k0n)$$

The resulting value can be assigned to, associated with, or otherwise represents at least a portion of the proof data. As described in this disclosure, the proof data embedded in the secure document can include a machine-readable group of proof data that also can be visually represented on the secure document as a group of shapes and alphanumeric characters in various dimensions, orientations, shadings, and/or placements. These different shapes and alphanumeric characters, along with their various dimensions, orientations, shadings, and/or placements can be mapped to different values obtainable at block 1516 of the process 1500, for example by storing a list of values where each value in the list is associated with a different visual icon in a visual icon library. For instance, at block 1518, to obtain the visual representation to be embedded in the secure document, the processor generates the visual representation based on the proof data value obtained at block 1516. At block 1520, the processor embeds the visual representation of the proof data in the secure document.

Figure 16E:
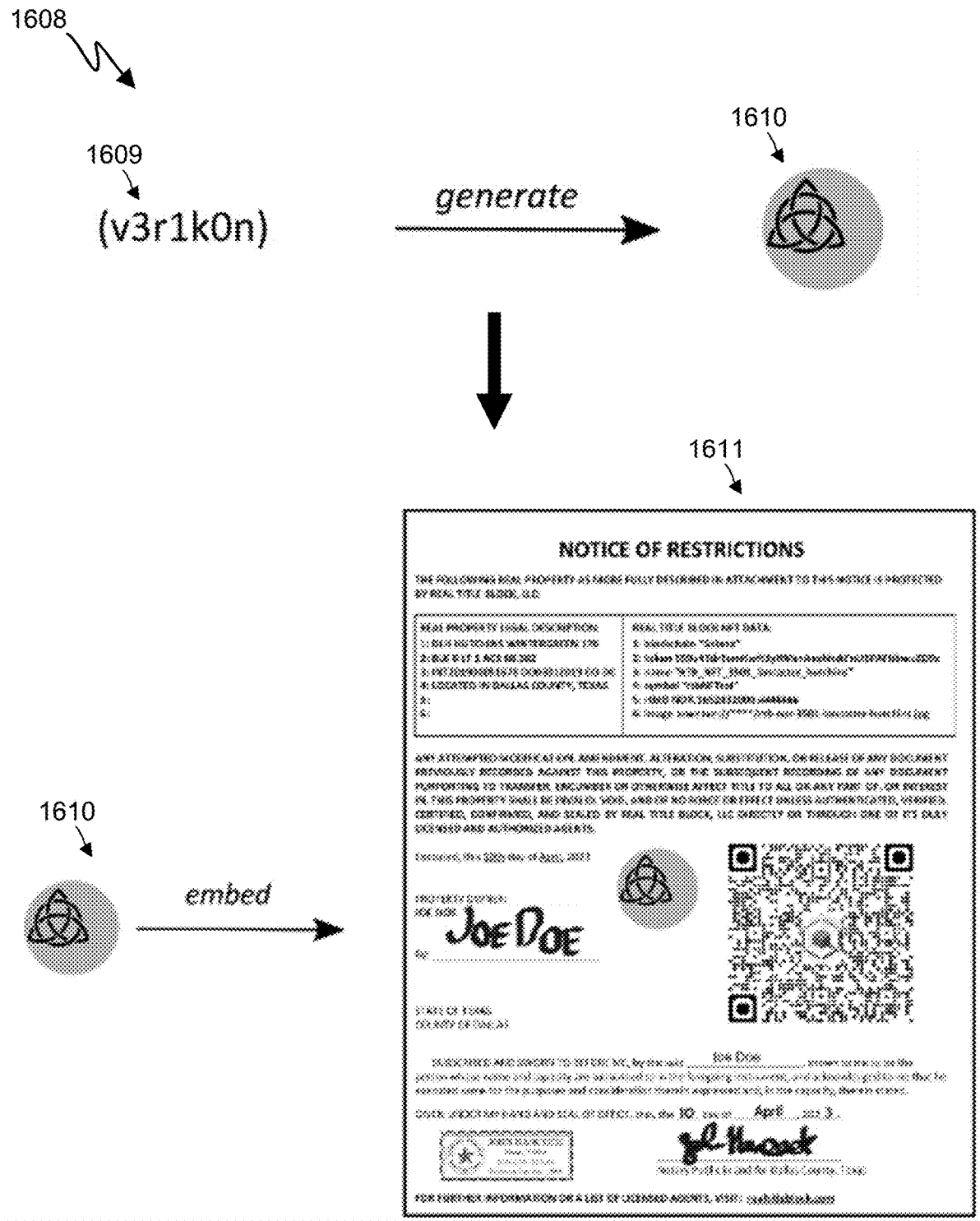
FIG. 16E illustrates an example generation and embedding operation of at least a portion of proof data into a secure document in accordance with embodiments of this disclosure.

For example, FIG. 16E illustrates an example generation and embedding operation 1608 of at least a portion of proof data into a secure document in accordance with embodiments of this disclosure. As shown in FIG. 16E, a proof data value 1609, such as determined at block 1516, is used to generate an embedding icon 1610. As described above, the particular proof data value 1609 of this example ("v3r1k0n") can be mapped to the proof data value 1609 stored as part of a linked list or other data structure that associates the possible proof data values obtainable using the process 1500 or other processes described in this disclosure with various embedding icons 1610. In this example, the value 1609 is linked to the embedding icon 1610 that includes a shaded circle with a triquetra symbol displayed that is offset from the center of the shaded circle. Other types of visual representations may be used other than the illustrated embedding icon 1610, such as shown in FIGS. 3A-4B, and the variation may occur due to the values generated using this process that are linked to different visual objects. As also shown in FIG. 16E, after generation of the embedding icon 1610, the embedding icon 1610 is embedded into a secure document 1611 at one or more defined locations of the secure document 1611.

It will be understood that the steps 1502-1520 of the process 1500 can be performed a plurality of times to embed multiple proof data objects that form the larger collection of machine-readable proof data embedded in the secure document. For example, FIGS. 3A-4B illustrate examples in which multiple proof data objects in the form of a plurality of machine-readable icons are embedded in the secure documents (e.g., the plurality of proof data 314, 414). For instance, as shown in FIG. 4A, the shapes, degree of shading, alphanumeric characters, orientation of the alphanumeric characters (e.g., via rotation, reflection, etc.), placement of the alphanumeric characters (such as the placement of a character within a shape), and so on, can vary between different proof data objects.

At decision block 1522, the processor determines whether or not to generate additional proof data to be embedded into the secure document. This determination can be made based on parameters or settings associated with the proving operations of the system. For example, the system may be set to embed only one visual object (e.g., an icon such as the embedding icon 1610), or two or more visual objects. If the processor determines additional proof data it to be embedded, the process 1500 loops back to block 1502 to begin creating additional proof data. In some embodiments, the same random source data retrieved at block 1502 can be used for additional visual objects, and so, in some embodiments, the process 1500 may loop from decision block 1522 to block 1504 instead. Once the processor determines at decision block 1522 that no additional proof data is to be generated and embedded into the secure document, such as if the set number of proof data defined by the parameter or setting is reached, the process 1500 ends at block 1524.

In some embodiments, steps similar to steps 1504-1518 can be performed when, as described in the various embodiments of this disclosure, the truthfulness of genuineness of the secure document is requested to be proved, such as described with respect to FIG. 14, for instance. For example, random source data retrieved at block 1502 can be stored in associated with the ID of the secure document so that, when proof is requested that a provided copy of a secure document is genuine, the processor can perform the same operations on the original source data and re-generate the machine-readable proof data. Then, the processor compares the re-generated machine-readable proof data to the proof data embedded in the document copy provided to the system to determine if the document copy is valid or if the document is fraudulent or otherwise defective.

In some other embodiments, instead of re-proving the original document using the original source data, the system can store the original proof data when it is originally generated. Then, when an alleged genuine copy of the document is presented to the system for authentication, the processor matches the originally stored proof data with proof data, if any, on the alleged genuine copy of the document. If the proof data on the alleged genuine copy of the document does not match the stored proof data, or if the alleged genuine copy of the document does not contain proof data, the alleged genuine copy of the document is deemed invalid. If the stored original proof data matches the proof data on the alleged genuine copy of the document, the document can be deemed to be genuine.

Although FIG. 15 illustrates one example process 1500 for proving a secure document and embedding proof data in the secure document, various changes may be made to FIG. 15. For example, while shown as a series of steps, various steps in FIG. 15 may overlap, occur in parallel, occur in a different order, or occur any number of times.

Although FIGS. 16A-16E illustrates various example source data, proof data, and secure documents, various changes may be made to FIGS. 16A-16E. For example, the source data, proof data and associated visual representations, and/or the secure document illustrated in FIGS. 16A-16E can be or include different source data (such as data retrieved from a different source), different proof data and associated visual representations, and/or different types of secure documents.

Although this disclosure has been described with example embodiments, various changes and modifications may be suggested to one skilled in the art. It is intended that this disclosure captures and encompass such changes and modifications as fall within the scope of the appended claims.

What is claimed is:

1. A system for dynamically creating, securing, authenticating, storing, and amending digital documents using a blockchain, the system comprising:
 a scalable server system including at least one processor, the at least one processor configured to:
  receive a request to generate a digital secured document;
  generate the digital secured document and a unique identifier of the digital secured document;
  construct, within the digital secured document, one or more defined areas for embedding security data;
  embed a plurality of security data in at least one of the one or more defined areas of the digital secured document, wherein the plurality of security data includes a scannable code linking the digital secured document to one or more web sources for viewing information pertaining to the digital secured document, wherein the scannable code has embedded therein an encrypted message that, when decrypted by the scalable server system, validates an authenticity of the digital secured document;

construct, within the secured digital document, one or more defined areas for embedding proof data;

embed a plurality of proof data in at least one of the one or more of defined areas of digital secured document, wherein the plurality of proof data includes a machine-readable group of shapes and alphanumeric characters in various dimensions, orientations, shading, and placements, and wherein the machine-readable group appears as physical marks embedded in the digital secured document;

mint the digital secured document on a blockchain, including:
  generate metadata on the blockchain associated with the digital secured document;
  store the metadata and one or more images associated with the digital secured document permanently with an on-chain permaweb protocol; and
  establish on the blockchain a plurality of rules for automatically updating the metadata and/or the digital secured document; and log a token identifier associated with the minted digital secured document.

2. The system of claim 1, wherein, to create the encrypted message in the scannable code, the at least one processor is further configured to:
  create, from a combination of data associated with the digital secured document, a unique string;
  sign the unique string using an elliptical curve cryptography scheme; and
  embed the encrypted message in the scannable code during creation of the scannable code.

3. The system of claim 2, wherein the at least one processor is further configured to perform authentication of the digital secured document prior to minting the digital secured document, wherein the at least one processor is configured to:
  receive data relating to a scan of the scannable code;
  identify the encrypted message in the received data;
  decrypt the encrypted message using the elliptical curve cryptography scheme; and
  validate the authenticity of the digital secured document based on the decryption.

4. The system of claim 1, wherein, to create the machine-readable group, the at least one processor is further configured to:
  create, from a combination of data associated with a proof of logical statements codifying the digital secured document, a zero knowledge proof; and
  render the machine-readable group for embedding in the secured digital document based on proving the zero knowledge proof.

5. The system of claim 4, wherein the at least one processor is configured to perform a proof of the logical statements codifying the digital secured document prior to minting the digital secured document, including:
  receive data relating to a scan of the machine-readable group, recognizing shapes, symbols, and alphanumeric characters included in the received data;
  translate data associated with a digital secured document to recreate the shapes, symbols, and alphanumeric characters included in the received data; and
  compare the recreated shapes, symbols, and alphanumeric characters to the shapes, symbols, and alphanumeric characters in the received data.

6. The system of claim 1, wherein the at least one processor is further configured to:
  receive a notification of (i) an event associated with the digital secured document or (ii) new information associated with the digital secured document; and
  in response to receipt of the notification, triggering, based on the plurality of rules established on the blockchain, an update event, wherein the update event includes updating the metadata on the blockchain associated with the digital secured document and/or embedding additional security data into the one or more defined areas of the digital secured document.

7. The system of claim 1, wherein the plurality of security data includes at least the unique identifier of the digital secured document and the token identifier.

8. The system of claim 7, wherein the plurality of security data further includes one or more of:
  a blockchain identifier;
  a watermark indicating an authentication or recordation status of the digital secured document;
  a URI to an image of a property associated with the digital secured document;
  a URI to an image of the digital secured document;
  a description of the property; and
  a visual symbol identifying a source of the scalable server system.

9. The system of claim 1, wherein the scannable code appears as physical marks embedded in the digital secured document, and wherein the at least one processor is further configured to create the scannable code by using a combination of two or more of: a property owner identifier; an agent identifier; a property identifier; the unique identifier of the digital secured document; and the token identifier.

10. The system of claim 1, wherein the digital secured document is either a document establishing a restriction on a property or a document releasing a restriction on a property.

11. The system of claim 1, wherein the plurality of rules on the blockchain are organized in a non-fungible token (NFT) smart contract.

12. The system of claim 1, wherein the scalable server system includes a front end layer used by the at least one processor to receive the request to generate the digital secured document, and a back end layer used by the at least one processor to process the request.

13. The system of claim 1, wherein the at least one processor is further configured to:
  embed, as part of the plurality of security data, intentionally altered information into the digital secured document, including at least one of:
    corrupted data;
    modified data; and
    false data, and
  wherein the intentionally altered information is derived from at least one of:
    a digitized image;
    a video;
    audio; and
    text data; and authenticate the digital secured document by extracting and confirming the intentionally altered information from the digital secured document.

14. A method for dynamically creating, securing, authenticating, storing, and amending digital documents using a blockchain, the method comprising:

receiving, by at least one processor of a scalable server system, a request to generate a digital secured document;

generating, by the at least one processor, the digital secured document and a unique identifier of the digital secured document;

constructing, by the at least one processor, within the digital secured document, one or more defined areas for embedding security data;

embedding, by the at least one processor, a plurality of security data in at least one of the one or more defined areas of the digital secured document, wherein the plurality of security data includes a scannable code linking the digital secured document to one or more web sources for viewing information pertaining to the digital secured document, wherein the scannable code has embedded therein an encrypted message that, when decrypted by the scalable server system, validates an authenticity of the digital secured document;

constructing, within the secured digital document, one or more defined areas for embedding proof data;

embedding a plurality of proof data in at least one of the one or more of defined areas of digital secured document, wherein the plurality of proof data includes a machine-readable group of shapes and alphanumeric characters in various dimensions, orientations, shading, and placements, and wherein the machine-readable group appears as physical marks embedded in the digital secured document;

minting, by the at least one processor, the digital secured document on a blockchain, including:

generating metadata on the blockchain associated with the digital secured document;

storing the metadata and one or more images associated with the digital secured document permanently with an on-chain permaweb protocol; and establishing on the blockchain a plurality of rules for automatically updating the metadata and/or the digital secured document; and logging a token identifier associated with the minted digital secured document.

15. The method of claim 14, further comprising creating the encrypted message in the scannable code, including:

creating, from a combination of data associated with the digital secured document, a unique string;

signing the unique string using an elliptical curve cryptography scheme; and embedding the encrypted message in the scannable code during creation of the scannable code.

16. The method of claim 15, further comprising performing authentication of the digital secured document prior to minting the digital secured document, including:

receiving data relating to a scan of the scannable code;

identifying the encrypted message in the received data;

decrypting the encrypted message using the elliptical curve cryptography scheme; and validating the authenticity of the digital secured document based on the decryption.

17. The method of claim 14, wherein creating the machine-readable group includes:

creating, from a combination of data associated with a proof of logical statements codifying the digital secured document, a zero knowledge proof; and rendering the machine-readable group for embedding in the secured digital document based on proving the zero knowledge proof.

18. The method of claim 17, further comprising performing a proof of the logical statements codifying the digital secured document after authenticating the digital secured document, including:

receiving data relating to a scan of the machine-readable group;

recognizing shapes, symbols, and alphanumeric characters included in the received data;

translating data associated with a digital secured document to recreate the shapes, symbols, and alphanumeric characters included in the received data; and comparing the recreated shapes, symbols, and alphanumeric characters to the shapes, symbols, and alphanumeric characters in the received data.

19. The method of claim 14, further comprising:

receiving, by the at least one processor, a notification of (i) an event associated with the digital secured document or (ii) new information associated with the digital secured document; and in response to receiving the notification, triggering, based on the plurality of rules established on the blockchain, an update event, wherein the update event includes updating the metadata on the blockchain associated with the digital secured document and/or embedding additional security data into the one or more defined areas of the digital secured document.

20. The method of claim 14, wherein the plurality of security data includes at least the unique identifier of the digital secured document and the token identifier.

21. The method of claim 20, wherein the plurality of security data further includes one or more of:

a blockchain identifier;

a watermark indicating an authentication or recordation status of the digital secured document;

a URI to an image of a property associated with the digital secured document;

a URI to an image of the digital secured document;

a description of the property; and a visual symbol identifying a source of the scalable server system.

22. The method of claim 21, wherein the scannable code appears as physical marks embedded in the digital secured document and the method further comprising creating, by the at least one processor, the scannable code using a combination of two or more of:

a property owner identifier;

an agent identifier;

a property identifier;

the unique identifier of the digital secured document; and the token identifier.

23. The method of claim 14, wherein the digital secured document is either a document establishing a restriction on a property or a document releasing a restriction on a property.

24. The method of claim 14, wherein the plurality of rules on the blockchain are organized in a non-fungible token (NFT) smart contract.

25. The method of claim 14, further comprising:

embedding, as part of the plurality of security data, intentionally altered information into the digital secured document, including at least one of:

corrupted data;
modified data; and
false data, and
wherein the intentionally altered information is derived from at least one of:
a digitized image;
a video;
audio; and
text data; and
authenticating the digital secured document by extracting and confirming the intentionally altered information from the digital secured document.

26. A system for dynamically creating, securing, tokenizing, proving, minting, authenticating, storing, and amending digital documents using a blockchain, the system comprising:
a scalable server system including at least one processor, the at least one processor configured to:
receive a request to generate a digital secured document;
generate the digital secured document and a unique identifier of the digital secured document;
construct, within the digital secured document, one or more defined areas for embedding security data;
embed a plurality of security data in at least one of the one or more defined areas of the digital secured document,
wherein the plurality of security data includes the unique identifier of the digital secured document and a scannable code linking the digital secured document to one or more web sources for viewing information pertaining to the digital secured document,
wherein the scannable code appears as physical marks embedded in the digital secured document, and wherein the scannable code has embedded therein an encrypted message that, when decrypted by the scalable server system, validates an authenticity of the digital secured document, and
wherein the plurality of security data further includes one or more of:
a blockchain identifier;
a URI to an image of a property associated with the digital secured document;
a URI to an image of the digital secured document;
a description of the property; and
a visual symbol identifying a source of the scalable server system;
construct, within the secured digital document, one or more defined areas for embedding proof data;
embed a plurality of proof data in at least one of the one or more of defined areas of digital secured document,
wherein the plurality of proof data includes a machine-readable group of shapes and alphanumeric characters in various dimensions, orientations, shading, and placements, wherein the machine-readable group appears as physical marks embedded in the digital secured document, and
mint the digital secured document on a blockchain, including:
generate metadata on the blockchain associated with the digital secured document;
store the metadata and one or more images associated with the digital secured document permanently with an on-chain permaweb protocol; and
establish on the blockchain a plurality of rules for automatically updating the metadata and/or the digital secured document, wherein the plurality of rules on the blockchain are organized in a non-fungible token (NFT) smart contract; and
log a token identifier associated with the minted digital secured document,
wherein the scalable server system includes a front end layer used by the at least one processor to receive the request to generate the digital secured document, and a back end layer used by the at least one processor to process the request,
wherein the front end layer includes an ingress controller, and wherein the at least one processor is further configured to use the ingress controller to route requests, including the request to generate the digital secured document, to one or more services executed by the back end layer based on a current load balance of the scalable server system, and
wherein the one or more services executed by the back end layer include one or more application pods, and wherein the at least one processor is further configured to automatically deploy the one or more application pods based on a current demand, wherein the one or more application pods are used by the at least one processor to perform at least the generation and tokenization and minting of the digital secured document.

27. The system of claim 26, wherein, to create the encrypted message in the scannable code, the at least one processor is further configured to:
create, from a combination of data associated with the digital secured document, a unique string;
sign the unique string using an elliptical curve cryptography scheme; and
embed the encrypted message in the scannable code during creation of the scannable code,
perform authentication of the digital secured document prior to minting the digital secured document, including:
receive data relating to a scan of the scannable code;
identify the encrypted message in the received data;
decrypt the encrypted message using the elliptical curve cryptography scheme; and
validate the authenticity of the digital secured document based on the decryption.

28. The system of claim 26, wherein, to create the machine-readable group, the at least one processor is further configured to:
create, from a combination of data associated with a proof of logical statements codifying the digital secured document, a zero knowledge proof; and
render the machine-readable group for embedding in the secured digital document based on proving the zero knowledge proof.

* * * * *